(12) United States Patent
Tateishi et al.

(10) Patent No.: US 8,580,025 B2
(45) Date of Patent: *Nov. 12, 2013

(54) INK SET, RECORDING METHOD, RECORDED MATERIAL AND PRINTED MATERIAL

(75) Inventors: Keiichi Tateishi, Odawara (JP); Hiroshi Yamamoto, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/394,038

(22) PCT Filed: Sep. 2, 2010

(86) PCT No.: PCT/JP2010/065074
§ 371 (c)(1),
(2), (4) Date: Mar. 2, 2012

(87) PCT Pub. No.: WO2011/027842
PCT Pub. Date: Mar. 10, 2011

(65) Prior Publication Data
US 2012/0156449 A1 Jun. 21, 2012

(30) Foreign Application Priority Data

Sep. 4, 2009 (JP) ................................. 2009-205356
Sep. 2, 2010 (JP) ................................. 2010-197189

(51) Int. Cl.
*C09D 11/02* (2006.01)
(52) U.S. Cl.
USPC ..................................... 106/31.78; 106/31.77
(58) Field of Classification Search
USPC ................. 106/31.76, 31.77, 31.78; 427/256; 347/100; 428/195.1
See application file for complete search history.

(56) References Cited

U.S. PATENT DOCUMENTS 6,284,029 B1   9/2001   Sano et al.
6,322,188 B1   11/2001  Sano
(Continued)

FOREIGN PATENT DOCUMENTS

JP   3455764 B2   8/2003
JP   3553581 B2   5/2004
(Continued)

OTHER PUBLICATIONS

International Search Report dated Sep. 28, 2010 in counterpart international application No. PCT/JP2010/065074.

(Continued)

*Primary Examiner* — Helene Klemanski
(74) *Attorney, Agent, or Firm* — Sughrue Mion, PLLC

(57) ABSTRACT

The ink set includes a yellow ink composition and either a magenta ink composition or a cyan ink composition, or both, wherein a coloring agent of the yellow ink composition is one which includes an azo pigment represented e.g. by the following formula (1):

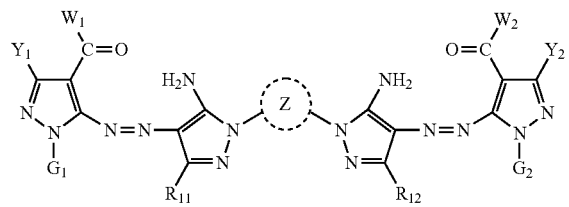

or its tautomers or their salts or hydrates, the magenta ink composition contains as a coloring agent at least one pigment selected from the following: C.I. Pigment Violet 19, C.I. Pigment Red 122, C.I. Pigment Red 202 and C.I. Pigment Red 209, and the cyan ink composition contains as a coloring agent at least one pigment selected from the following: C.I. Pigment blue 15:1, C.I. Pigment Blue 15:2, C.I. Pigment Blue 15:3, C.I. Pigment Blue 15:4 and C.I. Pigment Blue 15:6.

19 Claims, 14 Drawing Sheets

Fig.-1

(56) References Cited

U.S. PATENT DOCUMENTS

| | | | |
|---|---|---|---|
| 6,702,883 B1 | 3/2004 | Sano et al. | |
| 7,740,695 B2 * | 6/2010 | Kitamura et al. | 106/31.47 |
| 8,062,383 B2 * | 11/2011 | Tateishi | 8/637.1 |
| 8,080,067 B2 * | 12/2011 | Tateishi et al. | 8/637.1 |
| 8,101,011 B2 * | 1/2012 | Tateishi et al. | 106/31.46 |
| 8,172,910 B2 * | 5/2012 | Tateishi et al. | 8/637.1 |
| 8,222,326 B2 * | 7/2012 | Morimoto et al. | 427/256 |
| 8,236,065 B2 * | 8/2012 | Tateishi et al. | 8/637.1 |
| 8,328,344 B2 * | 12/2012 | Yamamoto et al. | 347/100 |
| 8,372,190 B2 * | 2/2013 | Tateishi et al. | 106/31.5 |
| 2005/0248643 A1 | 11/2005 | Koganehira et al. | |
| 2006/0016368 A1 | 1/2006 | Ozawa et al. | |
| 2007/0242118 A1 | 10/2007 | Koganehira et al. | |
| 2008/0199615 A1 | 8/2008 | Harada et al. | |
| 2008/0274283 A1 | 11/2008 | Tateishi et al. | |
| 2009/0198045 A1 | 8/2009 | Paetzold et al. | |
| 2010/0159210 A1 | 6/2010 | Monahan et al. | |
| 2010/0302305 A1 | 12/2010 | Tateishi et al. | |
| 2011/0091696 A1 * | 4/2011 | Tanaka et al. | 428/195.1 |
| 2011/0104458 A1 * | 5/2011 | Tanaka et al. | 428/195.1 |
| 2011/0300344 A1 * | 12/2011 | Tateishi | 106/31.77 |

FOREIGN PATENT DOCUMENTS

| | | |
|---|---|---|
| JP | 2005314545 A | 11/2005 |
| JP | 3882418 B2 | 11/2006 |
| JP | 3911920 B2 | 2/2007 |
| JP | 200763520 A | 3/2007 |
| JP | 2007138124 A | 6/2007 |
| JP | 2007297596 A | 11/2007 |
| JP | 2009504832 A | 2/2009 |
| JP | 2009144166 A | 7/2009 |
| JP | 2009155605 A | 7/2009 |
| JP | 2009179799 A | 8/2009 |
| WO | 2009057712 A1 | 5/2009 |
| WO | WO 2010/074350 * | 7/2010 |

OTHER PUBLICATIONS

Written Opinion dated Sep. 28, 2010 in counterpart international application No. PCT/JP2010/065074.

* cited by examiner

INK SET, RECORDING METHOD, RECORDED MATERIAL AND PRINTED MATERIAL

TECHNICAL FIELD

The present invention relates to an aqueous pigment ink set containing a novel yellow pigment, a recording method, a recorded material and a printed material.

BACKGROUND ART

When color images are formed by utilizing ink compositions, at least yellow ink, magenta ink and cyan ink are generally used. And it is possible to reproduce colors in the green region when yellow and cyan colors are mixed, colors in the red region when yellow and magenta colors are mixed, and colors in the blue region when cyan and magenta colors are mixed. On this account, it has been long desired to develop an ink set which can excellently reproduce a wide range of colors in each of those regions.

It is necessary for each ink to meet general performance requirements for an ink composition. For instance, it is required for an ink composition to form clear images on a recording material and, during long-term storage, not to cause degradation in the images formed. And light resistance in particular is given as one of performance requirements for images formed with ink compositions.

For the purpose of imparting satisfactory light resistance to ink compositions, pigments are generally used as coloring agents in the ink compositions. However, there are cases where, depending on the types chosen, pigments cannot impart satisfactory light resistance to ink compositions. In addition, pigments are inferior to dyes in tinctorial strength, and besides, it happens that images obtained by printing on a recording material are lacking in vividness.

Moreover, a color image formed with a plurality of ink compositions, even if one of colors present therein is inferior in light resistance, suffers a change in hue, and thereby the quality of the color image is degraded in the extreme. Consequently, color ink compositions are required to have more controlled light resistance.

On the other hand, recently have printers for inkjet recording come into widespread use. A method of this inkjet recording is a printing method that liquid droplets of ink compositions are made to fly out and adhere to a recording material, such as paper, and thereby printing is performed. This method features the feasibility of printing high-resolution and high-quality images at a high speed by means of moderately priced apparatus. Where color inkjet recording apparatus in particular is concerned, images produced therein have moved up in quality. As a result, the apparatus is also used as an output device of photographs, and further has reached a level that allows even utilizations as a digital printer, a plotter, a CAD output device and the like. It is conceivable that images printed with a printer for inkjet recording may be used in a wide variety of forms. It is imaginable that the printed matter of photograph specifications or the like, in particular, will be kept for a long time as a display on an indoor place exposed to a fluorescent lamp or on an outdoor place or a like place exposed to direct sunlight. The light resistance is therefore very important performance required of images obtained by the method of inkjet recording.

As to the pigment ink set having a wide range of color reproducibility and excellent light resistance, yellow pigment ink satisfying performance requirements at high levels, notably one which allows compatibility between good hue and high-level light resistance, is not yet in existence, and development of such yellow pigment ink has been long desired.

In forming color images, a yellow ink composition containing a yellow pigment is used for reproduction of a color in the yellow region. Examples of a yellow pigment include C.I. Pigment Yellows 1, 2, 3, 12, 13, 14, 16, 17, 73, 74, 75, 83, 93, 95, 97, 98, 109, 110, 114, 128, 129, 138, 139, 150, 151, 154, 155, 180, 185, 213 and so on.

Furthermore, it is disclosed in Patent Documents 1 and 2 that reproduction of a wide range of colors in the yellow region can be improved by preparing a plurality of yellow pigment compositions into each of which some of the above-cited yellow pigments are incorporated in combination.

However, yellow ink compositions each containing two or more of yellow pigments having satisfactory color reproducibility are not sufficient in dark color reproducibility in the yellow region though they can attain color reproducibility over a wider range than ink containing one kind of pigment. In addition, when pigments apart from each other in hue angle are mixed, there is a remarkable tendency of secondary color saturation to be lowered. For instance, when C.I. Pigment yellow 110 is used in an ink set, the ink set has a drawback of being low in green color saturation because the pigment is tinged with red color.

Further, such a yellow ink composition as not only to provide clear images on a recording material but also to cause no degradation in the images during long-term storage (to have light resistance in particular) is desired. When a color image is formed by use of a plurality of pigment ink compositions, the color image suffers a change in hue so long as any one of the pigments present therein is inferior in light resistance, and the quality thereof is extremely degraded. For instance, C.I. Pigment Yellow 74 is markedly low in light resistance though relatively good in hue, and when it is used in an ink set, images in yellow, red, green and gray portions suffer substantial changes in individual hues. Thus quality degradation of color images has been becoming a large problem.

For the purpose of reproducing a wide range of colors in the yellow region, on the other hand, methods of using ink sets which each, aside from yellow ink having high lightness in color, further includes a second yellow ink composition referred to as dark yellow, namely yellow ink having low lightness in color, are disclosed in Patent Documents 3, 4, 5 and 6.

However, methods of using second ink compositions, typified by dark yellow, bring about an increase in the number of ink colors, and thereby color making becomes complicated. As a consequence, not only such methods have developed a tendency to raise the cost but also improvements produced thereby have not yet reached such a level as to sufficiently satisfy performance requirements.

RELATED ART DOCUMENTS

Patent Document

Patent Document 1: Unexamined published Japanese patent application (JP-A) No. 2005-314545
Patent Document 2: Japanese Patent No. 3911920
Patent Document 3: Japanese Patent No. 3455764
Patent Document 4: Japanese Patent No. 3553581
Patent Document 5: Japanese Patent No. 3882418
Patent Document 6: JP-A-2007-297596

DISCLOSURE OF THE INVENTION

Problems that the Invention is to Solve

As a result of our intensive studies made in view of the circumstances mentioned above, the present Inventors have found that an ink sent including an azo pigment having a specific structure as a yellow ink composition and either a magenta ink composition containing a special coloring agent or a cyan ink composition containing another special coloring agent, or both can ensure compatibility between having color reproducibility and having light resistance, thereby achieving the present invention.

Means for Solving the Problems

More specifically, the invention includes the following [1] to [22].

(1) An ink set containing: a yellow ink composition; and at least one of a magenta ink composition and a cyan ink composition, wherein a coloring agent of the yellow ink composition is one which comprises an azo pigment represented by the following general formula (1), or its tautomers, or their salts or hydrates, the magenta ink composition contains as a coloring agent at least one pigment selected from the group consisting of C.I. Pigment Violet 19, C.I. Pigment Red 122, C.I. Pigment Red 202 and C.I. Pigment Red 209, and the cyan ink composition contains as a coloring agent at least one pigment selected from the group consisting of C.I. Pigment blue 15:1, C.I. Pigment Blue 15:2, C.I. Pigment Blue 15:3, C.I. Pigment Blue 15:4 and C.I. Pigment Blue 15:6.

(1):

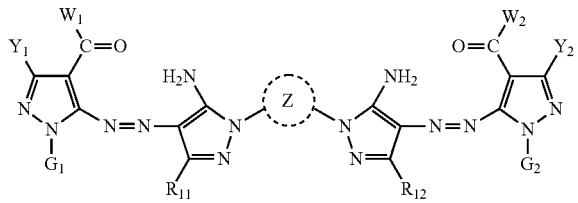

In the formula (1), Z represents a 5- to 8-membered nitrogen-containing heterocyclic ring, $Y_1$, $Y_2$, $R_{11}$ and $R_{12}$ each independently represents a hydrogen atom or a substituent, $G_1$ and $G_2$ each independently represents a hydrogen atom, an alkyl group, an aralkyl group, an alkenyl group, an alkynyl group, an aryl group or a heterocyclic group, and $W_1$ and $W_2$ each independently represents an alkoxy group, an amino group, an alkyl group or an aryl group.

(2) The ink set according to (1), wherein the ink set further comprise a black ink composition, and the black ink composition contains a carbon black as a coloring agent.

(3) The ink set according to (1) or (2), wherein $W_1$ and $W_2$ in the general formula (1) each independently represent an alkoxy group containing at most 3 carbon atoms all told, an amino group or an alkylamino group containing at most 6 carbon atoms all told.

(4) The ink set according to any one of (1) to (3), wherein $G_1$ and $G_2$ in the general formula (1) each independently represent an alkyl group containing at most 3 carbon atoms all told.

(5) The ink set according to any one of (1) to (4), wherein Z in the general formula (1) represents a 6-membered nitrogen containing heterocyclic ring.

(6) The ink set according to any one of (1) to (5), wherein the azo pigment represented by the general formula (1) is an azo pigment represented by the following general formula (2).

(2):

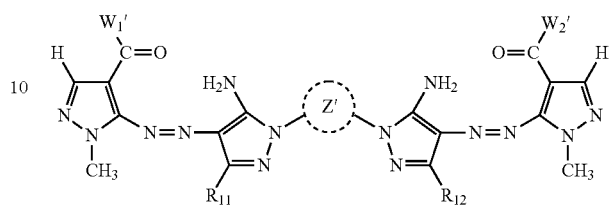

In the formula (2), Z' represents a 6-membered nitrogen-containing heterocyclic ring, $R_{11}$ and $R_{12}$ each independently represent a hydrogen atom or a substituent, $W_1'$ and $W_2'$ each independently represents an alkoxy group containing at most 3 carbon atoms all told, an amino group or an alkylamino group containing at most 6 carbon atoms all told.

(7) The ink set according to any one of (1) to (6), wherein the azo pigment represented by the general formula (2) is an azo pigment represented by the following formula (3).

(3):

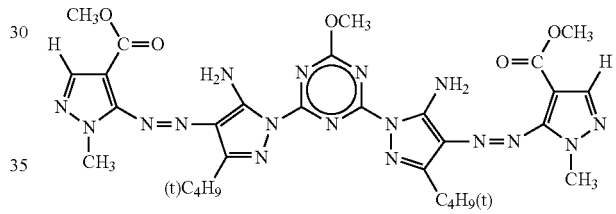

(8) The ink set according to (7), wherein the azo pigment represented by the formula (3) is an azo pigment having distinctive X-ray diffraction peaks at Bragg angles (2θ±0.2°) of 7.2° and 25.9° in CuKα characteristic X-ray diffraction or a tautomer thereof.

(9) The ink set according to any one of (1) to (6), wherein the azo pigment represented by the general formula (2) is an azo pigment represented by the following formula (4).

(4):

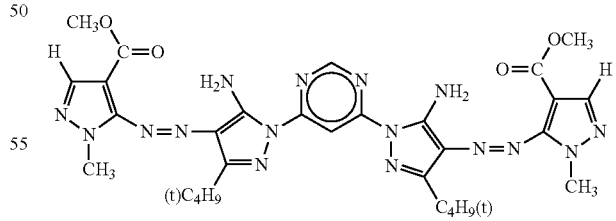

(10) The ink set according to (9), wherein the azo pigment represented by the formula (4) is an azo pigment having distinctive X-ray diffraction peaks at Bragg angles (2θ±0.2°) of 7.6°, 25.6° and 27.7° in CuKα characteristic X-ray diffraction or a tautomer thereof.

(11) The ink set according to any one of (1) to (10), wherein an amount of the coloring agent incorporated into the yellow ink composition is from 3% by mass to 6% by mass.

(12) The ink set according to any one of (1) to (10), wherein an amount of the coloring agent incorporated into the magenta ink composition is from 3% by mass to 6% by mass.
(13) The ink set according to any one of (1) to (10), wherein an amount of the coloring agent incorporated into the cyan ink composition is from 3% by mass to 6% by mass.
(14) The ink set according to any one of (2) to (10), wherein an amount of the coloring agent incorporated into the black ink composition is from 1% by mass to 3% by mass.
(15) The ink set according to any one of (1) to (14), wherein each ink composition further contains at least one of a dispersant and a penetrant.
(16) The ink set according to (15), wherein the dispersant is a vinyl polymer.
(17) The ink set according to (15), wherein the penetrant is at least one of lower alkyl ethers of polyhydric alcohol or acetylene glycols.
(18) The ink set according to any one of (1) to (17), wherein the magenta ink composition contains at least a solid solution of γ-type C.I. Pigment Violet 19 and C.I. Pigment Red 202.
(19) The ink set according to any one of (1) to (18), wherein the coloring agent of the cyan ink composition is one or more pigment selected from the group consisting of C.I. Pigment Blue 15:3, C.I. Pigment Blue 15:4 and C.I. Pigment Blue 15:16.
(20) A recording method wherein the ink compositions of the ink set according to any one of (1) to (19) are made to adhere to a recording material and thereby printing is performed.
(21) The recording method according to (20), which is an inkjet recording method wherein liquid droplets of the ink compositions each are made to discharge and adhere to a recording material and thereby printing is performed.
(22) A recorded material which is made by performing the printing in accordance with the recording method according to (20) or (21).

Advantages of the Invention

The invention provides ink sets which excel in color reproducibility over a wide range, fastness to ozone gas and light resistance. More specifically, the invention provides ink sets which have excellent color reproducibility and light resistance, notably in a region of yellow monochrome and in regions of mixed colors such as red and green. And each of the present ink sets, when used in printing, makes it possible to form an excellent recorded material showing high-level improvements not only in print specialties (coloring properties) and fastness (to ozone gas and light in particular) in a yellow monochrome area of recorded images but also in hues, print characteristics (coloring properties) and image fastness in color-mixed areas, notably in green and red areas where images are printed using a yellow-cyan ink combination and a yellow-magenta ink combination, respectively.

MODE FOR CARRYING OUT THE INVENTION

Figure 1:
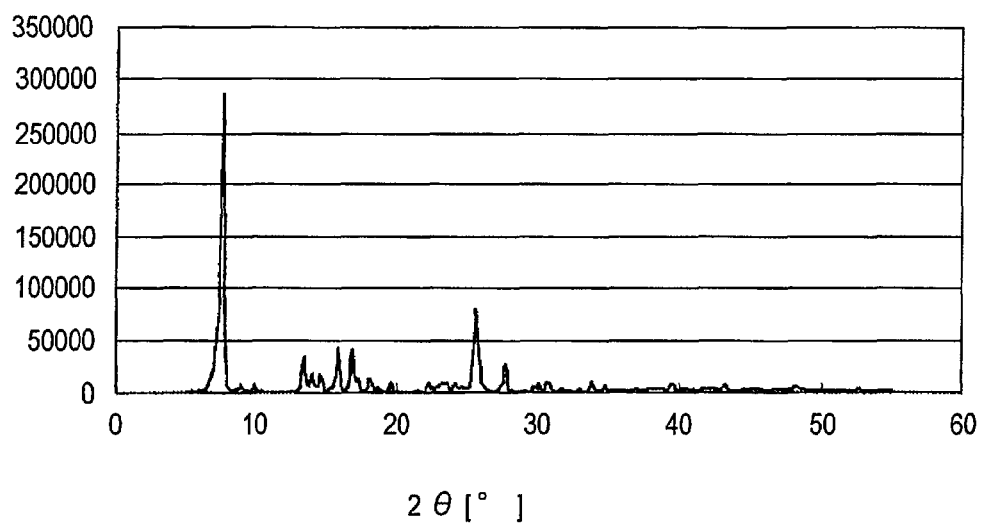
FIG. 1 is a CuKα characteristic X-ray diffraction pattern of a specific example compound Pig. 1 synthesized according to Synthesis Example 1.

The present ink sets are used in a recording method utilizing ink compositions. Examples of the recording method utilizing ink compositions include a method of inkjet recording, a method of recording by the use of writing implements such as pens, and some other methods utilizing printing processes. The present ink sets in particular are preferably used in a method of inkjet recording

[Ink Set]

Each of the present ink sets is an ink set including a yellow ink composition and either a magenta ink composition or a cyan ink composition, or both, wherein a coloring agent of the yellow ink composition is one which includes an azo pigment of the general formula (1) illustrated below or its tautomers or their salts or hydrates, the magenta ink composition contains as a coloring agent at least one pigment selected from the following: C.I. Pigment Violet 19, C.I. Pigment Red 122, C.I. Pigment Red 202 and C.I. Pigment Red 209, and the cyan ink composition contains as a coloring agent at least one pigment selected from the following: C.I. Pigment blue 15:1, C.I. Pigment Blue 15:2, C.I. Pigment Blue 15:3, C.I. Pigment Blue 15:4 and C.I. Pigment Blue 15:6.

It is preferable that a black ink composition is further included in the foregoing ink set and carbon black as a coloring agent is incorporated into the black ink composition.

Production of images by combined use of ink compositions containing those pigments can ensure excellent color reproducibility in the images. In addition, the foregoing pigments have high fastness to ozone gas and light even when they are used alone, and the images obtained are therefore superior in fastness.

A detailed description of the invention is presented below.

[Yellow Ink Composition]

Where the ink set of the invention is concerned, the yellow ink composition therein contains an azo pigment represented by the following general formula (1) or its tautomers or their salts or hydrates.

(1):

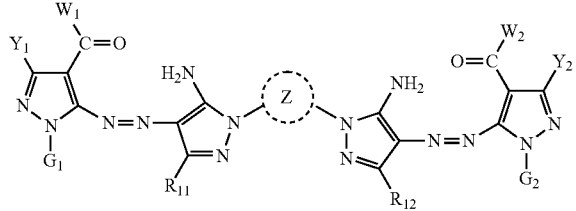

(In the general formula (1), Z represents a 5- to 8-membered nitrogen-containing heterocyclic ring, $Y_1$, $Y_2$, $R_{11}$ and $R_{12}$ each independently represents a hydrogen atom or a substituent, $G_1$ and $G_2$ each independently represents a hydrogen atom, an alkyl group, an aralkyl group, an alkenyl group, an alkynyl group, an aryl group or a heterocyclic group, and $W_1$ and $W_2$ each independently represents an alkoxy group, an amino group, an alkyl group or an aryl group.)

In the general formula (1), Z represents a 5- to 8-membered nitrogen-containing heterocyclic ring, and such a ring may further be fused with another ring. Z is appropriately a 5- to 8-membered heterocyclic group, preferably a substituted or unsubstituted 5- or 6-membered heterocyclic group, especially preferably a 6-membered nitrogen-containing heterocyclic group in which 3 to 10 carbon atoms are present.

Examples of such a heterocyclic group include, to name without any limitation on substitution positions therein, pyridyl, pyrazinyl, pyridazinyl, pyrimidinyl, triazinyl, quinolinyl, isoquinolinyl, quinazolinyl, cinnolinyl, phthalazinyl, quinoxalinyl, pyrrolyl, indolyl, furyl, benzofuryl, thienyl, benzothienyl, pyrazolyl, imidazolyl, benzimidazolyl, triazolyl, oxazolyl, benzoxazolyl, thiazolyl, benzothiazolyl, isothiazolyl, benzisothiazolyl, thiadiazolyl, isooxazolyl, benzisooxazolyl, pyrrolidinyl, piperidinyl, piperazinyl, imidazolidinyl, thiazolinyl and sulfolanyl.

Going into greater detail, examples of a suitable heterocyclic ring which Z represents include, to name without any limitation on substitution positions therein, a pyrrole ring, a pyrazole ring, a triazole ring, an imidazole ring, a thiazole ring, an isothiazole ring, an oxazole ring, an isooxazole ring, a thiadiazole ring, a thiophene ring, a furan ring, a pyridine ring, a pyrimidine ring, an s-triazine ring, a pyridazine ring and a pyrazine ring.

Examples of a heterocyclic ring preferred as Z include a pyridine ring, a pyrimidine ring, an s-triazine ring, a pyridazine ring, a pyrazine ring, a 1,2,4-thiadiazole ring, a 1,3,4-thiadiazole ring and an imidazole ring, and examples of a heterocyclic ring far preferred as Z include a pyridine ring, a pyrimidine ring, an s-triazine ring, a pyridazine ring and a pyrazine ring. Of these rings, a pyrimidine ring and an s-triazine ring in particular are preferred where hue, tinctorial strength and image fastness are concerned, a pyrimidine ring having substituents at 4- and 6-positions and an s-triazine ring having a $C_{1-4}$ alkoxy group at the 2-position are far preferred in terms of hue and image fastness, and a pyrimidine ring having substituents at 4- and 6-positions is the best in terms of good hue and improvement in fastness to light.

By choosing a 6-membered nitrogen-containing heterocyclic ring as Z, a resultant bis-type azo colorant tends to form intramolecular hydrogen bonds between the amino groups and the nitrogen-containing 6-membered heterocyclic ring, and molecular alignment of the colorant becomes easy to control three-dimensionally (so as to allow colorant molecules to align with a specified space and a specified angle, and that in a planar shape). As a consequence, the colorant molecules tend to take on such a structure as to have stable intra- and intermolecular interactions (hydrogen bonding and π-π stacking) between themselves, and they tend to form a more stable molecular alignment structure (e.g. a three-dimensional network). Thus such a bis-type azo colorant is preferred in allowing good hue, high tinctorial strength and high image fastness (e.g. to light, ozone gas, heat and moisture) to be achieved.

In the general formula (1), $W_1$ and $W_2$ each independently represents an alkoxy group, an amino group, an alkyl group or an aryl group.

The alkoxy group represented by $W_1$ and $W_2$ each is preferably a substituted or unsubstituted alkoxy group containing 1 to 30 carbon atoms. Of such alkoxy groups, substituted or unsubstituted alkoxy groups containing from 1 to 8 carbon atoms in particular are preferred to the others, and substituted or unsubstituted alkoxy groups containing from 1 to 4 carbon atoms are preferable by far. Examples of such alkoxy groups include a methoxy group, an ethoxy group, an n-propoxy group, an i-propoxy group, an n-butoxy group, an i-butoxy group, an s-butoxy group, a t-butoxy group, an n-octyloxy group and a 2-methoxyethoxy group.

Examples of the amino group represented by $W_1$ and $W_2$ each include an alkylamino group, an arylamino group and a heterocyclic amino group, preferably an amino group, substituted or unsubstituted alkylamino groups containing from 1 to 30 carbon atoms and substituted or unsubstituted anilino groups containing from 6 to 30 carbon atoms. Of these groups, an amino group, substituted or unsubstituted alkylamino groups containing from 1 to 8 carbon atoms and substituted or unsubstituted aniline groups containing from 6 to 18 carbon atoms are preferred to the others, and an amino group, substituted or unsubstituted alkylamino groups containing from 1 to 4 carbon atoms and substituted or unsubstituted aniline groups containing from 6 to 12 carbon atoms are preferable by far. Examples of such amino groups include amino (—$NH_2$) group, methylamino (—$NHCH_3$) group, dimethylamino [—$N(CH_3)_2$] group, anilino (—NHPh) group, N-methyl-anilino [—$N(CH_3)Ph$] group and diphenylamino [—$N(Ph)_2$] group.

Examples of the alkyl group represented by $W_1$ and $W_2$ each include substituted or unsubstituted, straight-chain, branched or cyclic alkyl groups. Under the category of these alkyl groups are also subsumed cycloalkyl groups, bicycloalkyl groups and alkyl groups having more ring structures such as a tricyclo structure. Alkyl groups in substituents as described below (e.g. alkyl groups in alkoxy or alkylthio groups) also represent the alkyl groups in which the foregoing concept is embodied. To mention in detail, the alkyl group is preferably an alkyl group containing 1 to 30 carbon atoms, with examples including a methyl group, an ethyl group, an n-propyl group, an i-propyl group, an n-butyl group, an i-butyl group, an s-butyl group, a t-butyl group, an n-octyl group, an eicosyl group, a 2-chloroethyl group, a 2-cyanoethyl group and a 2-ethylhexyl group; the cycloalkyl group is preferably a substituted or unsubstituted cycloalkyl group containing 3 to 30 carbon atoms, with examples including a cyclohexyl group, a cyclopentyl group and a 4-n-dodecylcyclohexyl group; and the bicycloalkyl group is preferably a substituted or unsubstituted bicycloalkyl group containing 5 to 30 carbon atoms, namely a univalent group formed by taking one hydrogen atom away from a bicycloalkane containing 5 to 30 carbon atoms, with examples including a bicyclo[1.2.2]heptane-2-yl group and a bicyclo[2.2.2]octane-3-yl group.

The aryl group represented by $W_1$ and $W_2$ each is preferably a substituted or unsubstituted aryl group containing 6 to 30 carbon atoms. Of these aryl groups, substituted or unsubstituted aryl groups containing from 6 to 18 carbon atoms are preferred to the others and substituted or unsubstituted aryl groups containing from 6 to 12 carbon atoms are preferable by far. Examples of such aryl groups include a phenyl group, a p-tolyl group, a naphthyl group, an m-chlorophenyl group and an o-hexadecanoylaminophenyl group.

In further detail, the group preferred independently as $W_1$ and $W_2$ each is preferably an alkoxy group, an amino group or an alkyl group, far preferably an alkoxy group or an amino group, further preferably an alkoxy group containing at most 5 carbon atoms all told, an amino group (—$NH_2$ group) or an alkylamino group containing at most 5 carbon atoms all told, especially preferably an alkoxy group containing at most 3 carbon atoms all told or an alkylamino group containing at most 3 carbon atoms all told. Of these groups, a methoxy group (—$OCH_3$ group) in particular is most desirable.

When $W_1$ and $W_2$ each independently represents an alkoxy group containing at most 5 carbon atoms all told, an amino group or an alkylamino group containing at most 5 carbon atoms all told, strong intramolecular and intermolecular interactions (hydrogen bonding and π-π stacking) tend to take place inside and between colorant molecules, and the molecules tend to form a more stable molecular alignment structure (e.g. three-dimensional network). Thus such groups are preferable in allowing good hue, high fastness (e.g. light resistance, ozone-gas resistance, heat resistance, moisture resistance) to be achieved, and methoxy, ethoxy and amino groups are preferred by far in terms of hue, fastness to light and solvent resistance. Of these groups, a methoxy group is the best in point of improvements in hue and fastness to light.

In the general formula (1), $R_{11}$ and $R_{12}$ each independently represents a hydrogen atom or a substituent. Examples of the substituent when $R_{11}$ and $R_{12}$ each independently represents a substituent include a straight or branched alkyl group containing from 1 to 12 carbon atoms, a straight or branched aralkyl group containing from 7 to 18 carbon atoms, a straight or branched alkenyl group containing from 2 to 12 carbon atoms, a straight or branched alkynyl group containing from 2 to 12 carbon atoms, a straight or branched cycloalkyl group containing from 3 to 12 carbon atoms, a straight or branched cycloalkenyl group containing from 3 to 12 carbon atoms (for example, methyl, ethyl, n-propyl, i-propyl, n-butyl, i-butyl, sec-butyl, t-butyl, 2-ethylhexyl, 2-methylsulfonylethyl, 3-phenoxypropyl, trifluoromethyl or cyclopentyl), a halogen atom (for example, a chlorine atom or a bromine atom), an aryl group (for example, phenyl, 4-t-butylphenyl or 2,4-di-t-amylphenyl), a heterocyclic group (for example, imidazolyl, pyrazolyl, triazolyl, 2-furyl, 2-thienyl, 2-pyrimidinyl or 2-benzothiazolyl), a cyano group, a hydroxyl group, a nitro group, a carboxy group, an amino group, an alkyloxy group (for example, methoxy, ethoxy, 2-methoxyethoxy or 2-methylsulfonylethoxy), an aryloxy group (for example, phenoxy, 2-methylphenoxy, 4-t-butylphenoxy, 3-nitrophenoxy, 3-t-butyloxycarbonylphenoxy, or 3-methoxycarbonylphenyloxy), an acylamino group (for example, acetamido, benzamido or 4-(3-t-butyl-4-hydroxyphenoxy)butanamido), an alkylamino group (for example, methylamino, butylamino, diethylamino or methylbutylamino), an arylamino group (for example, phenylamino or 2-chloroanilino), an ureido group (for example, phenylureido, methylureido or N,N-dibutylureido), a sulfamoylamino group (for example, N,N-dipropylsulfamoylamino), an alkylthio group (for example, methylthio, octylthio or 2-phenoxyethylthio), an arylthio group (for example, phenylthio, 2-butoxy-5-t-octylphenylthio or 2-carboxyphenylthio), an alkyloxycarbonylamino group (for example, methoxycarbonylamino), an alkylsulfonylamino group and an arylsulfonylamino group (for example, methylsulfonylamino, phenylsulfonylamino or p-toluenesulfonylamino), a carbamoyl group (for example, N-ethylcarbamoyl or N,N-dibutylcarbamoyl), a sulfamoyl group (for example, N-ethylsulfamoyl, N,N-dipropylsulfamoyl or N-phenylsulfamoyl), a sulfonyl group (for example, methylsulfonyl, octylsulfonyl, phenylsulfonyl or p-toluenesulfonyl), an alkyloxycarbonyl group (for example, methoxycarbonyl or butyloxycarbonyl), a heterocyclic oxy group (for example, 1-phenyltetrazol-5-oxy or 2-tetrahydropyranyloxy), an azo group (for example, phenylazo, 4-methoxyphenylazo, 4-pivaloylaminophenylazo or 2-hydroxy-4-propanoylphenylazo), an acyloxy group (for example, acetoxy), a carbamoyloxy group (for example, N-methylcarbamoyloxy or N-phenylcarbamoyloxy), a silyloxy group (for example, trimethylsilyloxy or dibutylmethylsilyloxy), an aryloxycarbonylamino group (for example, phenoxycarbonylamino), an imido group (for example, N-succinimido or N-phthalimido), a heterocyclic thio group (for example, 2-benzothiazolylthio, 2,4-di-phenoxy-1,3,5-triazol-6-thio or 2-pyridylthio), a sulfinyl group (for example, 3-phenoxypropylsulfinyl), a phosphonyl group (for example, phenoxyphosphonyl, octyloxyphosphonyl, or phenylsulfonyl), an aryloxycarbonyl group (for example, phenoxycarbonyl), an acyl group (for example, acetyl, 3-phenylpropanoyl, or benzoyl), and an ionic hydrophilic group (for example, a carboxyl group, a sulfo group, a phosphono group, or a quaternary ammonium group).

In the general formula (1), the group preferred independently as $R_{11}$ and $R_{12}$ each is a substituted or unsubstituted acylamino group containing 1 to 8 carbon atoms all told, a substituted or unsubstituted alkyl group containing 1 to 12 carbon atoms all told, a substituted or unsubstituted aryl group containing 6 to 18 carbon atoms all told or a substituted or unsubstituted heterocyclic group containing 4 to 12 carbon atoms all told, preferably a straight-chain or branched alkyl group containing 1 to 18 carbon atoms all told or a substituted or unsubstituted aryl group containing 6 to 18 carbon atoms all told. Of these groups, straight-chain or branched alkyl groups containing from 1 to 8 carbon atoms all told, in particular, are preferred over the others. In further detail, a methyl group, an i-propyl group or a t-butyl group is preferable, and an i-propyl group or a t-butyl group in particular is preferable by far. Above all, a t-butyl group is most suitable.

By choosing a straight-chain or branched alkyl group containing a small number (1 to 4) of carbon atoms all told as $R_{11}$ and $R_{12}$ each, molecular alignment of the colorant becomes easy to control three-dimensionally (so as to allow a specified space and a specified angle between molecules of the colorant). As a consequence, the colorant molecules tend to take on such a structure as to have stable intra- and intermolecular interactions (hydrogen bonding and $\pi$-$\pi$ stacking) between themselves, and they tend to form a more stable molecular alignment structure (e.g. a three-dimensional network). Thus such groups are preferred in allowing good hue, high tinctorial strength and high image fastness (e.g. light resistance, ozone-gas resistance, heat resistance, moisture resistance) to be achieved.

$G_1$ and $G_2$ each independently represents a hydrogen atom, an alkyl group, an aralkyl group, an alkenyl group, an alkynyl group, an aryl group, or a heterocyclic group, particularly preferably represents a hydrogen atom, a methyl group, an ethyl group, a n-propyl group, an i-propyl group, a n-butyl group, an i-butyl group, a sec-butyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, or a pyrazinyl group, more preferably represents a hydrogen atom, a methyl group, a phenyl group, a pyridyl group, a pyrimidinyl group, or a pyrazinyl group. Of these, a straight or branched alkyl group containing a total of from 1 to 8 carbon atoms, a 2-pyridyl group, a 2,6-pyrimidinyl group, and a 2,5-pyrazinyl group are preferred, and an alkyl group containing a total of 3 or less carbon atoms is more preferred. Further, in view of hue and image fastness, a hydrogen atom or a methyl group is preferred, with a methyl group being particularly preferred in view of hue and light fastness.

Examples of the substituent when $Y_1$ and $Y_2$ each independently represents a substituent include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl- or heterocyclic azo group, an imido group, a phosphino group, a phosphinyl group, a phosphinyloxy group, a phosphinylamino group, and a silyl group. Particularly preferred examples of Y include a hydrogen atom, an alkyl group (for example, a methyl group), an aryl group (for example, a phenyl group), a heterocyclic group (for example, a 2-pyridyl group), and an alkylthio group (for example, a methylthio group), and more preferred are a hydrogen atom, a straight or branched alkyl group containing a total of from 1 to 4 carbon atoms, a phenyl group, and a methylthio group. Further, in view of hue and image fastness, a hydrogen atom and a methyl group are preferred, with a hydrogen atom being particularly preferred in view of hue and light fastness.

As substituents in the case where $G_1$, $G_2$, $Y_1$, $Y_2$, $W_1$, $W_2$, $R_{11}$, $R_{12}$, and Z further have a substituent, there can be illustrated the following substituents (hereinafter also referred to "substituent J" in some cases).

Examples of the substituents include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl- or heterocyclic azo group, an imido group, a phosphino group, a phosphinyl group, a phosphinyloxy group, a phosphinylamino group, and a silyl group.

More specifically, examples of the halogen atom include a fluorine atom, a chlorine atom, a bromine atom, and an iodine atom.

Examples of the alkyl group include straight, branched, or cyclic, substituted or unsubstituted alkyl groups, with a cycloalkyl group, a bicycloalkyl group and, further, a tricyclic structure having more cyclic structures being also included. An alkyl group in the substituents to be described hereinafter (for example, an alkyl group in an alkoxy group or an alkylthio group) also represents the alkyl group of the above-described concept. More specifically, the alkyl group is preferably an alkyl group containing from 1 to 30 carbon atoms, and examples thereof include a methyl group, an ethyl group, a n-propyl group, an isopropyl group, a t-butyl group, a n-octyl group, an eicosyl group, a 2-chloroethyl group, a 2-cyanoethyl group, and a 2-ethylhexyl group. The cycloalkyl group is preferably a substituted or unsubstituted cycloalkyl group containing from 3 to 30 carbon atoms, and examples thereof include a cyclohexyl group, a cyclopentyl group, and a 4-n-dodecylcyclohexyl group. The bicycloalkyl group is preferably a substituted or unsubstituted bicycloalkyl group containing from 5 to 30 carbon atoms, i.e., a monovalent group formed by removing one hydrogen atom from a bicycloalkane containing from 5 to 30 carbon atoms, and examples thereof include a bicyclo[1,2,2]heptan-2-yl group and a bicyclo[2,2,2]octan-3-yl group.

Examples of the aralkyl group include substituted or unsubstituted aralkyl groups. Preferred examples of the substituted or unsubstituted aralkyl groups include aralkyl groups containing from 7 to 30 carbon atoms, such as a benzyl group and a 2-phenethyl group.

Examples of the alkenyl group include straight, branched, or cyclic, substituted or unsubstituted alkenyl groups, with a cycloalkenyl group and a bicycloalkenyl group being also included. More specifically, the alkenyl group is preferably a substituted or unsubstituted alkenyl group containing from 2 to 30 carbon atoms, and examples thereof include a vinyl group, an allyl group, a prenyl group, a geranyl group, or an oleyl group. The cycloalkenyl group is preferably a substituted or unsubstituted cycloalkyl group containing from 3 to 30 carbon atoms, i.e., a monovalent group formed by removing one hydrogen atom from a cycloalkene containing from 3 to 30 carbon atoms, and examples thereof include a 2-cyclopentenn-1-yl group and a 2-cyclohexen-1-yl group. The bicycloalenkyl group is a substituted or unsubstituted bicycloalkenyl group, preferably a substituted or unsubstituted bicycloalkenyl group containing from 5 to 30 carbon atoms, i.e., a monovalent group formed by removing one hydrogen atom from a bicycloalkene containing one double bond, and examples thereof include a bicyclo[2,2,1]hept-2-en-1-yl group and a bicyclo[2,2,2]oct-2-en-4-yl group.

The alkynyl group is preferably a substituted or unsubstituted alkynyl group containing from 2 to 30 carbon atoms, such as an ethynyl group, a propargyl group, or a trimethylsilylethynyl group.

The aryl group is preferably a substituted or unsubstituted aryl group containing from 6 to 30 carbon atoms, such as a phenyl group, a p-tolyl group, a naphthyl group, a m-chlorophenyl group, or an o-hexadecanoylaminophenyl group.

The heterocyclic group is preferably a monovalent group formed by removing one hydrogen atom from a 5- or 6-membered, substituted or unsubstituted, aromatic or non-aromatic, heterocyclic compound, more preferably a 5- or 6-membered aromatic heterocyclic group containing from 3 to 30 carbon atoms, such as a 2-furyl group, a 2-thienyl group, a 2-pyrimidinyl group, or a 2-benzothiazolyl group.

The alkoxy group is preferably a substituted or unsubstituted alkoxy group containing from 1 to 30 carbon atoms, and examples thereof include a methoxy group, an ethoxy group, an isopropoxy group, a t-butoxy group, a n-octyloxy group, and a 2-methoxyethoxy group.

The aryloxy group is preferably a substituted or unsubstituted aryloxy group containing from 6 to 30 carbon atoms, and examples thereof include a phenoxy group, a 2-methylphenoxy group, a 4-t-butylphenoxy group, a 3-nitrophenoxy group, and a 2-tetradecanoylaminophenoxy group.

The silyloxy group is preferably a substituted or unsubstituted silyloxy group containing from 0 to 20 carbon atoms, and examples thereof include a trimethylsilyloxy group and a diphenylmethylsilyloxy group.

The heterocyclic oxy group is preferably a substituted or unsubstituted heterocyclic oxy group containing from 2 to 30 carbon atoms, and examples thereof include a 1-phenyltetrazol-5-oxy group and a 2-tetrahydropyranyloxy group.

The acyloxy group is preferably a formyloxy group, a substituted or unsubstituted alkylcarbonyloxy group containing from 2 to 30 carbon atoms, a substituted or unsubstituted arylcarbonyloxy group containing from 6 to 30 carbon atoms, and examples thereof include an acetyloxy group, a pivaloyloxy group, a stearoyloxy group, a benzoyloxy group, and a p-methoxyphenylcarbonyloxy group.

The carbamoyloxy group is preferably a substituted or unsubstituted carbamoyloxy group containing from 1 to 30 carbon atoms, and the examples thereof include an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group.

The alkoxycarbonyloxy group is preferably a substituted or unsubstituted alkoxycarbonyloxy group containing from 2 to 30 carbon atoms, and the examples thereof include a methoxycarbonyloxy group, an ethoxycarbonyloxy group, a t-butoxycarbonyloxy group, and a n-octylcarbonyloxy group.

The aryloxycarbonyloxy group is preferably a substituted or unsubstituted aryloxycarbonyloxy group containing from 7 to 30 carbon atoms, and the examples thereof include a phenoxycarbonyloxy group, a p-methoxyphenoxycarbonyloxy group, and a p-n-hexadecyloxyphenoxycarbonyloxy group.

The amino group includes an alkylamino group, an arylamino group, and a heterocyclic amino group, and is preferably an amino group, a substituted or unsubstituted alkylamino group containing from 1 to 30 carbon atoms, or a substituted or unsubstituted anilino group containing from 6 to 30 carbon atoms. Examples thereof include a methylamino group, a dimethylamino group, an anilino group, an N-methyl-anilino group, and a diphenylamino group.

The acylamino group is preferably a formylamino group, a substituted or unsubstituted alkylcarbonylamino group containing from 1 to 30 carbon atoms, or a substituted or unsubstituted arylcarbonylamino group containing from 6 to 30 carbon atoms. Examples thereof include an acetylamino group, a pivaloylamino group, a lauroylamino group, a benzoylamino group, and a 3,4,5-tri-n-octyloxyphenylcarbonylamino group.

The aminocarbonylamino group is preferably a substituted or unsubstituted aminocarbonylamino group containing from 1 to 30 carbon atoms, and the examples thereof include a carbamoylamino group, an N,N-dimethylaminocarbonylamino group, an N,N-diethylaminocarbonylamino group, and a morpholinocarbonylamino group.

The alkoxycarbonylamino group is preferably a substituted or unsubstituted alkoxycarbonylamino group containing from 2 to 30 carbon atoms, and the examples thereof include a methoxycarbonylamino group, an ethoxycarbonylamino group, a t-butoxycarbonylamino group, a n-octadecyloxycarbonylamino group, and an N-methyl-methoxycarbonylamino group.

The aryloxycarbonylamino group is preferably a substituted or unsubstituted aryloxycarbonylamino group containing from 7 to 30 carbon atoms, and the examples thereof include a phenoxycarbonylamino group, a p-chlorophenoxycarbonylamino group, and a m-n-octyloxyphenoxycarbonylamino group.

The sulfamoylamino group is preferably a substituted or unsubstituted sulfamoylamino group containing from 0 to 30 carbon atoms, and the examples thereof include a sulfamoylamino group, an N,N-dimethylaminosulfonylamino group, and an N-n-octylaminosulfonylamino group.

The alkyl- or aryl-sulfonylamino group is preferably a substituted or unsubstituted alkylsulfonylamino group containing from 1 to 30 carbon atoms, or a substituted or unsubstituted arylsulfonylamino group containing from 6 to 30 carbon atoms, and the examples thereof include a methylsulfonylamino group, a butylsulfonylamino group, a phenylsulfonylamino group, a 2,3,5-trichlorophenylsulfonylamino group, and a p-methylphenylsulfonylamino group.

The alkylthio group is preferably a substituted or unsubstituted alkylthio group containing from 1 to 30 carbon atoms, and the examples thereof include a methylthio group, an ethylthio group, and a n-hexadecylthio group.

The arylthio group is preferably a substituted or unsubstituted arylthio group containing from 6 to 30 carbon atoms, and the examples thereof include a phenylthio group, a p-chlorophenylthio group, and a m-methoxyphenylthio group.

The heterocyclic thio group is preferably a substituted or unsubstituted heterocyclic thio group containing from 2 to 30 carbon atoms, and the examples thereof include a 2-benzothiazolylthio group and a 1-phenyltetrazol-5-ylthio group.

The sulfamoyl group is preferably a substituted or unsubstituted sulfamoyl group containing from 0 to 30 carbon atoms, and the examples thereof include an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N—(N'-phenylcarbamoyl)sulfamoyl group.

The alkyl- or aryl-sulfinyl group is preferably a substituted or unsubstituted alkylsulfinyl group containing from 1 to 30 carbon atoms, or a substituted or unsubstituted arylsulfinyl group containing from 6 to 30 carbon atoms, and the examples thereof include a methylsulfinyl group, an ethylsulfinyl group, a phenylsulfinyl group, and a p-methylphenylsulfinyl group.

The alkyl- or aryl-sulfonyl group is preferably a substituted or unsubstituted alkylsulfonyl group containing from 1 to 30 carbon atoms, or a substituted or unsubstituted arylsulfonyl group containing from 6 to 30 carbon atoms, and the examples thereof include a methylsulfonyl group, an ethylsulfonyl group, a phenylsulfonyl group, and a p-methylphenylsulfonyl group.

The acyl group is preferably a formyl group, a substituted or unsubstituted alkylcarbonyl group containing from 2 to 30 carbon atoms, a substituted or unsubstituted arylcarbonyl group containing from 7 to 30 carbon atoms, or a substituted or unsubstituted heterocyclic carbonyl group containing from 2 to 30 carbon atoms wherein the heterocyclic ring is connected to the carbonyl group via a carbon atom. Examples thereof include an acetyl group, a pivaloyl group, a 2-chloroacetyl group, a stearoyl group, a benzoylamino group, a p-n-octyloxyphenylcarbonyl group, a 2-pyridylcarbonyl group, and a 2-furylcarbonyl group.

The aryloxycarbonyl group is preferably a substituted or unsubstituted aryloxycarbony group containing from 7 to 30 carbon atoms, and the examples thereof include a phenoxycarbonyl group, an o-chlorophenoxycarbonyl group, a m-nitrophenoxycarbonyl group, and a p-t-butylphenoxycarbonyl group.

The alkoxycarbonyl group is preferably a substituted or unsubstituted alkoxycarbony group containing from 2 to 30 carbon atoms, and the examples thereof include a methoxycarbonyl group, an ethoxycarbonyl group, a t-butoxycarbonyl group, and a n-octadecyloxycarbonyl group.

The carbamoyl group is preferably a substituted or unsubstituted carbamoyl group containing from 1 to 30 carbon atoms, and the examples thereof include a carbamoyl group, an N-methylcarbamoyl group, an N,N-dimethylcarbamoyl group, an N,N-di-n-octylcarbamoyl group, and an N-(methylsulfonyl)carbamoyl group.

The aryl or heterocyclic azo group is preferably a substituted or unsubstituted aryl azo group containing from 6 to 30 carbon atoms, or a substituted or unsubstituted heterocyclic azo group containing from 3 to 30 carbon atoms, and the examples thereof include phenylazo, p-chlorophenylazo, and 5-ethylthio-1,3,4-thiadiazol-2-ylazo.

The imido group is preferably an N-succinimido group or an N-phthalimido group.

The phosphino group is preferably a substituted or unsubstituted phosphino group containing from 0 to 30 carbon atoms, and the examples thereof include a dimethylphosphino group, a diphenylphosphino group, and a methylphenoxyphosphino group.

The phosphinyl group is preferably a substituted or unsubstituted phosphinyl group containing from 0 to 30 carbon atoms, and the examples thereof include a phosphinyl group, a dioctyloxyphosphinyl group, and a diethoxyphosphinyl group.

The phosphinyloxy group is preferably a substituted or unsubstituted phosphinyloxy group containing from 0 to 30 carbon atoms, and the examples thereof include a diphenoxyphosphinyloxy group and a dioctyloxyphosphinyloxy group.

The phosphinylamino group is preferably a substituted or unsubstituted phosphinylamino group containing from 0 to 30 carbon atoms, and the examples thereof include a dimethoxyphosphinylamino group and a dimethylaminophosphinylamino group.

The silyl group is preferably a substituted or unsubstituted silyl group containing from 0 to 30 carbon atoms, and the examples thereof include a trimethylsilyl group, a t-butyldimethylsilyl group, and a phenyldimethylsilyl group.

Of the above-described substituents, with those which have a hydrogen atom, the hydrogen atom may be substituted by the above-described substituent. Examples of such substituents include an alkylcarbonylaminosulfonyl group, an arylcarbonylaminosulfonyl group, an alkylsulfonylaminocarbonyl group, and an arylsulfonylaminocarbonyl group. Examples thereof include a methylsulfonylaminocarbonyl group, a p-methylphenylsulfonylaminocarbonyl group, an acetylaminosulfonyl group, and a benzoylaminosulfonyl group.

As to the combination of substituents preferably present in the pigment represented by the general formula (1) according to the invention, the compound at least one of whose various substituents is a group given above as an example of preferred groups is preferable, the compound some more of whose various substituents are groups given above as examples of preferred groups is preferable by far, and the compound all of whose various substituents are groups given above as examples of preferred groups is the best.

Examples of an especially preferred combination of substituents in the azo pigment represented by the general formula (1) according to the invention are combinations including the following (a) to (e).

(a): Z represents a divalent heterocyclic group, which may further be fused with another ring. Z is preferably a 5- or 6-membered heterocyclic group, far preferably a 5- or 6-membered, substituted or unsubstituted, nitrogen-containing heterocyclic group. And a 6-membered, substituted or unsubstituted, nitrogen-containing heterocyclic group is preferred as Z. Examples of such a heterocyclic ring include a pyrrole ring, a pyrazole ring, a triazole ring, an imidazole ring, a thiazole ring, an isothiazole ring, an oxazole ring, an isooxazole ring, a thiadiazole ring, a thiophene ring, a furan ring, a pyridine ring, a pyrimidine ring, a triazine ring, a pyridazine ring and a pyrazine ring. And the heterocyclic groups preferred in particular are 6-membered nitrogen-containing heterocyclic groups containing from 3 to 10 carbon atoms. Examples of a far preferred heterocyclic ring include a pyridine ring, a pyrimidine ring, an s-triazine ring, a pyridazine ring and a pyrazine ring, preferably a pyridine ring, a pyrimidine ring, an s-triazine ring, a pyridazine ring and a pyrazine ring, far preferably a pyrimidine ring and s-triazine ring, especially preferably a pyrimidine ring and an s-triazine ring, and more specifically, a pyrimidine ring having substituents at the 4- and 6-positions and an s-triazine ring having a $C_{1-4}$ alkoxy group at the 2-position. Above all, a pyrimidine ring having substituents at the 4- and 6-positions is the best.

(b): The group represented independently by $W_1$ and $W_2$ each is preferably an alkoxy group (e.g. a methoxy group, an ethoxy group, an i-propoxy group or a t-butoxy group), an amino group (e.g. —$NH_2$ group, a methylamino group, a dimethylamino group or an anilino group), an alkyl group (e.g. a methyl group, an ethyl group, an n-propyl group, an i-propyl group, a t-butyl group or a cyclopropyl group) or an aryl group (e.g. a phenyl group, a p-tolyl group or a naphthyl group). Of these groups, an alkoxy group, an amino group or an alkyl group is preferred, an alkoxy group or an amino group is far preferred, an alkoxy group containing at most 5 carbon atoms all told, an amino group (—$NH_2$ group) or an alkylamino group containing at most 8 carbon atoms all told is further preferred, an alkoxy group containing at most 3 carbon atoms all told (e.g. a methoxy group or an ethoxy group), an amino group (—$NH_2$ group) or an alkylamino group containing at most 6 carbon atoms all told (e.g. —$NHCH_3$ group or —$N(CH_3)_2$ group) is especially preferred. Of these groups, a methoxy group (—$OCH_3$ group), an ethoxy group (—$OC_2H_5$ group) and an amino group (—$NH_2$ group) are preferred to the others. Above all, a methoxy group (—$OCH_3$ group) is the best.

(c): The group represented independently by $R_{11}$ and $R_{12}$ each is preferably a hydrogen atom or a substituent (e.g. a substituted or unsubstituted acylamino group containing 1 to 8 carbon atoms all told, a substituted or unsubstituted alkyl group containing 1 to 12 carbon atoms all told, a substituted or unsubstituted aryl group containing 6 to 18 carbon atoms all told, or a substituted or unsubstituted heterocyclic group containing 4 to 12 carbon atoms all told), far preferably a straight-chain or branched alkyl group containing 1 to 8 carbon atoms all told, further preferably a methyl group, an i-propyl group or a t-butyl group, especially preferably an i-propyl group or a t-butyl group. Above all, a t-butyl group is the best.

(d): Each of $G_1$ and $G_2$ represents a hydrogen atom, an alkyl group, a cycloalkyl group, an aralkyl group, an alkenyl group, an alkynyl group, an aryl group or a heterocyclic group, especially preferably a hydrogen atom, a methyl group, an ethyl group, an n-propyl group, an i-propyl group, a t-butyl group, a cyclopropyl group, a benzyl group, a 2-phenethyl group, a vinyl group, an allyl group, an ethinyl group, a propargyl group, a phenyl group, a p-tolyl group, a naphthyl group, a pyridyl group, a pyrimidinyl group or a pyrazinyl group, further preferably a hydrogen atom, a methyl group, a phenyl group, a pyridyl group, a pyrimidinyl group or a pyrazinyl group. Of these groups, a straight-chain or branched alkyl group containing 1 to 8 carbon atoms all told, a 2-pyridyl group, a 2,6-pyrimidinyl group and a 2,5-pyrazinyl group are preferred to the others, and alkyl groups containing at most 3 carbon atoms all told, in particular, are preferred. Above all, a methyl group is the best.

(e): Each of $Y_1$ and $Y_2$ is a hydrogen atom, an alkyl group (e.g. a methyl group), an aryl group (e.g. a phenyl group), a heterocyclic group (e.g. a 2-pyridyl group) or an alkylthio group (e.g. a methylthio group), preferably a hydrogen atom, a straight-chain or branched alkyl group containing 1 to 4 carbon atoms all told, a phenyl group or a methylthio group, especially preferably a hydrogen atom or a methyl group. Above all, a hydrogen atom is the best.

In the invention, the azo pigment represented by the general formula (1) is preferably an azo pigment represented by the following general formula (2).

(2):

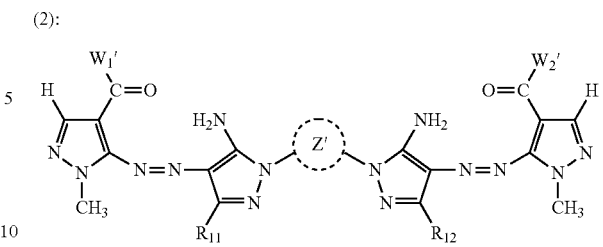

(In the general formula (2), Z' represents a 6-membered nitrogen-containing heterocyclic ring, $R_{11}$ and $R_{12}$ each independently represents a hydrogen atom or a substituent, and $W_1'$ and $W_2'$ each independently represents an alkoxy group containing at most 3 carbon atoms all told, an amino group or an alkylamino group containing at most 6 carbon atoms all told.)

In the general formula (2), Z' represents a 6-membered nitrogen-containing heterocyclic ring, which may further be fused with another ring. Z is preferably a substituted or unsubstituted 6-membered nitrogen-containing heterocyclic group which contains 1 to 3 nitrogen atoms, far preferably a substituted or unsubstituted 6-membered nitrogen-containing heterocyclic group which contains 2 or 3 nitrogen atoms, especially preferably a substituted or unsubstituted pyrimidine, pyrazine, pyridazine or s-triazine ring, to name without limiting its linking sites.

In the general formula (2), $W_1'$ and $W_2'$ each independently represents an alkoxy group containing at most 3 carbon atoms all told, an amino group or an alkylamino group containing at most 6 carbon atoms all told. Suitable examples of the alkoxy group represented by $W_1'$ and $W_2'$ each include a methoxy group (—$OCH_3$), an ethoxy group (—$OC_2H_5$), an n-propoxy group [—$O(CH_2)_2CH_3$] and an i-propoxy group [—$OCH(CH_3)_2$]. Examples of the amino group and the alkylamino group containing at most 6 carbon atoms all told which are suitable as each of $W_1'$ and $W_2'$ include an amino group (—$NH_2$), a methylamino group (—$NHCH_3$), a dimethylamino group [—$N(CH_3)_2$], an ethylamino group (—$NHC_2H_5$), a methylethylamino group [—$N(CH_3)(C_2H_5)$] and a diethylamino group [—$N(C_2H_5)_2$].

In the general formula (2), $R_1$ and $R_2$ each independently represents a hydrogen atom or a substituent. A suitable one represented independently as $R_1$ and $R_2$ each is a hydrogen atom, a substituted or unsubstituted alkyl group containing 1 to 8 carbon atoms all told, a substituted or unsubstituted aryl group containing 6 to 18 carbon atoms all told, or a substituted or unsubstituted heterocyclic group containing 4 to 12 carbon atoms all told, preferably a straight-chain or branched alkyl group containing 1 to 6 carbon atoms all told, far preferably a methyl group, an ethyl group, an n-propyl group, an i-propyl group, an n-butyl group, an i-butyl group, an s-butyl group or a t-butyl group, especially preferably an i-propyl group or a t-butyl group. Above all, a t-butyl group is the best.

As to the combination of substituents preferably present in the pigment represented by the general formula (2) according to the invention, the compound at least one of whose various substituents is a group given above as an example of preferred groups is preferable, the compound some more of whose various substituents are groups given above as examples of preferred groups is preferable by far, and the compound all of whose various substituents are groups given above as examples of preferred groups is the best.

Examples of an especially preferred combination of the substituents in the azo pigment represented by the general formula (2) according to the invention are combinations including the following (a) to (c).

(a): Z' represents a divalent 6-membered nitrogen-containing heterocyclic group, preferably a substituted or unsubstituted 6-membered nitrogen-containing heterocyclic group in which 1 to 3 nitrogen atoms are present, far preferably a substituted or unsubstituted 6-membered nitrogen-containing heterocyclic group in which 2 or 3 nitrogen atoms are present, especially preferably a substituted or unsubstituted pyrimidine, pyrazine, piridazine or s-triazine ring, to name without limiting its linking sites.

(b): $W_1'$ and $W_2'$ each independently represents an alkoxy group containing at most 3 carbon atoms all told, an amino group or an alkylamino group containing at most 6 carbon atoms all told. Suitable examples of the alkoxy group include a methoxy group (—$OCH_3$), an ethoxy group (—$OC_2H_5$), an n-propoxy group [—$O(CH_2)_2CH_3$] and an i-propoxy group [—$OCH(CH_3)_2$]. And suitable examples of the amino group and the alkylamino group containing at most 6 carbon atoms all told include an amino group (—$NH_2$), a methylamino group (—$NHCH_3$), a dimethylamino group [—$N(CH_3)_2$], an ethyloamino group (—$NHC_2H_5$), a methylethylamino group [—$N(CH_3)(C_2H_5)$] and a diethylamino group [—$N(C_2H_5)_2$]. Those preferred as $W_1'$ and $W_2'$ each are a methoxy group (—$OCH_3$), an ethoxy group (—$OC_2H_5$) and an amino group (—$NH_2$). Above all, a methoxy group (—$OCH_3$) is the best.

(c): $R_1$ and $R_2$ each independently represents a hydrogen atom or a substituent, preferably a hydrogen atom, a substituted or unsubstituted alkyl group containing 1 to 8 carbon atoms all told, a substituted or unsubstituted aryl group containing 6 to 18 carbon atoms all told, or a substituted or unsubstituted heterocyclic group containing 4 to 12 carbon atoms all told, far preferably a straight-chain or branched alkyl group containing 1 to 6 carbon atoms all told, further preferably a methyl group, an ethyl group, an n-propyl group, an i-propyl group, an n-butyl group, an i-butyl group, an s-butyl group or a t-butyl group, especially preferably an i-propyl group or a t-butyl group. Above all, a t-butyl group is the best.

In the invention, the azo pigment represented by the foregoing general formula (2) is preferably an azo pigment represented by the following formula (3) or (4).

(3):

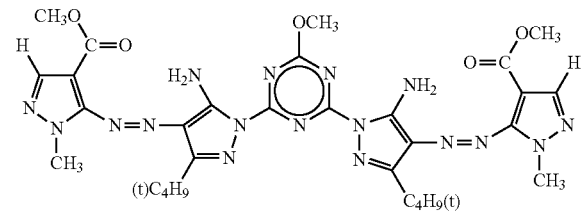

The azo pigment represented by the above formula (3) is preferably an azo pigment having distinctive X-ray diffraction peaks at Bragg angles (2θ±0.2°) of 7.2° and 25.9° in CuKα characteristic X-ray diffraction or a tautomer thereof. The use of the azo pigment represented by the formula (3) allows preparation of an ink set endowed with both satisfactory absorption characteristics and high tinctorial strength.

When a pigment is in a single crystal form, molecules thereof are densely spaced and intermolecular interaction becomes strong. As a consequence, such a pigment can get increases in solvent resistance, thermal stability, light resistance, gas resistance and print density, what's more it can extend the range of color reproduction. Accordingly, it is appropriate for the azo pigment represented by the formula (3) and its tautomers to take a crystal form having distinctive X-ray diffraction peaks at Bragg angles (2θ±0.2°) of 7.2° and 25.9° in CuKα characteristic X-ray diffraction, preferably a crystal form having distinctive X-ray diffraction peaks at Bragg angles of 7.2°, 15.0°, 19.8° and 25.9° in CuKα characteristic X-ray diffraction. Of these crystal forms, the best one is such a crystal form as to have distinctive X-ray diffraction peaks at 7.2°, 8.2°, 10.0°, 13.4°, 15.0°, 19.8° and 25.9° in CuKα characteristic X-ray diffraction.

(4):

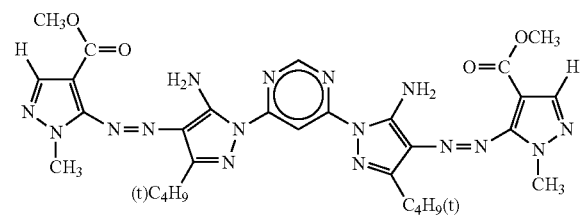

The azo pigment represented by the above formula (4) is preferably an azo pigment having distinctive X-ray diffraction peaks at Bragg angles (2θ±0.2°) of 7.6°, 25.6° and 27.7° in CuKα characteristic X-ray diffraction or a tautomer thereof.

The use of the azo pigment represented by the formula (3) can contribute to both good hue and high image fastness.

Accordingly, it is appropriate for the azo pigment represented by the formula (4) and its tautomers to take a crystal form having distinctive X-ray diffraction peaks at Bragg angles (2θ±0.2°) of 7.6°, 25.6° and 27.7° in CuKα characteristic X-ray diffraction, preferably a crystal form having distinctive X-ray diffraction peaks at Bragg angles (2θ±0.2°) of 7.6°, 13.5°, 25.6° and 27.7° in CuKα characteristic X-ray diffraction. Above all, such a crystal form as to have distinctive X-ray diffraction peaks at 7.6°, 13.5°, 15.9°, 16.9°, 25.6° and 27.7° in CuKα characteristic X-ray diffraction is most suitable.

In the invention, X-ray diffraction measurements of the azo dyes represented by the general formula (1) or (2), or the formulae (3) and (4) can be carried out using a powder X-ray diffraction instrument RINT2500 (made by Rigaku Corporation) in conformance with Japanese Industrial Standards JISK0131 (common rule on X-ray diffraction analysis).

As to primary particles of the azo pigment represented by the general formula (1) or (2), or the formula (3) or (4), it is preferable that the length of each primary particle in the longer axis direction is, when determined by observation under a transmission microscope, from 0.01 μm to 30 μm, preferably from 0.02 μm to 10 μm, especially preferably from 0.03 μm to 1 μm.

When the length of each primary particle in the longer direction is 0.01 μm or above as determined by observation under a transmission microscope, the azo pigment can more certainly develop fastness to light and ozone and dispersibility in the case of preparing a dispersion thereof. On the other hand, when the length in the longer direction is 30 μm or below, the pigment can resist lapsing into an unduly-dispersed state (a state that primary particles are broken) at the occasion of the attainment of an intended volume-average particle size by dispersion, and active faces resist being exposed at the particle surfaces. Accordingly, such pigment particles are resistant to flocculation, and they can more certainly develop storage stability in dispersions thereof.

As long as the length of its primary particles in the longer direction is within the range specified above, the pigment shows high fastness to light and ozone, and a dispersion thereof is preferable because of its excellence in storage stability.

Examples of the azo pigment represented by the general formula (1) or (2) are shown below. However, azo compounds usable as azo pigments in the invention should not be construed as being limited to the following examples. In addition, the structures of the following compounds are shown in their respective extreme structural formulae of several tautomers allowed from the viewpoint of chemical structures, and it is needless to say that the structure of each compound may be a tautomer structure other than the illustrated one.

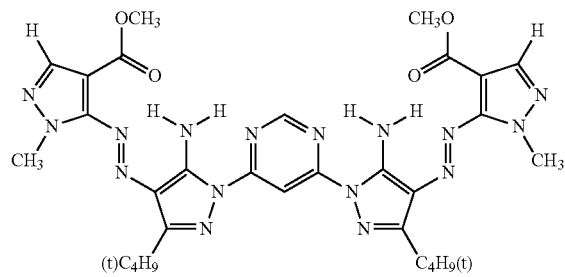

Fig.-1

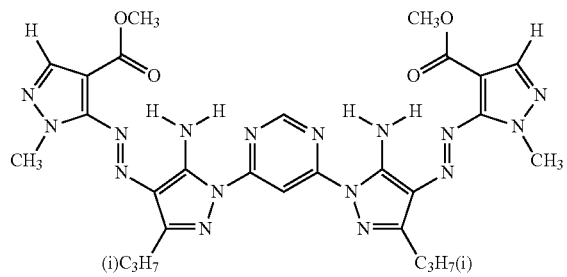

Fig.-2

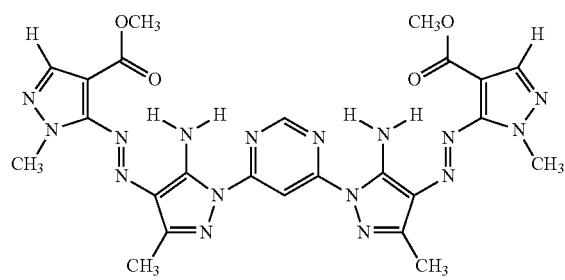

Fig.-3

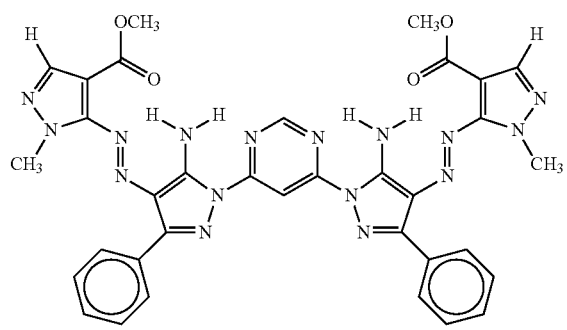

Fig.-4

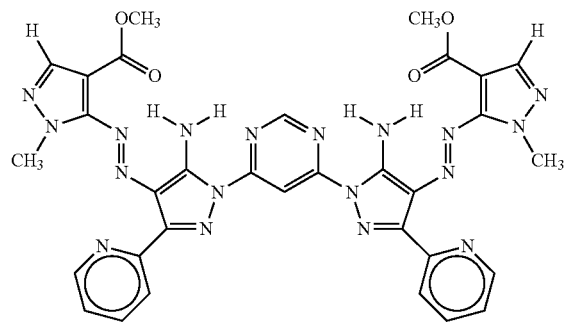

Fig.-5

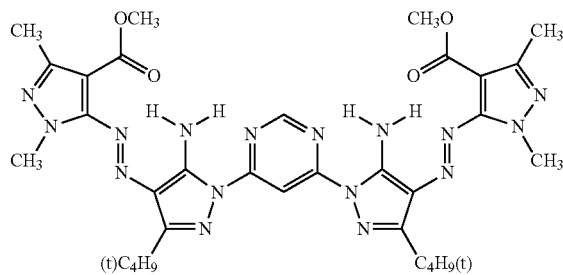

Fig.-6

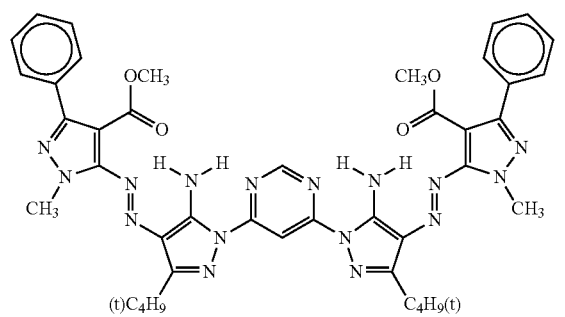

Fig.-7

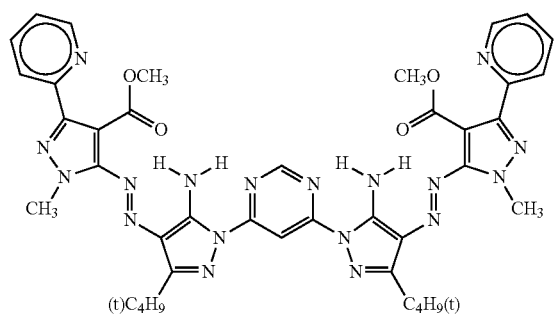

Fig.-8

-continued

-continued

-continued
Pig.-29
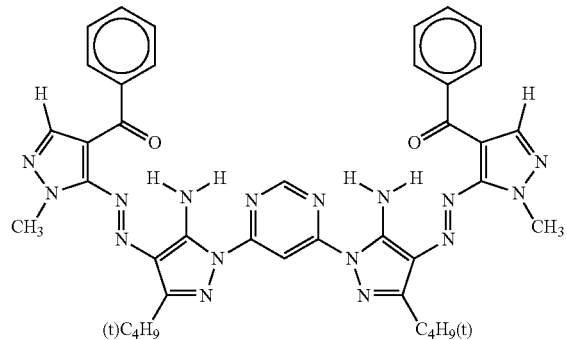
Pig.-30
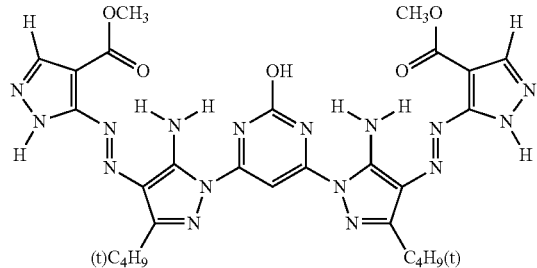
Pig.-31
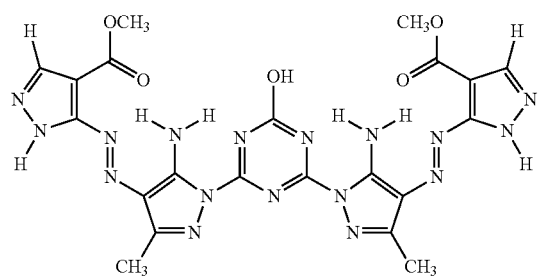
Pig.-32
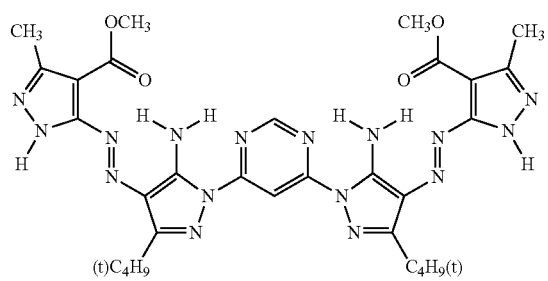
Pig.-33
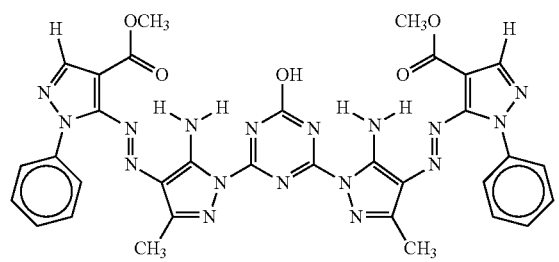
Pig.-34
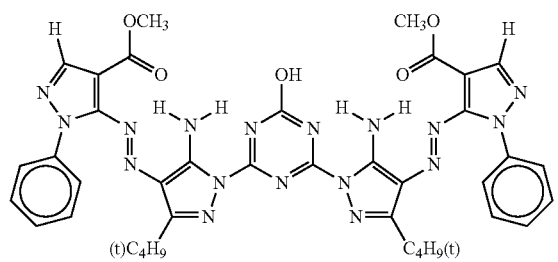
Pig.-35
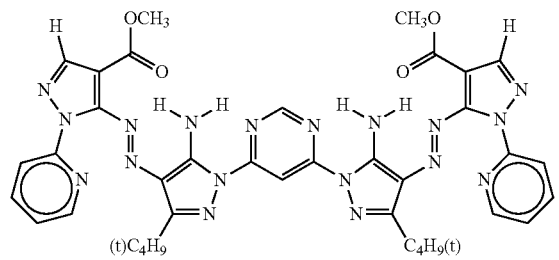
Pig.-36
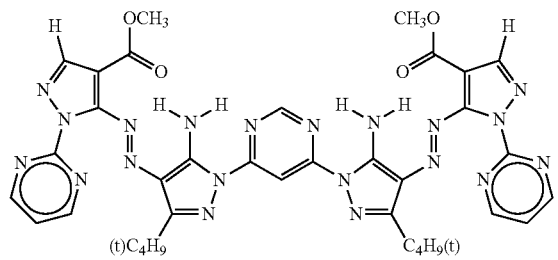
Pig.-37
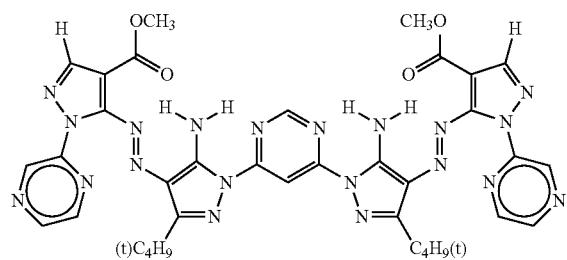

-continued

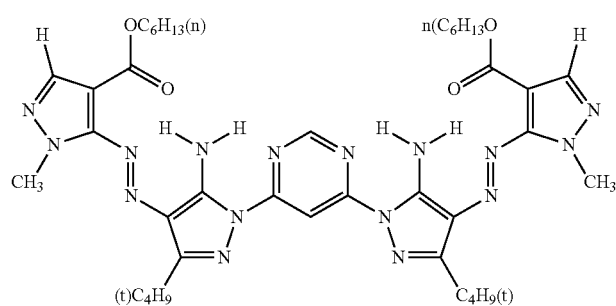

Pig.-46

As to the azo pigment represented by each of the above formulae (1) to (4), a plurality of tautomers are thought to be in existence.

In addition, it is appropriate for the azo pigment represented by each of the formulae (1) to (4) to have substituents forming an intramolecular hydrogen bond or an intramolecular crossing hydrogen bond. And it is preferable that the azo pigment has substituents forming at least one or more than one intramolecular crossing hydrogen bond, preferably at least three or more than three intramolecular hydrogen bonds. Such a case as to have substituents forming at least three or more than three intramolecular hydrogen bonds at least two of which are intramolecular crossing hydrogen bonds is especially preferred.

The pigments of the invention represented by the general formulae (1) to (4) may have a chemical structure represented by the general formulae (1) to (4) or may be the tautomers thereof, and may be the pigments of any crystal form called polymorphic form.

Polymorphism means that crystals having the same chemical composition can be different from each other in the conformation of building block (molecules or ions) in the crystal. Chemical and physical properties of the pigments are decided by the crystal structure, and polymorphic forms of the same pigment can be discriminated from each other by rheology, color, and other color characteristics. Also, different polymorphic forms can be confirmed by X-Ray Diffraction (results of powder X-ray diffractometry) or by X-Ray Analysis (results of X-ray analysis of crystal structure).

In the case where the pigments of the invention represented by the general formulae (1) to (4) exhibit polymorphism, they may be in any polymorphic forms and may be a mixture of two or more polymorphic forms. However, pigments wherein a single crystal form is predominant are preferred. That is, pigments not contaminated with polymorphic form crystals are preferred. The content of the azo pigment having a single crystal form is from 70% to 100%, preferably from 80% to 100%, more preferably from 90% to 100%, still more preferably from 95% to 100%, particularly preferably 100%, based on the entire azo pigment. When the azo pigment contains a single crystal form azo pigment as a major component, regularity of alignment of the pigment molecules is improved, and the intramolecular and intermolecular mutual action is enhanced, thus a high-level three-dimensional network being easily formed. As a result, performances required for pigments, such as hue, light fastness, humidity fastness, fastness to an oxidative gas, and solvent resistance, are improved, thus the above-described content being preferred.

The mixing ratio of polymorphic forms in the azo pigment can be confirmed from values obtained by physicochemical measurement such as X-ray crystal structure analysis of single crystal, powder X-ray diffractometry (XRD), microscopic photography of the crystals (TEM), or IR (KBr method).

With those which have acid groups among the azo pigments of the invention represented by the general formulae (1) and (2), part or all of the acid groups may be in a salt form, or the pigment may be a mixture of a salt type pigment and a free acid type pigment. Examples of the salt type include salts of an alkali metal such as Na, Li, or K, salts of ammonium optionally substituted by an alkyl group or a hydroxyalkyl group, and salts of an organic amine. Examples of the organic amine include a lower alkyl amine, a hydroxyl-substituted lower alkyl amine, a carboxy-substituted lower alkyl amine, and a polyamine having from 2 to 10 alkyleneimine units containing from 2 to 4 carbon atoms. With these salt type pigments, they are not necessarily limited to one as to kind, but may be in a mixture of two or more thereof.

Further, as to the structure of the pigment to be used in the invention, in the case where plural acid groups exist in one molecule, the plural acid groups may be of a salt type or an acid type, and may be different from each other.

The azo pigments represented by the general formula (1) may be hydrates which contain water molecules within the crystal.

Next, one example of a process for producing the azo pigment represented by the above general formula (1) will be described below. For example, a heterocyclic amine represented by the following general formula (A) is diazotized under acidic condition, then subjected to a coupling reaction with a compound represented by the following general formula (B), and subjected to an after-treatment in a conventional manner to thereby produce the azo pigment represented by the general formula (1).

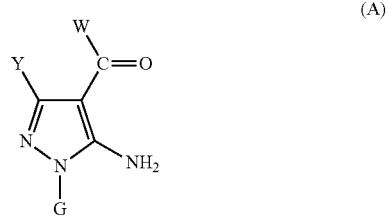

(A)

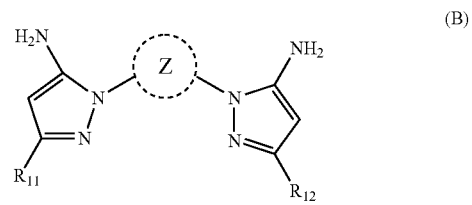

(B)

(In the general formulae (A) and (B), W, Y, G, $R_{11}$, $R_{12}$ and Z have the same meanings as $W_1$ or $W_2$, $Y_1$ or $Y_2$, $G_1$ or $G_2$, $R_{11}$, $R_{12}$ and Z in the general formula (1), respectively.)

The heterocyclic amines represented by the general formula (A) can generally be produced by a known conventional process, for example, a process described in *Helv. Chim. Acta.* 41, 1958, 1052-1056 or in *Helv. Chim. Acta.* 42, 1959, 349-352, or a similar process.

The compounds represented by the general formula (B) can generally be produced by a process described in WO 06/082669 or in JP-A-2006-57076, or a similar process.

[Process of Preparing Diazonium Salt of Heterocyclic Amine]

Preparation of a diazonium salt from the heterocyclic amine (diazo component) represented by the formula (A) and coupling reaction between the diazonium salt and the compound represented by the formula (B) (coupling component) can be carried out according to conventional methods.

To the preparation of a diazonium salt from the heterocyclic amine represented by the formula (A) can be applied a conventional method of preparing a diazonium salt by using a nitrosonium ion source such as nitrous salt, a nitrite or nitrosylsulfuric acid, in a reaction medium containing e.g. an acid (such as hydrochloric acid, sulfuric acid, phosphoric acid, acetic acid, propionic acid, methanesulfonic acid or trifluoromethanesulfonic acid).

Examples of an acid preferably used therein include acetic acid, propionic acid, methanesulfonic acid, phosphoric acid, sulfuric acid and various combinations of these acids. Among them, the combined use of phosphoric acid or acetic acid and sulfuric acid, the combined use of acetic acid and propionic acid, and the combined use of acetic acid, propionic acid and sulfuric acid are preferred over the others, and the combined use of acetic acid and propionic acid and the combined use of acetic acid, propionic acid and sulfuric acid are especially preferred.

Suitable examples of the reaction medium (solvent) include an organic acid and an inorganic acid, especially preferably phosphoric acid, sulfuric acid, acetic acid, propionic acid and methanesulfonic acid. Among these acids, acetic acid, propionic acid and a combination of both are preferred over the others.

Examples of a suitable nitrosonium ion source include nitrite esters, nitrites and nitrosylsulfuric acid. Among them, sodium nitrite, potassium nitrite, isoamyl nitrite and nitrosylsulfuric acid (e.g. a sulfuric acid solution of $ONHSO_4$) are preferred over the others, and isoamyl nitrite and nitrosylsulfuric acid (e.g. a 40 mass % to 50 mass % sulfuric acid solution of $ONHSO_4$) are especially preferred. Above all, the use of nitrosylsulfuric acid in a reaction medium containing such a preferred acid as mentioned above allows the diazonium salt to be prepared with stability and efficiency.

The solvent usage relative to the diazo component of the formula (A) is preferably from 0.5 to 50 times by mass, far preferably from 1 to 20 times by mass, especially preferably from 3 to 15 times by mass.

In the invention, the diazo component represented by the formula (A) may be in a state of being dispersed in a solvent, or it may be in a state of being dissolved in a solvent, depending on what nature the diazo component has,—whichever state may be chosen.

The nitrosonium ion source usage relative to the diazo component is preferably from 0.95 to 5.0 equivalents, far preferably from 1.00 to 3.00 equivalents, especially preferably from 1.00 to 1.10 equivalents.

The reaction temperature is preferably from −15° C. to 40° C., far preferably from −5° C. to 35° C., further preferably from 0° C. to 30° C. Adoption of reaction temperatures below −15° C. is not economical because the reaction speed becomes considerably slow and the time required for the synthesis becomes markedly long. On the other hand, cases where the synthesis is carried out at temperatures beyond 40° C. are undesirable because by-products of the synthesis increase in the amount yielded.

The reaction time is preferably from 30 minutes to 300 minutes, far preferably from 30 minutes to 200 minutes, further preferably from 30 minutes to 150 minutes.

[Coupling Reaction Process]

Although a process of coupling reaction can be done in an acidic reaction medium to in a basic reaction medium, the process for the azo pigment according to the invention is preferably performed in an acidic to neutral reaction medium, and the performance of the process in an acidic reaction medium in particular has an advantage in allowing decomposition of the diazonium salt to be inhibited and the azo pigment to be derived with efficiency.

Suitable examples of a reaction medium (solvent) usable in such a process include organic acids, inorganic acids and organic solvents. Of these media, organic solvents, specifically organic solvents of the kind which cause no liquid-liquid separation phenomenon at the time of reaction and show a state of homogeneous solution together with another solvent, are preferred over the others. Examples of organic solvents of such a kind include alcohol series organic solvents such as methanol, ethanol, propanol, isopropanol, butanol, t-butyl alcohol and amyl alcohol, ketone series organic solvents such as acetone and methyl ethyl ketone, diol series organic solvents such as ethylene glycol, diethylene glycol, triethylene glycol, propylene glycol, dipropylene glycol and 1,3-propanediol, ether series organic solvents such as ethylene glycol monomethyl ether, ethylene glycol monoethyl ether and ethylene glycol diethyl ether, tetrahydrofuran, dioxane and acetonitrile. Two or more of these solvents may be used in the form of a mixed solution.

Suitable organic solvents are those having polarity parameter (ET) values of 40 or above. Among such organic solvents, glycol solvents having two or more hydroxyl group per solvent molecule, alcohol solvents each containing at most three carbon atoms and ketone solvents each containing at most 5 carbon atoms all told are preferable, and alcohol solvents each containing at most 2 carbon atoms (e.g. methanol, ethylene glycol) and ketone solvents each containing at most 4 carbon atoms all told (e.g. acetone, methyl ethyl ketone) are preferable by far. In addition, it is also preferable that two or more of those solvents are used in the form of a mixture.

The solvent usage is preferably from 1 to 10 times by mass, far preferably from 1 to 50 times by mass, further preferably 2 to 30 times by mass, that of the coupling component represented by the general formula (B).

In the invention, the coupling component represented by the general formula (B) may be in a state of being dispersed in a solvent, or it may be in a state of being dissolved in a solvent, depending on what nature the coupling component has,—whichever state may be chosen.

As to the coupling component usage, the diazo component usage is preferably from 0.95 to 5.0 equivalents, far preferably from 1.00 to 3.00 equivalents, especially preferably from 1.00 to 1.50 equivalents, per azo coupling site.

The reaction temperature is preferably from −30° C. to 30° C., far preferably from −15° C. to 10° C., further preferably from −10° C. to 5° C. Adoption of reaction temperatures below −30° C. is not economical because the reaction speed becomes considerably slow and the time required for the synthesis becomes markedly long. On the other hand, cases where the synthesis is carried out at temperatures beyond 30° C. are undesirable because by-products of the synthesis increase in the amount yielded.

The reaction time is preferably from 30 minutes to 300 minutes, far preferably from 30 minutes to 200 minutes, further preferably from 30 minutes to 150 minutes.

In the manufacturing method of the azo pigment composition according to the invention, the product (crude azo pigment) obtained by those reactions is treated in accordance with a post-treatment method for usual organic synthesis reactions, and made available for use after or without undergoing purification.

More specifically, the substance liberated from the reaction system is made available for use e.g. without undergoing purification, or after purifying operations such as recrystallization and salt making have been carried out alone or in combination.

On the other hand, the substance liberated by distilling off or not distilling off the reaction solvent after conclusion of the reaction, pouring the reaction solution into water or on ice and further neutralizing or not neutralizing the resultant solution, or the substance extracted with an organic solvent or an aqueous solution after conclusion of the reaction is also available for use without undergoing purification or after purifying operations such as recrystallization, crystallization and salt making have been carried out alone or in combination.

As to methods for manufacturing the azo pigment composition according to the invention, further detailed description thereof is given below.

A manufacturing method of the azo pigment composition according to the invention is characterized in that coupling reaction between the diazonium compound obtained by converting a heterocyclic amine compound represented by the general formula (A) to its diazonium form and a compound represented by the general formula (B) is carried out after the compound represented by the general formula (B) has been dissolved in an organic solvent.

The reaction for preparing the diazonium salt of a heterocyclic amine represented by the above formula (A) can be performed by allowing the heterocyclic amine to react with a reagent, such as sodium nitrite or nitrosylsulfuric acid, dissolved in an acidic solvent, such as sulfuric acid, phosphoric acid or acetic acid, at a temperature of 15° C. or below for a time period of the order of 10 minutes to 6 hours. The coupling reaction is preferably carried out by allowing the diazonium salt prepared by the above method to react with the compound represented by the formula (B) at a temperature of 40° C. or below, preferably 15° C. or below, for a time period of the order of 10 minutes to 12 hours.

Control of the tautomerism and/or crystal polymorphism can be performed by appropriately selecting manufacturing conditions at the time of the coupling reaction. For manufacturing a pigment composition predominantly containing a compound which is represented by the general formula (2) in the invention and has a preferred crystal form showing distinctive X-ray diffraction peaks at 7.2° and 25.9° or a compound which is represented by the formula (3) in the invention and has a preferred crystal form showing distinctive X-ray diffraction peaks at 7.6°, 25.6° and 27.7°, it is appropriate to adopt e.g. the above-mentioned method of carrying out the coupling reaction after once dissolving the compound represented by the formula (B) in an organic solvent. Examples of the organic solvent usable therein include an alcohol solvent and a ketone solvent. Examples of the alcohol solvent include methanol, ethanol, isopropanol, ethylene glycol and diethylene glycol. Among them, methanol is preferred over the others. Examples of the ketone solvent include acetone, methyl ethyl ketone and cyclohexanone. Among them, acetone is preferred over the others.

Another manufacturing method of the azo pigment composition according to the invention is characterized in that coupling reaction between the diazonium compound obtained by converting a heterocyclic amine compound represented by the above formula (A) to its diazonium form and a compound represented by the above formula (B) is carried out in the presence of a polar aprotic solvent.

By the use of the method of carrying out the coupling reaction in the presence of a polar aprotic solvent, it also becomes possible to manufacture efficiently a pigment composition predominantly containing a compound which is represented by the general formula (2) and has a crystal form showing distinctive X-ray diffraction peaks at 7.2° and 25.9° or a compound which is represented by the formula (3) and has a preferred crystal form showing distinctive X-ray diffraction peaks at 7.6°, 25.6° and 27.7°. Examples of the polar aprotic solvent include N,N-dimethylformamide, N,N-dimethylacetamide, N-methyl-2-pyrrolidone, dimethyl sulfoxide, tetramethylurea, acetone, methyl ethyl ketone, acetonitrile and mixtures of two or more of these solvents. Of these solvents, acetone, methyl ethyl ketone, N—N-dimethylacetamide and acetonitrile are especially preferable. When such a solvent as mentioned above is used, compounds represented by the general formula (2) or (3) may or needn't be completely dissolved in the solvent.

In response to their uses, the compounds obtained by the manufacturing methods may or needn't undergo pH adjustment by addition of a base as a purification process. When the pH adjustment is carried out, the suitable pH is from 4 to 10, preferably from 5 to 8, especially preferably from 5.5 to 7.

Cases where the pH is 10 or below cause neither discoloration, nor fading, nor increase in tinge of red in terms of hue, and they are therefore preferable from the viewpoint of ensuring hue of consistent quality. And cases where the pH is 4 or above are preferable because they resist causing such a problem as to corrode nozzles when the azo pigment compositions prepared are used as inkjet recording ink.

In accordance with the manufacturing methods, the compounds represented by the formulae (1), (2) and (3) each are obtained as crude azo pigments (crude).

The invention also relates to the azo pigment compositions made by the manufacturing methods described above.

[Post-Treatment Process]

In the manufacturing methods usable in the invention, it is appropriate that a process of carrying out post-treatment be included. Examples of a method for the post-treatment process include grinding treatments such as solvent-salt milling, salt milling, dry milling, solvent milling and acid pasting, a process of controlling pigment particles by e.g. solvent heating treatment, and surface treatment processes using e.g. a resin, a surfactant and a dispersant.

As to the post-treatment for the compound represented by the general formula (1), (2) and (3) each in accordance with the invention, it is preferable to carry out either solvent heating treatment or solvent-salt milling, or both. For instance, azo pigments having intended crystal forms can be manufactured through reflux in dehydrated organic solvent.

Examples of a solvent usable in solvent heating treatment include water, aromatic hydrocarbon series solvents such as toluene and xylene, halogenated hydrocarbon series solvents such as chlorobenzene and o-dichlorobenzene, alcohol series solvents such as isopropanol and isobutanol, polar aprotic organic solvents such as N,N-dimethylformamide, N,N-dimethylacetamide, N-methyl-2-pyrrolidone, acetone, methyl ethyl ketone and acetonitrile, glacial acetic acid, pyridine and mixtures of two or more of the solvents given above. To each of the solvents as given above, an inorganic or organic acid, or a salt thereof may further be added.

The temperature in the solvent heating treatment, though differs according to the size of primary particles of the intended pigment, is preferably from 40° C. to 150° C., far preferably from 60° C. to 100° C. And the treatment time is preferably from 30 minutes to 24 hours.

As the solvent-salt milling, there is illustrated, for example, the procedure wherein a crude azo pigment, an inorganic salt, and an organic solvent which does not dissolve them are placed in a kneader, and knead-milling of the mixture is conducted therein. As the inorganic salt, water-soluble inorganic salts can preferably be used. For example, inorganic salts such as sodium chloride, potassium chloride, and sodium sulfate are preferably used. Also, it is more preferred to use inorganic salts having an average particle size of from 0.5 to 50 μm. The amount of the inorganic salt to be used is preferably a 3- to 20-fold amount by weight, more preferably a 5- to 15-fold amount by weight, based on the crude pigment. As the organic solvent, water-soluble organic solvents can preferably be used and, since the solvent becomes easily vaporizable due to an increase in temperature upon kneading, high-boiling solvents are preferred in view of safety. Examples of such organic solvents include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and a mixture thereof. The amount of the water-soluble organic solvent to be used is preferably a 0.1- to 5-fold amount by weight based on the crude azo pigment. The kneading temperature is preferably from 20 to 130° C., particularly preferably from 40 to 110° C. As a kneader, there can be used, for example, a kneader or a mix muller.

[Pigment Dispersion]

The pigment dispersion used in the invention is characterized by containing at least one of the azo pigments represented by the general formula (1) according to the invention or at least one of its tautomers or at least one of their salts or hydrates, preferably by incorporating any of the azo pigments represented by the general formula (2) or the formula (3) according to the invention. Thus the pigment dispersion according to the invention comes to have excellent hue characteristics, durability and dispersion stability.

The pigment dispersion used in the invention, though may be aqueous or may be nonaqueous, is preferably an aqueous pigment dispersion. As an aqueous liquid into which the pigment is dispersed for preparing the aqueous pigment dispersion used in the invention, a mixture of water as a main component and a hydrophilic organic solvent added as required can be used. Examples of the hydrophilic organic solvent include alcohol compounds such as methanol, ethanol, propanol, isopropanol, butanol, isobutanol, sec-butanol, t-butanol, pentanol, hexanol, cyclohexanol and benzyl alcohol, polyhydric alcohol compounds such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol, glycol derivatives such as ethylene glycol monomethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether and ethylene glycol monophenyl ether, amines such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine, formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone.

The aqueous pigment dispersion used in the invention may further contain a hydrophilic resin. Examples of the hydrophilic resin include water-soluble resins which can be dissolved in water, water-dispersible resins which can be dispersed into water, colloidal-dispersion resins and mixtures of two or more of these resins. More specifically, acrylic resins, styrene-acrylic resins, polyester resins, polyamide resins, polyurethane resins, fluorocarbon resins and the like are examples of the hydrophilic resin.

For the purpose of enhancing dispersibility of the pigment and image quality, a surfactant and a dispersant may further be used. Examples of the surfactant include anionic, nonionic, cationic and amphoteric surfactants, and though any of these surfactants may be used, the use of an anionic or nonionic surfactant is preferred. Examples of the anionic surfactant include salts of fatty acids, alkylsulfuric acid ester salts, alkylbenzenesulfonates, alkylnaphthalenesulfonates, dialkylsulfosuccinates, alkyl diaryl ether disulfonates, alkyl phosphates, polyoxyethylene alkyl ether sulfates, polyoxyethylene alkyl aryl ether sulfates, naphthalenesulfonic acid-formaldehyde condensate, polyoxyethylene alkylphosphoric acid ester salts and glycerol borate fatty acid esters, polyoxyethylene glycerol fatty acid esters.

Examples of the nonionic surfactant include polyoxyethylene alkyl ethers, polyoxyethylene alkyl aryl ethers, polyoxyethyleneoxypropylene block copolymer, sorbitane fatty acid esters, polyoxyethylene sorbitane fatty acid esters, polyoxyethylene sorbitol fatty acid esters, glycerin fatty acid esters, polyoxyethylene fatty acid esters, fluorine-containing surfactants and silicon-containing surfactants.

The nonaqueous pigment dispersion is a dispersion prepared by dispersing the pigment represented by any of the formulae (1), (2) and (3) into a nonaqueous vehicle. Examples of a resin usable as the nonaqueous vehicle include petroleum resin, casein, shellac, rosin-modified maleic acid resin, rosin-modified phenol resin, nitrocellulose, cellulose acetate butyrate, cyclized rubber, chlorinated rubber, oxidized rubber, rubber hydrochloride, phenol resin, alkyd resin, polyester resin, unsaturated polyester resin, amino resin, epoxy resin, vinyl resin, polyvinyl chloride, vinyl chloride-vinyl acetate copolymer, acrylic resin, methacrylic resin, polyurethane resin, silicone resin, fluoropolymer, drying oil, synthetic drying oil, styrene/maleic acid resin, styrene/acrylic resin, polyamide resin, polyimide resin, benzoguanamine resin, melamine resin, urea resin, chlorinated polypropylene, butyral resin and vinylidene chloride resin. As the nonaqueous vehicle, light-curable resins may also be used.

Examples of a solvent used for the nonaqueous vehicle include aromatic solvents such as toluene, xylene and methoxybenzene, acetate solvents such as ethyl acetate, butyl acetate, propylene glycol monomethyl ether acetate and propylene glycol monoethyl ether acetate, propionate solvents such as ethoxyethyl propionate, alcohol solvents such as methanol and ethanol, ether solvents such as butyl cellosolve, propylene glycol monomethyl ether, diethylene glycol ethyl ether and diethylene glycol dimethyl ether, ketone solvents such as methyl ethyl ketone, methyl isobutyl ketone and cyclohexanone, aliphatic hydrocarbon solvents such as hexane, nitrogen-containing solvents such as N,N-dimethylformamide, γ-butyrolactam, N-methyl-2-pyrrolidone, aniline and pyridine, lactone solvents such as γ-butyrolactone, and carbamic acid esters such as 48:52 mixture of methyl carbamate and ethyl carbamate.

The pigment dispersion used in the invention can be prepared by dispersing the azo pigment into an aqueous or non-aqueous medium by use of a dispersing device. Examples of a dispersing device usable therein include a simple stirrer, an impeller agitation system, an in-line agitation system, a mill system (e.g. a colloid mill, a ball mill, a sand mill, a beads mill, an attrition mill, a roll mill, a jet mill, a paint shaker, an agitator mill), an ultrasonic system and a high-pressure emulsion dispersion system (a high-pressure homogenizer, e.g., a Gaulin homogenizer, a microfluidizer and DeBEE 2000 which are all commercially available).

In the invention, it is appropriate for the volume-average particle size of each pigment to be from 0.01 μm to 0.2 μm. Additionally, the term volume-average particle size of pigment particles refers to the particle size of pigment itself or, when an additive such as a dispersant is stuck to a color material, the size of the particles to which the additive is stuck. The apparatus used for measuring the volume-average particle size of each pigment in the invention is a Nanotrac UPA particle size analyzer (UPA-EX 150, made by NIKKISO CO., LTD.). The measurement is made on a 3 ml of pigment dispersion put in a measuring cell in accordance with the prescribed measuring method. As to the parameters input to immediate presentation, the viscosity of ink is used as the viscosity, and the density of pigment is used as the density of dispersed particles.

The volume-average particle size is preferably from 20 nm to 200 nm, far preferably from 30 nm to 180 nm. Above all, the range of 30 nm to 150 nm is the best. When the volume-average particle size of the particles in a pigment dispersion is below 20 nm, there occur cases where the pigment dispersion cannot attain storage stability. On the other hand, the volume-average particle sizes beyond 250 nm cause reductions in optical density in some cases.

The suitable concentration of the pigment in a pigment dispersion according to the invention is in a range of 1 mass % to 35 mass %, preferably in a range of 2 mass % to 25 mass %. When the concentration is below 1 mass %, there are cases where sufficient image density cannot be achieved when the pigment dispersion is used alone as ink. When the concentration is beyond 35 mass %, there are cases where reduction in dispersion stability occurs.

In the invention, it is appropriate that the amount of a coloring agent added be from 1 mass % to 5 mass %, preferably from 1.5 mass % to 4 mass %, with respect to each ink composition.

It is desired that each of the ink compositions according to the invention contain at least either a dispersant or a penetrant, or both.

According to a suitable embodiment of the invention, it is appropriate that the amount of carbon black added be 3.0 mass % or below, preferably 2.5 mass % or below, far preferably 2.0 mass % or below, with respect to the black ink composition. Reduction in amount of carbon black added allows enhancement of black color reproducibility when color images are printed on a recording material by using such a black ink composition together with other ink compositions.

According to a suitable embodiment of the invention, it is appropriate that each pigment be added to ink in the form of a pigment dispersion prepared by dispersing the pigment into an aqueous medium with the aid of a dispersant or surfactant. As a suitable dispersant, a dispersant usually used in preparing a pigment dispersion, such as a polymeric dispersant, can be used. And a vinyl polymer is preferably used as the dispersant.

[Vinyl Polymer]

A vinyl polymer used in the invention contains a hydrophobic structural unit (a) represented by the following general formula (AI) and a hydrophilic structural unit (c).

General formula (AI):

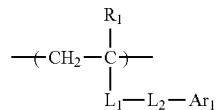

(In the general formula (AI), $R_1$ represents a hydrogen atom, a methyl group or a halogen atom, $L_1$ represents —COO—, —OCO—, —CONR$_2$—, —O— or a phenylene group which may or needn't have a substituent, $R_2$ represents a hydrogen atom or an alkyl group, $L_2$ represents a single bond or a divalent linkage group, and $Ar_1$ represents a univalent group derived from an aromatic hydrocarbon ring.)

Hydrophobic Structural Unit (a) Represented by General Formula (AI):

The suitable content of the hydrophobic structural unit (a) represented by the general formula (AI) (hereafter simply referred to as "hydrophobic structural unit (a)" in some cases) in a vinyl polymer is from 10 mass % to 75 mass %, preferably from 20 mass % to 70 mass %, especially preferably from 30 mass % to 60 mass %, of the total mass of the vinyl polymer in terms of dispersion stability of pigments, consistency in discharging and washability.

The alkyl group represented by $R_2$ is preferably an alkyl group containing 1 to 10 carbon atoms, with examples including a methyl group, an ethyl group, an n-propyl group, an i-propyl group and a t-butyl group.

Examples of the substituent mentioned above include a halogen atom, an alkyl group, an alkoxy group, a hydroxyl group and a cyano group, but they are not particularly limited to these examples.

The divalent linkage group represented by $L_2$ is preferably a linkage group containing 1 to 30 carbon atoms, far preferably a linkage group containing 1 to 25 carbon atoms, especially preferably a linkage group containing 1 to 20 carbon atoms.

Of the general formula (AI), combinations of structural units in which $R_1$ is a hydrogen atom or a methyl group, $L_1$ is —COO— (when viewed from the main chain side) and $L_2$ is a $C_{1-25}$ divalent linkage group containing at least one group chosen from alkyleneoxy groups or alkylene groups are preferred to others. And combinations of structural units in which $R_1$ is a hydrogen atom or a methyl group, $L_1$ is —COO— (when viewed from the main chain side) and $L_2$ is, when viewed from the main chain side, —(CH$_2$—CH$_2$—O)$_n$— (n represents an average number of the repeating unit and ranges from 1 to 6) are far preferred.

The aromatic hydrocarbon ring in $Ar_1$ has no particular restriction, but as examples thereof, mention may be made of a benzene ring, a fused ring-type aromatic hydrocarbon ring containing 8 or more carbon atoms, a heterocyclic ring fused with an aromatic hydrocarbon ring and a connected set of two or more benzene rings.

The fused ring-type aromatic hydrocarbon ring containing 8 or more carbon atoms refers to an aromatic hydrocarbon ring made up of at least two benzene rings fused together, and/or an aromatic compound containing 8 or more carbon atoms whose ring is made up of at least one aromatic hydrocarbon ring and an alicyclic hydrocarbon fused therewith. Examples of such rings include naphthalene, anthracene, fluorene, phenanthrene and acenaphthene.

The heterocyclic ring fused with an aromatic hydrocarbon ring is a compound into which at least an aromatic compound containing no hetero atom (preferably a benzene ring) and a cyclic compound containing one or more hetero atoms are fused together. Herein, the cyclic compound containing one or more hetero atoms is preferably a 5- or 6-membered ring. The hetero atom is preferably a nitrogen atom, an oxygen atom or a sulfur atom. Two or more hetero atoms which may be present in the hetero atom-containing cyclic compound may be the same or different. Examples of the heterocyclic ring fused with an aromatic hydrocarbon ring include phthalimide, acridone, carbazole, benzoxazole and benzothiazole.

The hydrophobic structural unit (a) represented by the general formula (AI) is preferably at least one chosen from structural units derived from acrylates and (meth)acrylates. When the hydrophobic structural unit (a) is at least one chosen from acrylates or (meth)acrylates, it is possible to combine an aromatic hydrocarbon ring with the main chain via an ester linkage, and the aromatic hydrocarbon ring allowing expectation of interaction with pigments, such as adsorption, can take on a steric structure having freedom from the main chain.

In addition, it is preferable that the hydrophobic structural unit (a) represented by the general formula (AI) contains a univalent group derived from a benzene ring, a fused ring-type aromatic hydrocarbon ring containing 8 or more carbon atoms, a heterocyclic ring fused with an aromatic hydrocarbon ring or a connected set of two or more benzene rings. This is because the unit (a) can deliver interaction with pigments, such as adsorption, by introducing such an aromatic hydrocarbon ring thereinto.

Examples of a monomer which can form the hydrophobic structural unit (a) represented by the general formula (AI) are illustrated below, but the invention should not be construed as being limited to these examples.

M-1

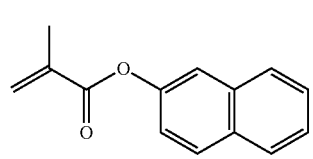

M-2

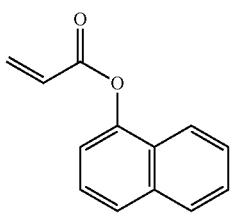

M-3

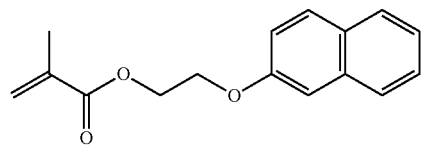

M-4

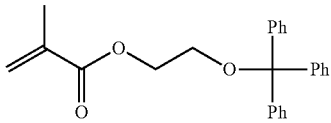

M-5

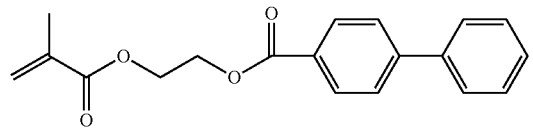

M-6

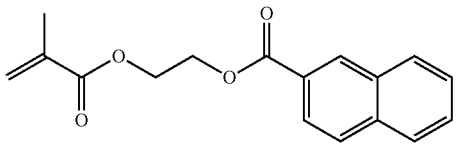

M-7

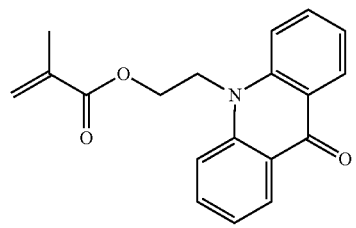

M-8

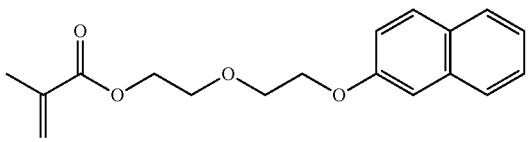

M-9

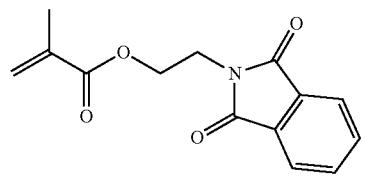

M-10

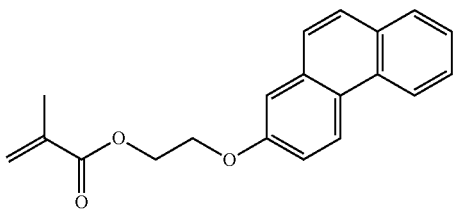

-continued
M-11
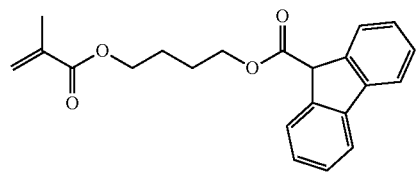
M-12
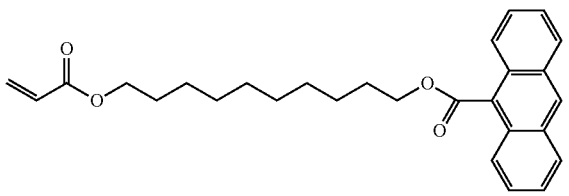
M-13
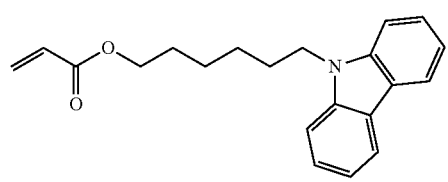
M-14
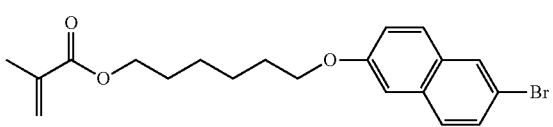
M-15
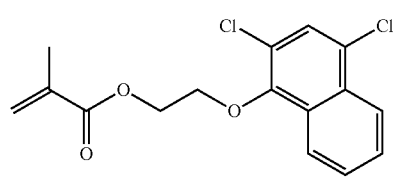
M-16
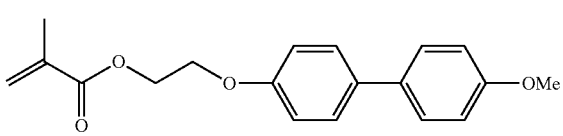
M-17
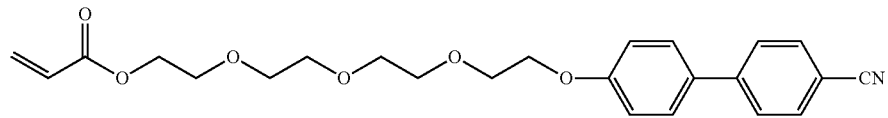
M-18
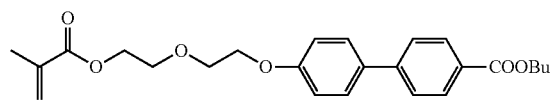
M-19
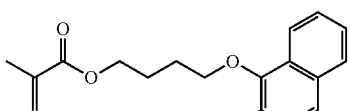
M-20
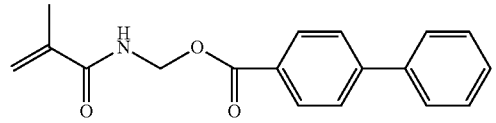
M-21
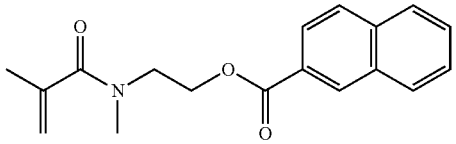
M-22
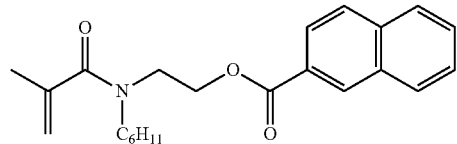
M-23
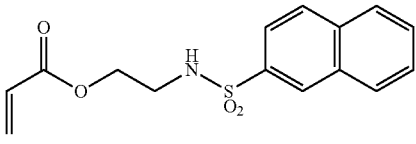
M-24
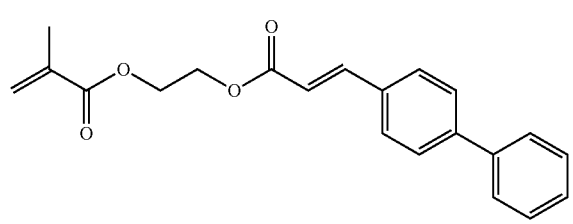
M-25
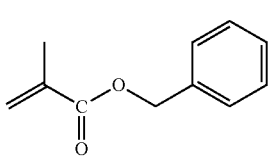
M-26
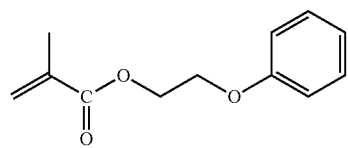
M-27
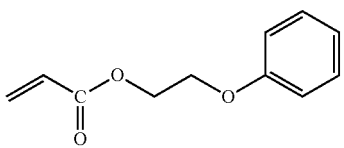

In point of dispersion stability, it is appropriate that the hydrophobic structural unit (a) represented by the general formula (AI) be a structural unit derived from at least any one chosen from among four monomers, benzylacrylate, benzylmethacrylate, phenoxyethylacrylate and phenoxyethylmethacrylate, preferably a structural unit containing what is derived from at least either of two monomers, phenoxyethylmethacrylate and benzylmethacrylate.

In the invention, it is preferred that the hydrophobic structural unit (a) contain the structural units derived from phenoxyethylacrylate and phenoxyethylmethacrylate in a gross amount of 20 mass % or above with respect to the total mass of vinyl polymer.

It is far preferred that the hydrophobic structural unit (a) contain at least one structural unit chosen from those derived from phenoxyethylacrylate and phenoxyethylmethacrylate or those derived from benzylacrylate and benzylmethacrylate in a gross amount of 20 mass % or above with respect to the total mass of vinyl polymer, and besides, the hydrophilic structural unit (c) contain at least one structural unit chosen from those derived from acrylic acid and methacrylic acid in a gross amount of 30 mass % or below with respect to the total mass of vinyl polymer.

Of those cases, the case is especially preferred where the hydrophobic structural unit (a) contain the structural units derived from phenoxyethylacrylate and phenoxyethylmethacrylate in a gross amount of 20 mass % or above with respect to the total mass of vinyl polymer, and besides, the hydrophilic structural unit (c) contain at least one structural unit chosen from those derived from acrylic acid and methacrylic acid in a gross amount of 15 mass % or below with respect to the total mass of vinyl polymer.

Hydrophobic Structural Unit (b) Derived from Alkyl Ester of Acrylic Acid or Methacrylic Acid:

The vinyl polymer may contain a hydrophobic structural unit (b) derived from an alkyl ester of acrylic acid or methacrylic acid.

The suitable number of carbon atoms in the alkyl ester is from 1 to 18, preferably from 1 to 8, far preferably from 1 to 4, especially preferably 1 or 2.

The suitable hydrophobic structural unit (b) content of the vinyl polymer is from 5 mass % to 75 mass %, preferably from 20 mass % to 60 mass %.

Examples of a monomer from which the hydrophobic structural unit (b) is derived include (meth)acrylates such as methyl(meth)acrylate, ethyl(meth)acrylate, (iso)propyl(meth)acrylate, (iso- or tertiary-)butyl(meth)acrylate, cyclohexyl(meth)acrylate, dodecyl(meth)acrylate, stearyl(meth)acrylate.

Of these monomers, methyl(meth)acrylate, ethyl(meth)acrylate and cyclohexyl(meth)acrylate are preferable to the others.

Hydrophilic Structural Unit (c):

A description of the hydrophilic structural unit (c) incorporated into the vinyl polymer used in the invention is presented below.

As examples of the hydrophilic structural unit (c), mention may be made of acrylic acid and methacrylic acid which each have a carboxyl group. In addition, hydrophilic structural units containing nonionic hydrophilic groups can be given as other examples.

Other examples of the hydrophilic structural unit (c) include (meth)acrylates having hydrophilic functional groups, (meth)acrylamides and vinyl esters.

Examples of a hydrophilic functional group include a hydroxyl group, an amino group, an amido group (which has no substituent on its nitrogen atom), and a polyalkylene oxide group such as a polyethylene oxide group or a polyprolylene oxide group.

Of the (meth)acryltes having hydrophilic functional groups, hydroxyethyl(meth)acrylate, hydroxybutyl(meth)acrylate, (meth)acrylamide, aminoethylacrylate and (meth)acrylates having polyalkylene oxide groups are preferred over the others.

As to the alkylene moiety of the polyalkylene oxide, the suitable number of carbon atoms therein is from 1 to 6, preferably from 2 to 6, especially preferably from 2 to 4, in terms of hydrophilicity.

In addition, the suitable polymerization degree of the polyalkylene oxide is from 1 to 120, preferably from 1 to 60, especially preferably from 1 to 30.

As further examples of the hydrophilic structural unit (c), mention may be made of hydrophilic structural units containing hydroxyl groups. The number of hydroxyl groups is not particularly limited, but the suitable one is from 1 to 4, preferably from 1 to 3, especially preferably 1 or 2 in terms of comparability with a solvent and other monomers used under polymerization.

Preferred examples of the hydrophilic structural unit (c) are acrylic acid and methacrylic acid.

The suitable hydrophilic structural unit (c) content is from 4 mass % to 50 mass %, preferably from 6 mass % to 25 mass %, far preferably from 8 mass % to 15 mass %, with respect to the total mass of vinyl polymer.

From the viewpoint of ensuring effects of the invention, it is particularly appropriate for the vinyl polymer used in the invention to be a vinyl polymer represented by the following general formula (AII).

General formula (AII):

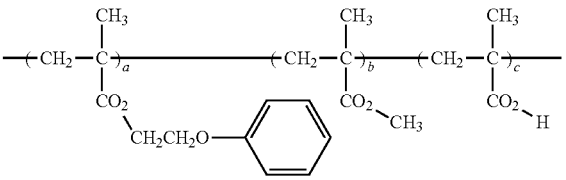

(In the general formula (AII), the subscript a represents 10 mass % to below 75 mass % with respect to the total mass of the vinyl polymer, the subscript b represents 5 mass % to below 50 mass % with respect to the total mass of the vinyl polymer and the subscript c represents 4 mass % to below 50 mass % with respect to the total mass of the vinyl polymer, provided that a+b+c=100.)

When the vinyl polymer is in the form of this formula (AII), it is appropriate that the subscript a be from 20 mass % to below 65 mass % with respect to the total mass of the vinyl polymer, the subscript b from 5 mass % to below 60 mass % with respect to the total mass of the vinyl polymer and the subscript c from 4 mass % to below 50 mass % with respect to the total mass of the vinyl polymer, and it is especially preferred that the subscript a be from 40 mass % to below 60 mass % with respect to the total mass of the vinyl polymer, the subscript b from 20 mass % to below 60 mass % with respect to the total mass of the vinyl polymer and the subscript c from 8 mass % to below 15 mass % with respect to the total mass of the vinyl polymer. Additionally, the sum of a, b and c is 100.

Moreover, it is beneficial to combine the vinyl polymer having the form of this formula (AII) with the azo pigment of any of the formulae (1a) to (3a) because it allows further enhancement of effects of the invention.

<Structural Unit (d)>

The vinyl polymer used in the invention, as mentioned above, can also contain another structural unit (hereafter referred to as "structural unit (d)) which has a structure different from those of the hydrophobic structural unit (a), the hydrophobic structural unit (b) and the hydrophilic structural unit (c).

The suitable structural unit (d) content is from 15 mass % to 80 mass %, preferably from 25 mass % to 70 mass %, far preferably from 40 mass % to 60 mass %, with respect to the total mass of the vinyl polymer.

When the structural unit (d) is a hydrophobic structural unit, a monomer from which such a structural unit is derived has no particular restriction and may be any of known monomers so long as it has a functional group capable of forming a polymer and a hydrophobic functional group.

As monomers capable forming the hydrophobic structural units, vinyl monomers (including (meth)acrylamides, styrenes and vinyl esters) are suitable in terms of availability, ease of handling and general versatility.

Examples of such (meth)acrylamides include N-cyclohexyl(meth)acrylamide, N-(2-methoxyethyl)(meth)acrylamide, N,N-diallyl(meth)acrylamide and N-allyl(meth)acrylamide.

Examples of such styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichorostyrene, bromostyrene, chloromethylstyrene, methyl vinylbenzoate, α-methylstyrene and vinylnaphthalene. Of these styrenes, styrene and α-methylstyrene are preferable to the others.

Examples of such vinyl esters include vinyl acetate, vinyl chloroacetate, vinyl propionate, vinyl butyrate, vinyl acetoxyacetate and vinyl benzoate. Of these vinyl esters, vinyl acetate is preferred over the others.

These monomers can be used alone or as mixtures of two or more thereof.

It is also possible for the vinyl polymer to contain only the hydrophobic structural unit (a) and the hydrophilic structural unit (c).

When a vinyl polymer is used in water-based ink for inkjet recording, the vinyl polymer is preferably a vinyl polymer whose hydrophobic structural unit (a) contains at least one chosen from the structural units derived from phenoxyethylacrylate and phenoxyethylmethacrylate and at least one chosen from the structural units derived from benzylacrylate and benzylmethacrylate in a gross amount of 20 mass % or above with respect to the total mass of the vinyl polymer, and at the same time, whose hydrophilic structural unit (c) contains at least one chosen from the structural units derived from acrylic acid and methacrylic acid in a gross amount of 30 mass % or below with respect to the total mass of the vinyl polymer.

The suitable acid value of a vinyl polymer used in the invention is from 30 mg KOH/g to 300 mg KOH/g, preferably from 40 mg KOH/g to below 150 mg KOH/g, especially preferably from 50 mg KOH/g to 100 mg KOH/g, in terms of pigment dispersibility and storage stability.

Additionally, the acid values as specified herein are those defined as the mass (mg) of KOH required for complete neutralization of 1 g of vinyl polymer, and they can be determined in accordance with the method described in Japanese Industrial Standards (JIS K0070, 1992).

The vinyl polymer used in the invention may be a random copolymer into which various structural units are introduced at random, or it may be a block copolymer into which various structural units are introduced with regularity. When the vinyl polymer is a block copolymer, its various structural units may be introduced in any order at the time of synthesis of the block copolymer, and each of the structural units may be introduced twice or more. From the viewpoints of general versatility and manufacturability, however, the vinyl polymer is preferably a random polymer.

Where the molecular weight range of a vinyl polymer used in the invention is further concerned, the suitable mass-average molecular weight (Mw) of the polymer is from thirty thousand to one hundred and fifty thousand, preferably from thirty thousand to one hundred thousand, far preferably from thirty thousand to eighty thousand.

Adjusting the molecular weight to fall within the range specified above is beneficial from a standpoint that the resultant polymer comes to have both a tendency to satisfactory steric repulsion effect as a dispersant and a tendency to a reduction in time for adsorption to pigments owing to its steric effect.

Further, it is appropriate that the molecular-weight distribution (defined as mass-average molecular weight value/number-average molecular weight value) of the vinyl polymer used in the invention be from 1 to 6, preferably from 1 to 4.

Adjusting the molecular-weight distribution to fall with the range specified above is beneficial in terms of dispersion stability of ink and consistency in discharge of ink. The values specified herein as the number-average molecular weight and the mass-average molecular weight are molecular weight values measured with a GPC analyzer using columns TSKgel GMHxL, TSKgel G4000HxL and TSKgel G2000HxL (which are all product names of Tosoh Corporation) in which THF is used as solvent and the detection is performed with a differential refractometer, and calculated in terms of polystyrene.

The vinyl polymers usable in the invention can be synthesized by various methods of polymerization, such as solution polymerization, precipitation polymerization, suspension polymerization, deposition polymerization, agglomeration polymerization and emulsion polymerization. And the polymerization reaction can be performed by known operations of batch type, semi-continuation type, continuation type or so on.

Examples of a method for initiating polymerization include the method of using a radical initiator and the method of carrying out exposure to light or radiation. These methods of polymerization and methods for initiating polymerization are described in e.g. Teiji TSURUTA, *Kobunshi Gosei Hoho*, revised edition (published by Nikkan Kogyo Shimbun, Ltd. in 1971) and Takayuki OTSU & Masayoshi KINOSHITA, *Kobunshi Gosei no Jikken-Ho*, pp. 124-154 (published by Kagaku-Dojin Publishing Company, INC. in 1972).

Of those methods of polymerization, the method of solution polymerization using a radical initiator in particular is preferred over the others. Examples of a solvent used in the method of solution polymerization include a wide variety of organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol, and these organic solvents may be used alone or as mixtures of two or more thereof, or they may be used as solvents mixed with water.

The polymerization temperature is required to be chosen in relation to the molecular weight of a polymer to be produced, the kind of an initiator used and so on. Although the polymerization temperature is usually of the order of 0° C. to 100° C., it is appropriate for the polymerization to be carried out in a temperature range of 50° C. to 100° C.

The reaction pressure, though can be chosen as appropriate, is usually in a range of 1 kg/cm² to 100 kg/cm², particularly preferably of the order of 1 kg/cm² to 30 kg/cm². The reaction time is of the order of 5 hours to 30 hours. The resin obtained may be purified by re-precipitation or so on.

In point of dispersion stability, it is appropriate in the invention that the amount of the vinyl polymer added as a percentage of pigment usage be in a range from 10% to 100% by mass, preferably from 30% to 60% by mass.

Suitable examples of the dispersant include a cationic dispersant, an anionic dispersant and a nonionic dispersant.

Suitable examples of the surfactant include a cationic surfactant, an anionic surfactant and a nonionic surfactant.

The dispersants and surfactants as given above can be used alone or as mixtures of two or more thereof.

According to a suitable embodiment of the invention, it is desired that a water-soluble resin of styrene-(meth)acrylic acid type be utilized as the dispersant.

It is appropriate that the formula of the ink composition according to the invention, though may be appropriately chosen in consideration of e.g. the recording method in which the ink composition is to be used, basically include the coloring agent as described above, water and a water-soluble organic solvent.

Examples of the water-soluble organic solvent include high boiling organic solvents.

High boiling organic solvents prevent ink compositions from drying, and thereby avoid head clogging.

Suitable examples of such a high boiling organic solvent include polyhydric alcohols such as ethylene glycol, diethylene glycol, triethylene glycol, polyethylene glycol, polypropylene glycol, butylenes glycol, 1,2,6-hexanetriol, thioglycol, hexylene glycol, glycerin, trimethylolethane and trimethylolpropane, alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether and triethylene glycol monobutyl ether, urea, 2-pyrrolidone, N-methyl-2-pyrrolidone, 1,3-dimethyl-2-imidazolidinone and triethanolamine.

The suitable amount of such a high boiling organic solvent added, though not particularly limited, is of the order of 0.1 mass % to 30 mass %, preferably of the order of 0.5 mass % to 20 mass %.

The ink composition may further contain a low boiling organic solvent as a water-soluble organic solvent.

Suitable examples of the low boiling organic solvent include methanol, ethanol, n-propyl alcohol, iso-propyl alcohol, n-butanol, sec-butanol, tert-butanol, iso-butanol and n-pentanol. Monohydric alcohols in particular are suitable.

Low boiling organic solvents have the effect of shortening the drying time of ink.

According to a suitable embodiment of the invention, the ink composition may contain a penetrant.

Examples of the penetrant include various types of surfactant such as an anionic surfactant, a cationic surfactant and an amphoteric surfactant, alcohols such as methanol, ethanol and iso-propyl alcohol, lower alkyl ethers of polyhydric alcohols such as ethylene glycol monomethyl ether, diethylene glycol monoethyl ether, diethylene glycol monobutyl ether, triethylene glycol monobutyl ether, propylene glycol monobutyl ether and dipropylene glycol monobutyl ether, and acetylene glycol. The penetrant is preferably at least one of lower alkyl ethers of polyhydric alcohols or acetylene glycols, especially preferably diethylene glycol monobutyl ether or triethylene glycol monobutyl ether.

The suitable amount of such a penetrant added, though may be chosen as appropriate, is from 1 mass % to 20 mass %, preferably from 1 mass % to 10 mass %.

Further, examples of the penetrant include acetylene glycols represented by the following formula (BI).

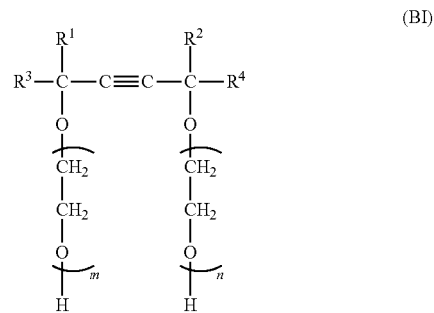

[In the above general formula (BI), $0 \leq m+n \leq 50$ and $R^1$, $R^2$, $R^3$ and $R^4$ each independently represents an alkyl group (preferably a $C_{1-6}$ alkyl group).]

As the acetylene glycols represented by the above formula, commercially available products may also be used. Examples thereof include Olfine Y, Surfynol 82, Surfynol 440, Surfynol 465 and Surfynol 485 (all of which are products of Air Product and Chemicals, Inc.). The use of Surfynol 465 in particular is advantageous. Those penetrants may be added alone or as mixtures of two or more thereof. The suitable amount of such penetrants added is of the order of 0.1 mass % to 5 mass %, preferably of the order of 0.5 mass % to 2 mass %.

[Ink Compositions]

Each of the ink compositions can be prepared by dissolving and/or dispersing a coloring agent compound according to the invention into a liphophilic medium or an aqueous medium. In the preparation thereof, the use of an aqueous medium is preferred. Each ink composition can contain other additives on an as needed basis so long as their contents fall within such a range as not to impair effects of the invention. Such additives are well known ones (to which the additives disclosed in JP-A No. 2002-371214 are applicable), with examples including an anti-dry agent (wetting agent), a fading inhibitor, an emulsion stabilizer, a penetration accelerator, a ultraviolet absorbent, a preservative, a fungicide, a pH control agent, a surface-tension control agent, an antifoaming agent, a viscosity control agent, a dispersant, a dispersion stabilizer, a rust inhibitor and a chelating agent. These various additives are added directly to an ink solution in the case of water-based ink. When an oil-soluble coloring agent is used in the form of dispersion, the additives are generally added to the dispersion after the coloring-agent dispersion is prepared, but they may be added to an oil phase or a water phase during the preparation.

As the aqueous medium, it is possible to use a mixture which contains water as a main ingredient, to which a water-miscible organic solvent is added at a request. Examples of the water-miscible organic solvent include alcohol (e.g. methanol, ethanol, propanol, isopropanol, butanol, isobutanol, sec-butanol, t-butanol, pentanol, hexanol, cyclohexanol, benzyl alcohol), polyhydric alcohols (e.g. ethylene glycol, diethylene glycol, triethylene glycol, polyethylene glycol, propylene glycol, dipropylene glycol, polypropylene glycol, butylenes glycol, hexanediol, pentanediol, glycerin, hexanetriol, thioglycol), glycol derivatives (e.g. ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g. ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine), and other polar solvents (e.g. formamide, N,N-dimethylformamide, N,N-dimethylacetamide, dimethyl sulfoxide, surfolane, 2-pyrrolidone, N-methyl-2-pyrrolidone, N-vinyl-2-pyrrolidone, 2-oxazolidone, 1,3-dimethyl2-imidazolidine, acetonitrile, acetone). These water-miscible organic solvents may be used as combinations of two or more thereof.

[Yellow Ink Composition]

The yellow ink composition used in the invention contains an azo pigment represented by the foregoing general formula (1), its tautomers, or salts or hydrates thereof.

In the present ink set, the yellow ink composition can further contain an arbitrarily chosen yellow coloring agent other than the azo pigment used as a coloring agent. Examples of such an additional yellow coloring agent include C.I. Pigment Yellows 1, 2, 3, 12, 13, 14, 16, 17, 73, 74, 75, 83, 93, 95, 97, 98, 109, 110, 114, 120, 128, 138, 139, 150, 151, 154, 155, 180, 185 and 213, Direct Yellows 8, 9, 11, 12, 27, 28, 29, 33, 35, 39, 41, 44, 50, 53, 58, 59, 68, 86, 87, 93, 95, 96, 98, 100, 106, 108, 109, 110, 120, 130, 132, 142, 144, 161 and 163, Acid Yellows 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227, C.I. Reactive Yellows 2, 3, 13, 14, 15, 17, 18, 23, 24, 25, 26, 27, 29, 35, 37, 41 and 42, and Basic Yellows 1, 2, 4, 11, 13, 14, 15, 19, 21, 23, 24, 25, 28, 29, 32, 36, 39 and 40.

Further examples of a yellow coloring agent which can be added include arylazo or hetarylazo colorants having as their coupling components phenols, naphthols, anilines, heterocyclic rings such as pyrazolone and pyridine, open-chain active methylene compounds or the like, azomethine colorants having as their coupler components e.g. open-chain active methylene compounds or the like, methine colorants such as benzylidene colorants and monomethineoxonol colorants, and quinone pigments such as naphthoquinone colorants and anthraquinone colorants. As examples of colorant species other than the foregoing, mention may be made of quinophthalone colorants, nitronitroso colorants and acridine colorants. The yellow coloring agents may be those which show individual yellow colors only after their chromophores cause partial dissociation. In such agents, their respective counter cations may be inorganic cations such as alkali metal and ammonium, or they may be organic cations such as pyridinium and quaternary ammonium salts, or they may be polymer cations having the cations cited above as their partial structures.

As to inkjet recording ink according to the invention, the concentration of yellow coloring agents in an yellow composition can be decided as appropriate on the basis of color values of the coloring agents to be used. It is generally appropriate that the azo pigment represented by the general formula (1) be present in a proportion of 0.2 to 10 parts by mass, preferably 3 to 6 parts by mass, to 100 parts by mass of the inkjet recording ink. By adjusting the coloring agent (pigment) concentration to 0.2 mass % or higher, sufficient color developability as the ink can be ensured. And by further adjusting the coloring agent concentration to 10 mass % or lower, it becomes easy for the ink composition as used in the inkjet recording method to ensure dischargeability from nozzles, to avoid causing nozzle clogging, and so on.

The proportion by mass of the azo pigment represented by the general formula (1) in a total yellow composition, though not particularly limited, is preferably from 70% or above, especially preferably 90% or above. Of these proportions, 100% in particular is the best.

As yellow colorants usable as coloring agents in the yellow ink composition, the compounds disclosed in WO 05/075573 brochure and JP-A No. 2007-63520 are preferably given.

[Magenta Ink Composition]

The magenta ink composition used in the invention contains at least one coloring agent selected from among four kinds of pigments, C.I. Pigment Violet 19, C.I. Pigment Red 22, C.I. Pigment Red 202 and C.I. Pigment Red 209.

Into the present ink set, a dark magenta ink composition and a light magenta ink composition can be incorporated as magenta ink compositions. When both a dark magenta ink composition and a light magenta ink composition are incorporated, it is appropriate that at least either of the two compositions contain C.I. Pigment Violet 19, C.I. Pigment Red 122, C.I. Pigment Red 202 or C.I. Pigment Red 209 as a coloring agent, and it is preferable that the light magenta ink composition contains C.I. Pigment Violet 19, C.I. Pigment Red 122 or C.I. Pigment Red 202 as a coloring agent and the dark magenta ink composition contains C.I. Pigment Violet 19, C.I. Pigment Red 122 or C.I. Pigment Red 202 as a coloring agent. The best is a case where both the light magenta ink composition and the dark magenta ink composition contain C.I. Pigment Red 202 as their respective coloring agents.

As to inkjet recording ink according to the invention, the concentration of magenta coloring agents in a magenta ink composition can be decided as appropriate on the basis of color values of the coloring agents to be used. It is generally appropriate that C.I. Pigment Violet 19, C.I. Pigment Red 122, C.I. Pigment 202 and C.I. Pigment 209 be present in a total proportion of 0.2 to 10 parts by mass, preferably 3 to 6 parts by mass, to 100 parts by mass of the inkjet recording ink. By adjusting the coloring agent (pigment) concentration to 0.2 mass % or higher, sufficient color developability as the ink can be ensured. And by further adjusting the coloring agent concentration to 10 mass % or lower, the ink composition becomes easy to ensure dischargeability from nozzles, to avoid causing nozzle clogging and so on when used in the inkjet recording method.

When the magenta ink composition is prepared using any of C.I. Pigment Violet 19, C.I. Pigment Red 122, C.I. Pigment 202 and C.I. Pigment 209 in combination with another magenta coloring agent, the suitable ratio of the total usage by mass of C.I. Pigment Violet 19, C.I. Pigment Red 122, C.I. Pigment 202 and C.I. Pigment 209 to the total usage by mass of other magenta coloring agents used in combination with such pigments, though not particularly limited, is from 50:50 to 100:0, preferably from 70:30 to 100:0, especially preferably from 80:20 to 100:0.

As coloring agents in the magenta ink composition, other magenta coloring agents may further be used in combination with C.I. Pigment Violet 19, C.I. Pigment Red 122, C.I. Pigment 202 or C.I. Pigment 209.

Examples of such other magenta coloring agents include:

C.I. Direct Reds 2, 4, 9, 23, 26, 31, 39, 62, 63, 72, 75, 76, 80, 81, 83, 84, 89, 92, 95, 111, 173, 184, 207, 211, 212, 214, 218, 221, 223, 224, 225, 226, 227, 232, 233, 240, 241, 242, 243 and 247, C.I. Direct Violets 7, 9, 47, 48, 51, 66, 90, 93, 94, 95, 98, 100 and 101, C.I. Acid Reds 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397, C.I. Acid Violets 5, 34, 43, 47, 48, 90, 103 and 126, C.I. Reactive Reds 3, 13, 17, 19, 21, 22, 23, 24, 29, 35, 37, 40, 41, 43, 45, 49 and 55, C.I. Reactive Violets 1, 3, 4, 5, 6, 7, 8, 9, 16, 17, 22, 23, 24, 26, 27, 33 and 34, C.I. Basic Reds 12, 13, 14, 15, 18, 22, 23, 24, 25, 27, 29, 35, 36, 38, 39, 45 and 46, and C.I. Basic Violets 1, 2, 3, 7, 10, 15, 16, 10, 21, 25, 27, 28, 35, 37, 39, 40 and 48.

Examples of the other magenta coloring agents further include arylazo or hetarylazo colorants having as their coupling components (hereafter referred to as coupler components) phenols, naphthols, anilines, heterocyclic rings such as pyrazine, open-chain active methylene compounds or the like, and azomethine colorants and anthrapyridone colorants having as their coupler components open-chain active methylene compounds or the like.

As the magenta ink composition, one which contains at least a solid solution of γ-type C.I. Pigment Violet 19 and C.I. Pigment Red 202 is suitable. By assigning such a suitable makeup to the magenta ink composition, the effects mentioned above can be further enhanced.

Here the term "a solid solution of γ-type C.I. Pigment Violet 19 and C.I. Pigment Red 202" refers to a crystal into which γ-type C.I. Pigment Violet 19 and C.I. Pigment Red 202 melt together in a solid state.

The ratio between the amount of γ-type C.I. Pigment Violet 19 and that of C.I. Pigment Red 202 can be adjusted as appropriate within the scope of the invention, and it is appropriate that γ-type C.I. Pigment Violet 19 be greater in weight than C.I. Pigment Red 202.

The result of powder X-ray diffraction analysis done on a suitable example of the solid solution is shown in FIG. 1. In this analysis, the measurement was made with PaNalystical X' Pert Pro on a sample charged into a glass cell having a depth of 0.5 mm.

In addition to the solid solution, the magenta ink composition may further contain other magenta pigments such as PV19 and PV32. Examples of the other magenta pigments include C.I. Pigment Reds (PRs) 5, 7, 12, 48(Ca), 48(Mn), 57(Ca), 57:1, 112, 122, 123, 168, 184, 202 and 209; C.I. Pigment Violet 19 (PV 19).

The suitable form of an ink set in a mode for carrying out the invention is provided with a magenta ink composition containing at least the solid solution. The ink set may further contain other magenta pigments such as PV19 and PV32, and other pigments as long as it incorporates the solid solution. In addition, the ratio between the amount of γ-type PV 19 and that of PR 202 can be adjusted as appropriate within the scope of the invention.

[Cyan Ink Composition]

The cyan ink composition used in the invention contains as a coloring agent at least one chosen from among five pigments, C.I. Pigment Blue 15:1, C.I. Pigment Blue 15:2, C.I. Pigment Blue 15:3, C.I. Pigment Blue 15:4 and C.I. Pigment Blue 15:6.

Into the present ink set, a dark cyan ink composition and a light cyan ink composition can be incorporated as cyan ink compositions. When both a dark cyan ink composition and a light cyan ink composition are incorporated, it is appropriate that at least either of the two ink compositions contain C.I. Pigment Blue 15:3 or C.I. Pigment Blue 15:4 as a coloring agent, and it is preferable that the light cyan ink composition contains C.I. Pigment Blue 15:3 or C.I. Pigment Blue 15:4 as a coloring agent and the dark cyan ink composition contains C.I. Pigment Blue 15:3 or C.I. Pigment Blue 15:4 as a coloring agent. The best is a case where both the light magenta ink composition and the dark magenta ink composition contain C.I. Pigment Blue 15:3 as their respective coloring agents.

As to inkjet recording ink according to the invention, the concentration of cyan coloring agents in a cyan ink composition can be decided as appropriate on the basis of color values of the pigments to be used. It is generally appropriate that cyan coloring agents be present in a total proportion of 0.2 to 10 parts by mass, preferably 3 to 6 parts by mass, to 100 parts by mass of the inkjet recording ink, and it is preferable that C.I. Pigment Blue 15:3 or C.I. Pigment Blue 15:4 be present in a proportion of 0.2 to 10 parts by mass, preferably 3 to 6 parts by mass, to 100 parts by mass of the inkjet recording ink.

As to the cyan ink composition used in inkjet recording ink according to the invention, C.I. Pigment Blue 15:3 or C.I. Pigment Blue 15:4 used as the coloring agent therein may be used in combination with another cyan coloring agent. When two or more coloring agents are used in combination, it is appropriate that the total content of all coloring agents used be within the range specified above. By adjusting the coloring agent (pigment) concentration to 0.2 mass % or higher, sufficient color developability as the ink can be ensured. And by further adjusting the coloring agent concentration to 10 mass % or lower, the ink composition becomes easy to ensure dischargeability from nozzles, to avoid causing nozzle clogging, and so on when used in the inkjet recording method. In addition, the suitable ratio between the usage by mass of C.I. Pigment Blue 15:3 and that of C.I. Pigment Blue 15:4 in the cyan composition, though not particularly limited, is from 4:1 to 1:8, especially from 2:1 to 1:4.

The cyan coloring agents to be used in combination with C.I. Pigment Blue 15:3 or C.I. Pigment Blue 15:4 can be chosen arbitrarily.

Suitable examples of a cyan coloring agent for the combined use include C.I. Direct Blues 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291, C.I. Acid Blues 9, 25, 40, 41, 62, 72, 76, 78, 80, 82, 92, 106, 112, 113, 120, 127, 128, 129, 138, 143, 175, 181, 205, 207, 220, 221, 230, 232, 247, 258, 260, 264, 271, 277, 278, 279, 280, 288, 290 and 326, C.I. Reactive Blues 2, 3, 5, 8, 10, 13, 141 151 171 18, 19, 21, 25, 26, 27, 28, 29 and 38, C.I. Basic Blues 1, 3, 5, 7. 9, 22, 26, 41, 45, 46, 47, 54, 57, 60, 62, 65, 66 and 69, and hydrolysis products of the pigments cited above.

Further examples include arylazo or hetarylazo colorants having as their coupler components e.g. phenols, naphthols or anilines, azomethine colorants having as their coupler components e.g. phenols, naphthols or heterocyclic rings such as pyrrolotriazole, polymethine colorants such as cyanine colorants, oxonol colorants and merocyanine colorants, carbonium colorants such as diphenylmethane colorants, triphenylmethane colorants and xanthene colorants, phthalocyanine colorants, anthraquinone colorants, and indio and thioindigo colorants.

The inkjet recording ink according to the invention can be used for not only monochromatic image formation but also full-color image formation. For the purpose of forming full-color images, a magenta ink composition, a cyan ink composition and a yellow ink composition can be used. In addition, a black ink composition may further be used for the purpose of adjusting the tone of full-color images.

[Black Ink Composition]

The present ink set may include a black ink composition, and it is appropriate for the black ink composition to contain carbon black as a coloring agent. The coloring agent for the black ink composition preferably includes C.I. Pigment Black 7 and, if needed, one or two pigments selected from the group consisting of C.I. Pigment Blues 15:1, 15:2, 15:3, 15:4 and 16 and C.I. Vat Blues 4 and 60. The use of such a pigment mixture as the coloring agent in the black ink composition produces an effect of allowing control of a red tinge of the hue in a low-duty portion. The suitable proportion of the coloring agent in the black ink composition is from 0.1 to 10 parts by mass, preferably from 1 to 3 parts by mass. The ink composition can ensure sufficient color developability as ink by adjusting the coloring agent (pigment) concentration to 0.2 mass % or higher and, by further adjusting the coloring agent (pigment) concentration to 10 mass % or lower, the ink composition becomes easy to ensure dischargeability from nozzles, to avoid causing nozzle clogging, and so on when used in the inkjet recording method.

It is possible by request to make up the present ink set so as to incorporate a black ink composition, and the incorporation of a black ink composition into the present ink set allows images having satisfactory contrast to be formed on a recording material. Coloring agents usable in the black ink composition for use in the present ink set are not restricted to those having particular structures, but it is preferable that the black ink composition containing the coloring agents in question is not very different from ink compositions having other colors in light resistance and ozone resistance. Examples of a black dye suitable for use include a carbon black dispersion in addition to a disazo dye, a trisazo dye and a tetrakisazo dye.

<Inkjet Recording Method>

In accordance with the present recording method, printing is performed by making ink compositions of the present ink set adhere to a recording material. The recording method is preferably an inkjet recording method by which printing is performed by discharging droplets of each ink composition and making the droplets adhere to a recording material. In an inkjet recording method preferred in the invention, energy is given to inkjet recording ink and, by use of the ink energized, images are formed on a known image-receiving material, specifically plain paper, resin-coated paper, inkjet-specific paper disclosed in e.g. JP-A No. 8-169172, JP-A No. 8-27693, JP-A No. 2-276670, JP-A No. 7-276789, JP-A No. 9-323475, JP-A No. 62-238783, JP-A No. 10-153989, JP-A No. 10-217473, JP-A No. 10-235995, JP-A No. 10-337947, JP-A No. 10-217597 or JP-A No. 337947, film, paper sharable between inkjet recording and electrophotographic printing, cloth, glass, metal, ceramic ware or the like. Additionally, the description in JP-A No. 2003-306623, paragraph numbers from 0093 to 0105, can be applied to an inkjet recording method preferred in the invention.

The image formation may be carried out in the presence of a polymer latex compound for the purposes of giving a gloss and water resistance to the images formed and improving weather resistance of the images formed. The timing for providing the latex compound for an image-receiving material may be before or after or at the same time as coloring agents are provided. Accordingly, the site for addition of the latex compound may be either the inside of an image-receiving material or the inside of ink, or the polymer latex may be used singly as a liquid to be applied. More specifically, the methods disclosed in JP-A No. 2002-16638 (Japanese Patent Application No. 2000-363090), JP-A No. 2002-121440 (Japanese Patent Application No. 2000-315231), JP-A No. 2002-154201 (Japanese Patent Application No. 2000-354380, JP-A No. 2002-144696 (Japanese Patent Application No. 2000-343944), JP-A No. 2002-080759 (Japanese Patent Application No. 2000-268952) can be suitably used.

One example of an image-forming method preferred in the invention includes a first process: a process of giving a recording material a liquid composition for enhancing printability, a second process: a process of providing ink compositions for the recording material to which the liquid composition has been given, and other processes. The other processes have no particular restrictions, and they can be chosen as appropriate according to what aims the method has. Examples of such processes include a process of dry removal and a process of heat fixing. The process of dry removal has no particular restriction so long as ink solvents in ink compositions provided for a recording material are removed by drying, and it can be chosen as appropriate according to what aims the method has. The process of heating for fixing has no particular restriction so long as the latex particles incorporated into each ink used in the inkjet recording method are fixed by melting, and it can be chosen as appropriate according to what aims the method has.

Another example of an image-forming method preferred in the invention includes a first process: a process of giving an intermediate transfer material a liquid composition for enhancing printability, a second process: a process of providing ink compositions for the intermediate transfer material to which the liquid composition has been given, a third process: a process of transferring ink images formed on the intermediate transfer material to a recording material, and other processes. The other processes have no particular restrictions, and they can be chosen as appropriate according to what aims the method has. Examples of such processes include a process of dry removal and a process of heat fixing.

[Inkjet Recording Apparatus and Cartridge for Inkjet Recording]

Inkjet recording apparatus is apparatus which uses inkjet recording ink, has a recording head for discharging ink (and, if required, a liquid for treatment) at the surface of a recording material and forms images by discharging the ink from the recording head at the recording material surface. Additionally, the apparatus can feed the ink into the recording head, and it may be provided with ink tanks for inkjet recording which are detachable from and attachable to the apparatus proper (often abbreviated to ink tanks hereinafter). In this case, the ink is stored in each ink tank for inkjet recording.

As such inkjet recording apparatus, ordinary inkjet recording apparatus provided with a printing system allowing the use of inkjet recording ink can be utilized. In addition, the inkjet recording apparatus may be loaded with a heater or the like, if needed, in order to control drying of ink, or it may be apparatus which is loaded with an intermediate transfer mechanism and provided with a mechanism for performing transfer to a recording material, such as paper, after ink and a liquid for treatment are discharged at (printed on) the intermediate.

Moreover, as ink tanks for inkjet recording, any of well-known ink tanks can be used so long as they are detachable from and attachable to inkjet recording apparatus equipped with a recording head and have a structure capable of feeding ink into the recording head in a state of being attached to the inkjet recording apparatus.

In terms of effect of improving blur and bleed between colors, it is appropriate for the inkjet recording apparatus (method) to adopt a hot inkjet recording system or a piezoelectric inkjet recording system. In the case of a hot inkjet recording system, the ink heated at the time of discharge comes to have a low viscosity, but the ink temperature drops on the recording material to cause a sharp increase in the viscosity. As a consequence, the effect of improving blur and bleed between colors is produced. On the other hand, the case of a piezoelectric inkjet system allows discharge of a high-viscosity liquid, and the high-viscosity liquid can retard its spreading to directions on the surface of a recording material (paper), and it therefore produces the effect of improving blur and bleed between colors.

A cartridge for inkjet recording contains inkjet recording ink. In the inkjet recording method (apparatus), it is appropriate that ink replenishment (supply) to the recording head be provided from an ink tank filled with an ink liquid (if required, including a liquid for treatment). This ink tank is preferably a tank of cartridge type which can be detachable from and attachable to the main body of apparatus, and ink replenishment can be performed simply by an exchange of ink tanks of the cartridge type.

[Recorded Material]

A recorded material can be obtained by use of inkjet recording ink.

The recorded material according to the invention is a recorded material having thereon images formed using the present ink set. The recorded material having thereon images formed by use of the ink set containing a yellow ink composition containing the azo pigment of the formula (2) or (3) in particular is highly satisfactory from the viewpoints of making it possible to ensure high-level of color reproducibility in the images and excelling in image fastness (especially fastness to light).

EXAMPLES

The invention will now be illustrated in further detail by reference to the following examples, but the invention should not be construed at al as being limited to these examples. Additionally, all "parts" in the examples are by mass.

X-ray diffraction measurements of azo pigments used in yellow ink compositions were made using CuKα-ray in a powder X-ray diffraction instrument RINT2500 (made by Rigaku Corporation) in conformance with Japanese Industrial Standards JISK0131 (common rule on X-ray diffraction analysis) under the conditions mentioned below.

| | |
|---|---|
| Measuring instrument used: | Automatic X-ray diffraction instrument RINT2500 made by Rigaku Corporation |
| X-ray tube: | Cu |
| Tube voltage: | 55 KV |
| Tube temperature: | 280 mA |
| Scanning method: | 2θ/θ scanning |
| Scanning speed: | 6 deg./min. |
| Sampling interval: | 0.100 deg. |
| Start angle (2θ): | 5 deg. |
| Stop angle (2θ): | 55 deg. |
| Divergence slit: | 2 deg. |
| Scattering slit: | 2 deg. |
| Receiving slit: | 0.6 mm |
| Use of an upright goniometer | |

Azo pigments represented by the general formula (1) can be synthesized in conformance with the method of synthesizing an azo pigment Pig.-1 as illustrated in the following Synthesis Example 1.

Synthesis Example 1

(Synthesis of Azo Pigment)

A synthesis scheme of an azo pigment (Pig.-1) is illustrated below.

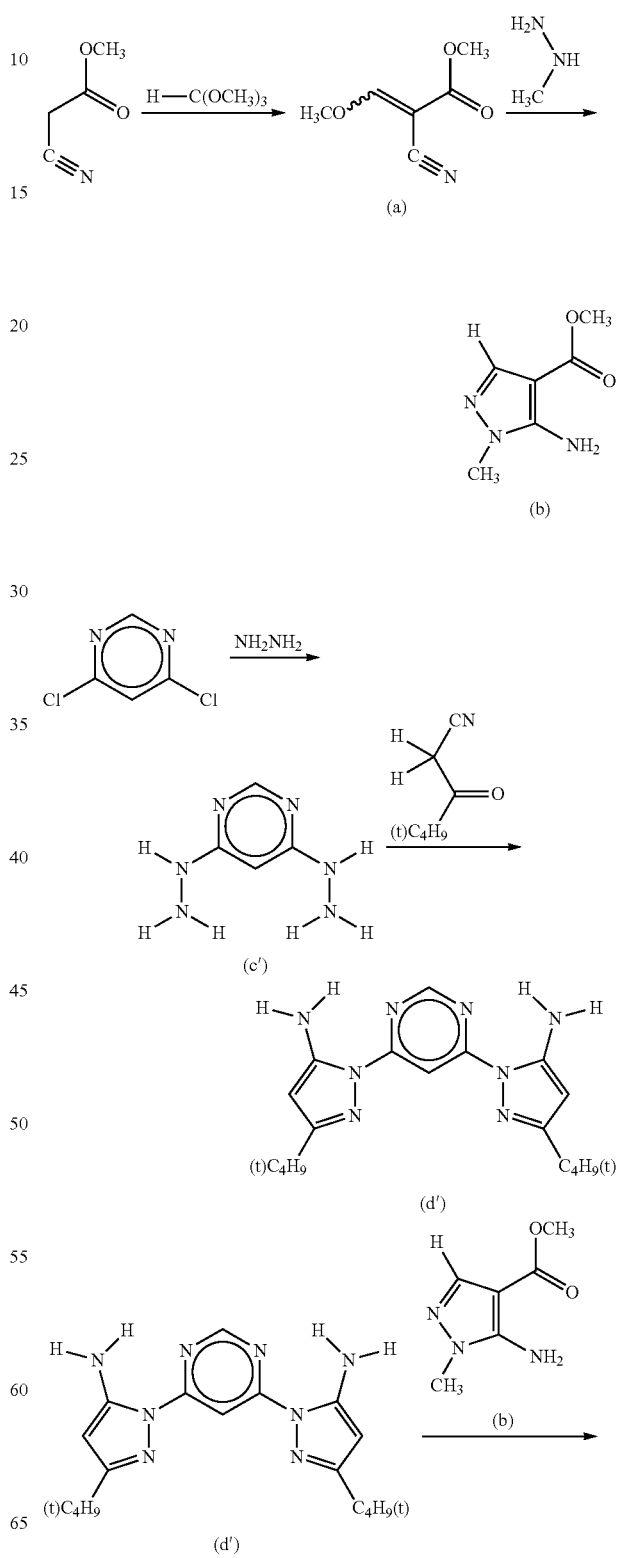

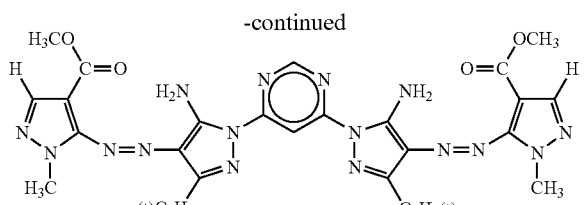

Pig.-1

(1) Synthesis of Intermediate (a)

42.4 g (0.4 mol) of trimethyl orthoformate, 20.4 g (0.2 mol) of glacial acetic acid, and 0.5 g of p-toluenesulfonic acid are added to 29.7 g (0.3 mol) of methyl cyanoacetate, and the resulting mixture is heated to 110° C. (external temperature), followed by stirring for 20 hours with distilling off low-boiling components produced from the reaction system. The resulting reaction solution is concentrated under reduced pressure, and is subjected to purification by silica gel column to obtain 14.1 g (yellow powder; yield: 30%) of the intermediate (a). Results of NMR measurement of the thus-obtained intermediate (a) are as follows. $^1$H-NMR (300 MHz, CDCl$_3$): 7.96 (s, 1H), 4.15 (s, 3H), 3.81 (s, 3H)

(2) Synthesis of Intermediate (b)

150 mL of isopropanol is added to 7.4 mL (141 mmol) of methylhydrazine, followed by cooling to 15° C. (internal temperature). After gradually adding 7.0 g (49.6 mmol) of the intermediate (a) to this mixed solution, the resulting mixture is heated to 50° C. and stirred for 1 hour and 40 minutes. This reaction solution is concentrated under reduced pressure, and is then subjected to purification by silica gel column to obtain 10.5 g (white powder; yield: 50%) of the intermediate (b). Results of NMR measurement of the thus-obtained intermediate (b) are as follows. $^1$H-NMR (300 MHz, CDCl$_3$): 7.60 (s, 1H), 4.95 (brs, 2H), 3.80 (s, 3H), 3.60 (s, 3H)

(3) Synthesis of Intermediate (c')

Methanol in an amount of 298 mL was added to 387 mL (7.98 mol) of hydrazine monohydrate, and cooled to 10° C. (internal temperature). To the mixture thus prepared, 149 g (1.00 mol) of 4,6-dichloropyrimidine was added little by little (at internal temperatures of 20° C. or below). After the addition, the ice bath used was removed, and the resultant mixture was warmed up to room temperature and, at this temperature, the stirring thereof was continued for 30 minutes. Thereafter, the reaction system was further heated until the internal temperature thereof was raised to 60° C., and at this temperature the stirring thereof was continued for 5 hours. At the conclusion of the reaction, 750 mL of water was added to the reaction mixture, and cooled with an ice bath until the internal temperature reached 8° C. Crystals thus precipitated out were filtered off, and washed by sousing them with water, and subsequently with isopropanol. The crystals thus washed were subjected to 36 hours' drying at room temperature, thereby giving 119 g of the intermediate (c') (white powder, 84.5% yield). NMR-measurement results on the intermediate (c') thus obtained are as follows. $^1$H-NMR (300 MHz, d-DMSO): 7.80 (s, 1H), 7.52 (s, 2H), 5.98 (s, 1H), 4.13 (s, 4H)

(4) Synthesis of Intermediate (d')

The intermediate (c') in an amount of 50 g (357 mmol) was stirred into 128 mL of water at room temperature. To a suspension thus prepared, 98.2 g (785 mmol) of pivaloylacetonitrile was added. Thereto, 12M hydrochloric acid was added dropwise at the same temperature as specified above. Thereafter, the reaction system was heated until the internal temperature thereof reached 50° C., and at this temperature the stirring was carried out for 6 hours. At the conclusion of the reaction, the reaction mixture obtained was neutralized by addition of 8N aqueous solution of potassium hydroxide, and thereby adjusted to pH 6.4. The thus adjusted reaction mixture was cooled with ice until the internal temperature thereof reached 10° C. Crystals thus precipitated out were filtered off, washed by sousing them with water, and dried at 60° C. under reduced pressure. To these rough-purified crystals, 30 mL of toluene was added and heated up to 60° C., thereby making a solution. The solution obtained was allowed to stand for 12 hours at room temperature, and crystals thus precipitated out was filtered off, washed by sousing them with cooled toluene and dried at 60° C. under reduced pressure. Thus, 87.7 g of the intermediate (d') (white powder, 69.3% yield) was obtained. NMR-measurement results on the intermediate (d') obtained are as follows. $^1$H-NMR (300 MHz, d-DMSO): 8.74 (s, 1H), 7.99 (s, 1H), 6.87 (s, 4H), 5.35 (s, 2H), 1.24 (s, 18H)

(5) Synthesis of Pigment (Pig.-1)

In a mixture of 55 mL of acetic acid and 37 mL of propionic acid, 9.2 g of the intermediate (b) was dissolved. The solution prepared was cooled with an ice bath until the internal temperature thereof reached −3° C., and thereto 40 mass % sulfuric acid solution of nitrosylsulfuric acid was added dropwise over 10 minutes at internal temperatures from −3° C. to 4° C. This reaction system was subjected to one-hour stirring at the internal temperature of 4° C., and thereto 0.2 g urea was added. Thereafter, the internal temperature was lowered to −3° C. and the stirring was continued for additional 10 minutes. Thus, a diazonium salt solution was obtained. Aside from the foregoing reaction, 10 g of the intermediate (d') was dissolved thoroughly in 150 mL of acetone, and the internal temperature thereof was cooled to 17° C. Thereto, the diazonium salt solution was added dropwise over 25 minutes at internal temperatures from −3° C. to 3° C. After the conclusion of the addition, the stirring was carried out for 30 minutes at 3° C., then the ice bath was removed, and further the internal temperature was raised to room temperature over 30 minutes. The stirring was further continued for 30 minutes at room temperature. Crystals thus precipitated out were filtered off, washed by sousing them with 150 mL of acetone, and subsequently with 100 mL of water. The crystals obtained were suspended in 400 mL of water without themselves being dried, and the suspension thus prepared was adjusted to pH 5.7 by addition of an 8N aqueous solution of potassium hydroxide. The resulting suspension was stirred for 20 minutes at room temperature, and crystals thus obtained were filtered off and washed by sousing them with plenty of water, and subsequently with 80 mL of acetone. The crystals thus obtained were dried for 12 hours at room temperature.

The thus dried crystals were suspended in 580 mL of acetone, and stirred for 30 minutes under reflux. Then the suspension was cooled to room temperature over 10 minutes. The crystals thus precipitated out were filtered off, and dried for 5 hours at room temperature to give 17.1 g of pigment (Pig.-1). The yield was 88.5%.

The azo pigment obtained (Pig.-1) was visually observed under a transmission microscope (JEM-10101 Electron Microscope, made by JEOL Ltd.). As a result, the length of each primary particle in the longer direction was found to be about 15 μm.

When X-ray diffraction measurement was made on the pigment (Pig.-1) under the conditions mentioned above, distinctive X-ray diffraction peaks were found at the Bragg angles (2θ±0.2°) of 7.6° and 25.6°. CuKα characteristic X-ray diffraction pattern of the pigment Pig.-1 was shown in FIG. 1.

Synthesis Example 2

(Synthesis of Azo Pigment)

A synthesis scheme of an azo pigment (Pig.-18) is illustrated below.

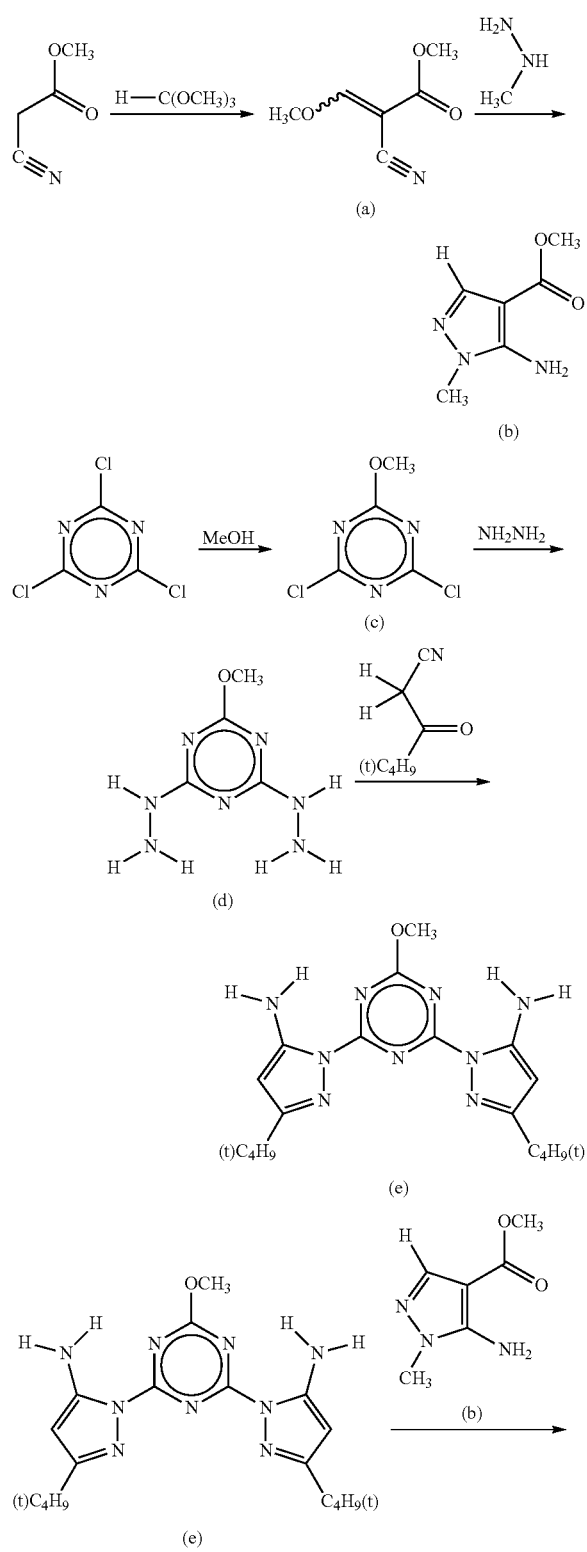

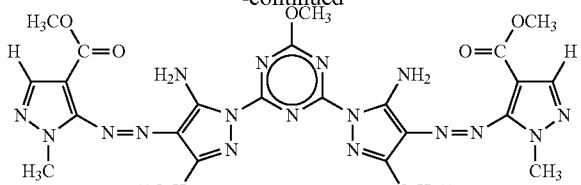

Pig.-18

(1) Synthesis of Intermediate (a)

To 29.7 g (0.3 mol) of methyl cyanoacetate, 42.4 g (0.4 mol) of trimethyl orthoformate, 20.4 g (0.2 mol) of acetic anhydride and 0.5 g of p-toluenesulfonic acid were added, and heated up to 110° C. (external temperature). This reaction system was stirred for 20 hours as low boiling components produced therein were distilled away. The reaction solution obtained was subjected to reduced-pressure concentration, and then to purification with a silica gel column. Thus 14.1 g of the intermediate (a) (yellow powder, 30% yield) was obtained. NMR-measurement results on the intermediate (a) obtained are as follows. $^1$H-NMR (300 MHz, CDCl$_3$): 7.96 (s, 1H), 4.15 (s, 3H), 3.81 (s, 3H)

(2) Synthesis of Intermediate (b)

To 7.4 mL (141 mmol) of methylhydrazine, 150 mL of isopropanol was added, and cooled to 15° C. (internal temperature). To this mixed solution, 7.0 g (49.6 mmol) of the intermediate (a) was added little by little, heated up to 50° C., and stirred for 1 hour and 40 minutes. This reaction solution was subjected to reduced-pressure concentration, and then to purification with a silica gel column. Thus 10.5 g of the intermediate (b) (white powder, 50% yield) was obtained. NMR-measurement results on the intermediate (b) obtained are as follows. $^1$H-NMR (300 MHz, CDCl$_3$): 7.60 (s, 1H), 4.95 (brs, 2H), 3.80 (s, 3H), 3.60 (s, 3H)

(3) Synthesis of Intermediate (c)

136 mL of water is added to 1.1 L of methanol, and 182 g (2.17 mol) of sodium hydrogencarbonate is added thereto, followed by stirring at room temperature. To the resulting mixture is added 200 g (1.08 mol) of cyanuric chloride by portions at the same temperature. After completion of the addition, the internal temperature is increased to 30° C. After stirring for 30 minutes at the same temperature, 500 mL of water is added thereto, and a precipitated solid product is collected by filtration, spray washed with 500 mL of water and 300 mL of methanol, and dried to obtain 168 g (white powder; yield: 86.2%) of the intermediate (c). Results of NMR measurement of the thus-obtained intermediate (c) are as follows. $^1$H-NMR (300 MHz, CDCl$_3$): 4.14 (s, 3H)

(4) Synthesis of Intermediate (d)

673 mL of water is added to 363 mL (7.46 mol) of hydrazine monohydrate, and the resulting mixture is cooled to 10° C. (internal temperature) and, after gradually adding to this mixed solution 168 g (934 mmol) of the intermediate (c) (at an internal temperature of 20° C. or lower), the ice bath is removed, and the temperature of the reaction solution is allowed to increase to room temperature, followed by stirring for 30 minutes at the same temperature. Crystals precipitated from the reaction solution are collected by filtration, spray washed with 700 mL of water and 1 L of acetonitrile, and dried to obtain a crudely purified product of the intermediate (d) (white powder).

(5) Synthesis of Intermediate (e)

480 mL of ethylene glycol is added to a crudely purified product of the intermediate (d), and the mixture is stirred at room temperature. To this suspension is added 257 g (2.06 mol) of pivaloylacetonitrile, and the resulting mixture is heated till the internal temperature reaches 80° C. A 12M hydrochloric acid aqueous solution is added thereto to adjust the pH to 3, and the resulting mixture is heated till the internal temperature reaches 80° C., followed by stirring for 3 hours. After completion of the reaction, the reaction solution is cooled with ice to an internal temperature of 8° C., and the precipitated crystals are collected by filtration, spray washed with water, and subjected to purification by silica gel column to obtain 105 g (white powder; yield: 29.2% through two steps). Results of NMR measurement of the thus-obtained intermediate (e) are as follows. $^1$H-NMR (300 MHz, d-DMSO): 7.00 (s, 4H), 5.35 (s, 2H), 4.05 (s, 3H), 5.35 (s, 2H), 1.22 (s, 18H)

(6) Synthesis of Azo Pigment (Pig.-18)

A mixed solution of 125 mL of acetic acid and 24 mL of sulfuric acid is cooled with ice to an internal temperature of 3° C. 26.4 g of nitrosylsulfuric acid is added thereto at the same temperature and, subsequently, 11.6 g of the intermediate (b) is added thereto by portions at the same temperature to dissolve. After stirring for 1 hour at the same temperature, 1.2 g of urea is added thereto by portions at the same temperature, followed by stirring for 15 minutes at the same temperature to obtain a diazonium salt solution. Separately, 11.6 g of the intermediate (e) is completely dissolved in 405 mL of methanol, and cooled with ice to an internal temperature of −3° C. The above-described diazonium salt solution is added thereto by portions so that the internal temperature becomes 3° C. or lower and, after completion of the addition, the reaction solution is stirred for 2 hours. The ice bath is removed, and the reaction solution is stirred at room temperature for 10 minutes. Precipitated crystals are collected by filtration, spray washed with 150 mL of methanol, then further spray washed with 100 mL of water. Crystals thus-obtained are suspended in 750 mL of water without drying, and a 8N potassium hydroxide aqueous solution is added thereto to adjust the pH to 5.7. After stirring at room temperature for 20 minutes, resulting crystals are collected by filtration, sufficiently spray washed with water, and then spray washed with 80 mL of methanol. The thus-obtained crystals are dried at room temperature for 12 hours.

The thus-obtained crystals are suspended in a mixed solution of 180 mL of dimethylacetamide and 180 mL of water, and then the internal temperature is raised to an internal temperature of 85° C., followed by stirring at the same temperature for 2 hours. Thereafter, the resulting crystals are collected by hot filtration and suspended in 300 mL of methanol, and the suspension is stirred at room temperature for 30 minutes. The resulting crystals are collected by filtration, and dried at room temperature for 5 hours to obtain 19.5 g of the azo pigment (Pig.-18). Yield: 90.3%.

Visual observation of the thus-obtained azo pigment (Pig.-18) under a transmission microscope (manufactured by JEOL Ltd.; JEM-10 electron microscope) reveals that the length of the long axis of primary particles is about 150 nm.

When X-ray diffraction of the azo pigment (Pig.-18) is measured under the aforesaid conditions, characteristic X-ray peaks are shown at Bragg angles (2θ±0.2°) of 7.2° and 25.9.

Figure 2:
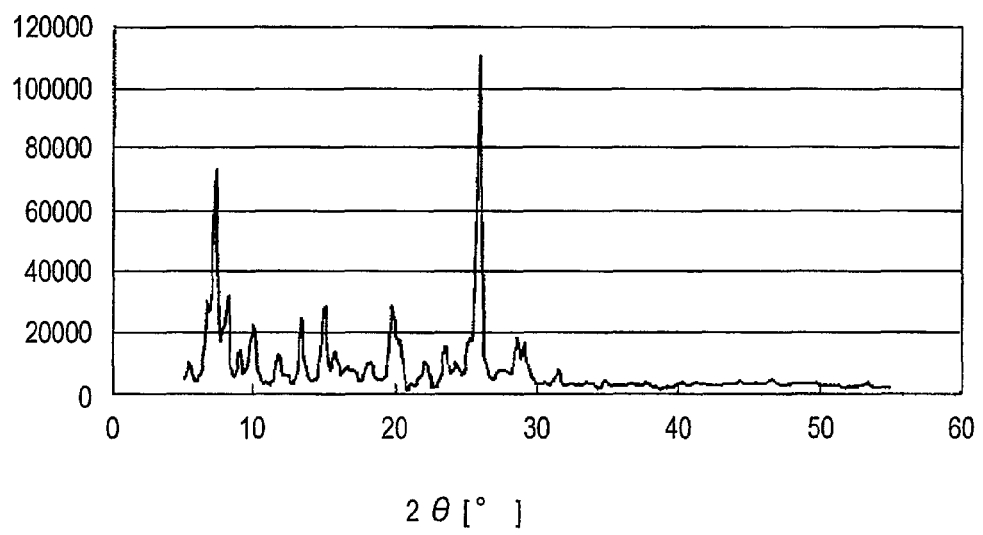
FIG. 2 is a CuKα characteristic X-ray diffraction pattern of a specific example compound Pig. 18 synthesized according to Synthesis Example 2.

The X-ray diffraction pattern with characteristic Cu Kα line is shown in FIG. 2.

Synthesis Examples 3 to 19

Azo pigments of the invention shown in the following Table 1 are synthesized according to the above-described synthesis process of the above-illustrative compounds (Pig.-1) and (Pig.-18) shown in the above-described Synthesis Examples 1 and 2 or by combining the production process of the azo pigments of the present invention.

The X-ray diffraction patterns with characteristic Cu Kα line of the thus-obtained azo pigments are shown in FIGS. 3 to 19.

TABLE 1

Figure 3:
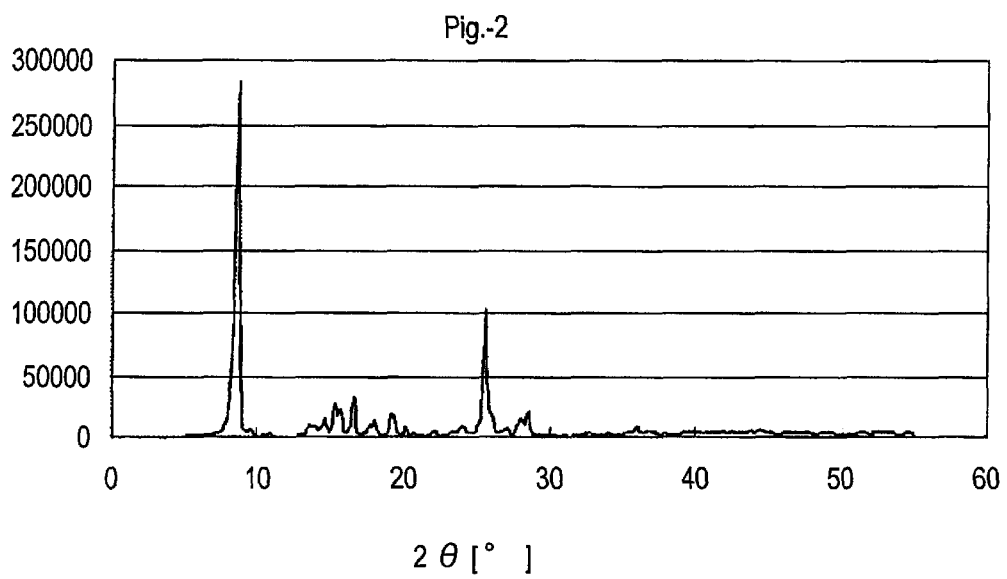
FIG. 3 is a CuKα characteristic X-ray diffraction pattern of a specific example compound Pig. 2 synthesized according to Synthesis Example 3.
Figure 4:
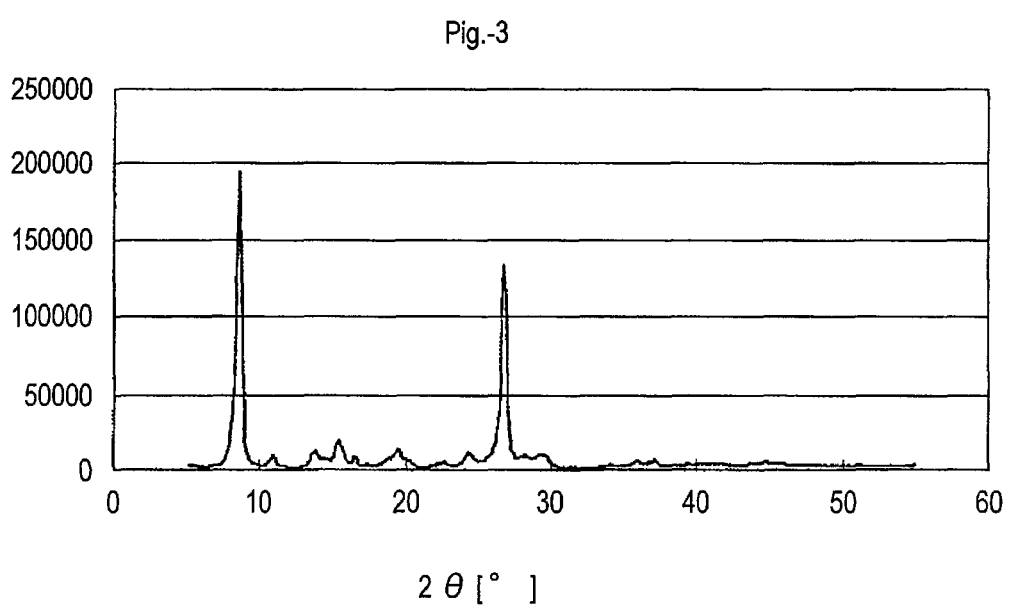
FIG. 4 is a CuKα characteristic X-ray diffraction pattern of a specific example compound Pig. 3 synthesized according to Synthesis Example 4.
Figure 5:
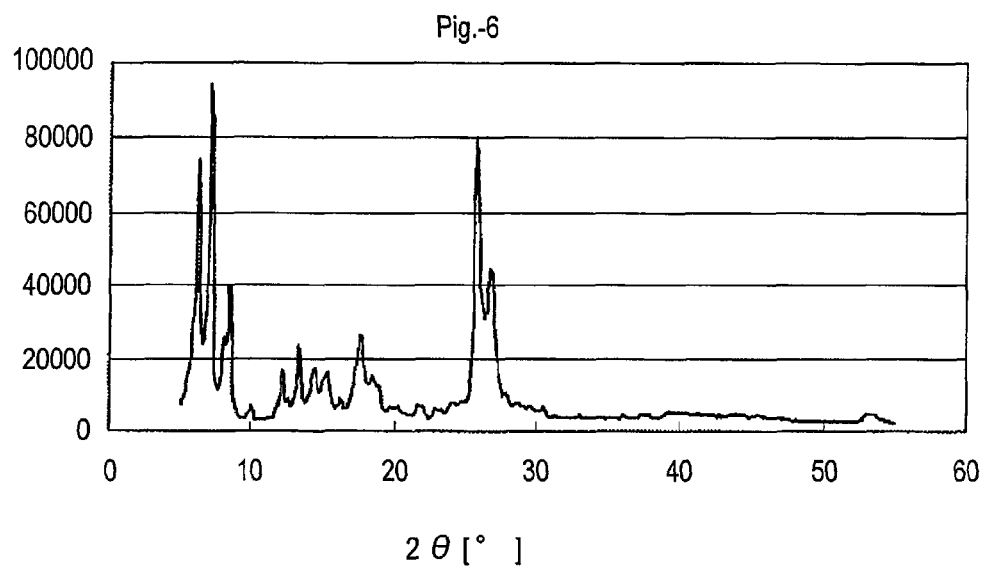
FIG. 5 is a CuKα characteristic X-ray diffraction pattern of a specific example compound Pig. 6 synthesized according to Synthesis Example 5.
Figure 6:
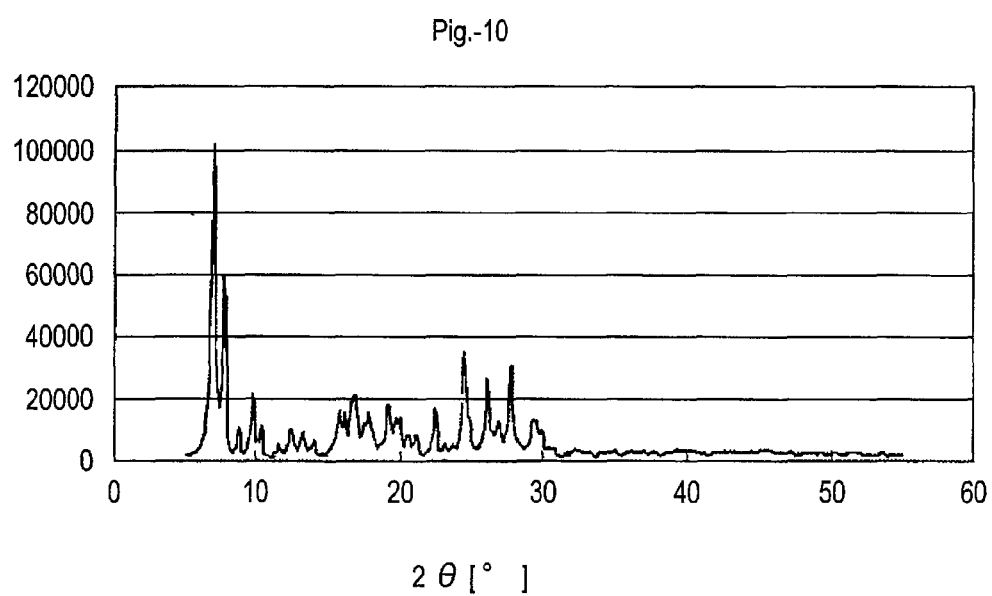
FIG. 6 is a CuKα characteristic X-ray diffraction pattern of a specific example compound Pig. 10 synthesized according to Synthesis Example 6.
Figure 7:
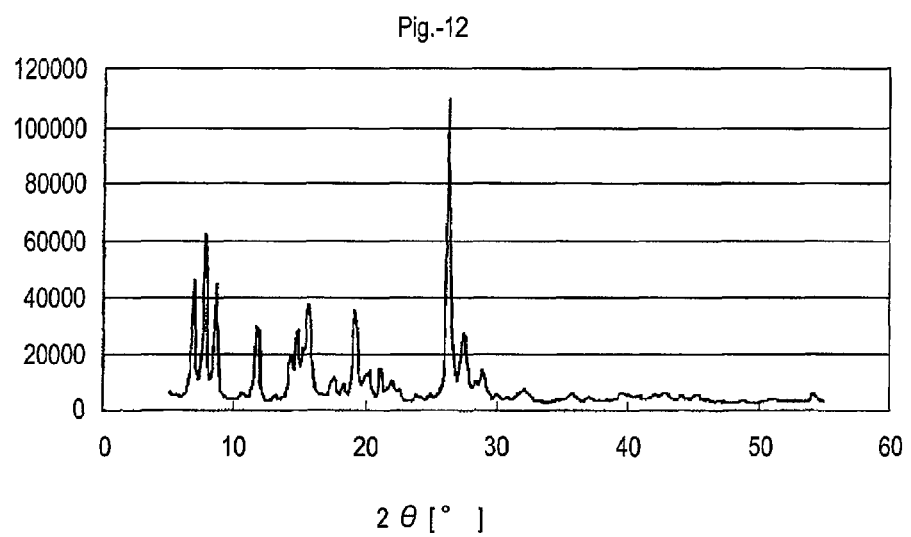
FIG. 7 is a CuKα characteristic X-ray diffraction pattern of a specific example compound Pig. 12 synthesized according to Synthesis Example 7.
Figure 8:
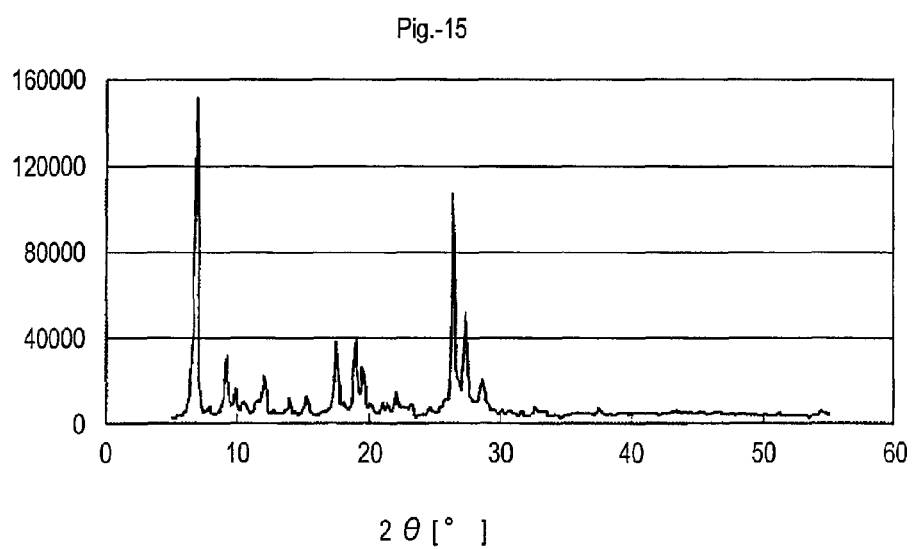
FIG. 8 is a CuKα characteristic X-ray diffraction pattern of a specific example compound Pig. 15 synthesized according to Synthesis Example 8.
Figure 9:
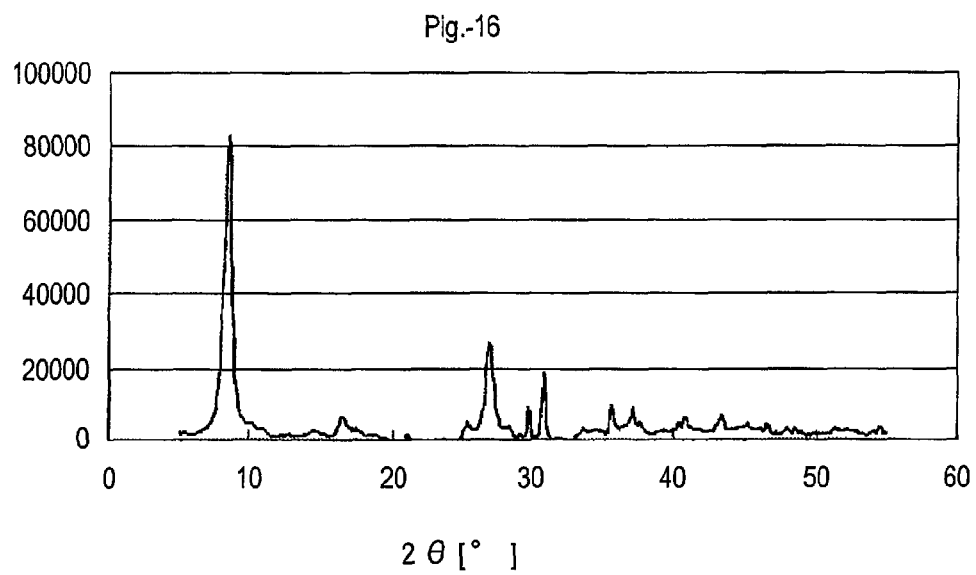
FIG. 9 is a CuKα characteristic X-ray diffraction pattern of a specific example compound Pig. 16 synthesized according to Synthesis Example 9.
Figure 10:
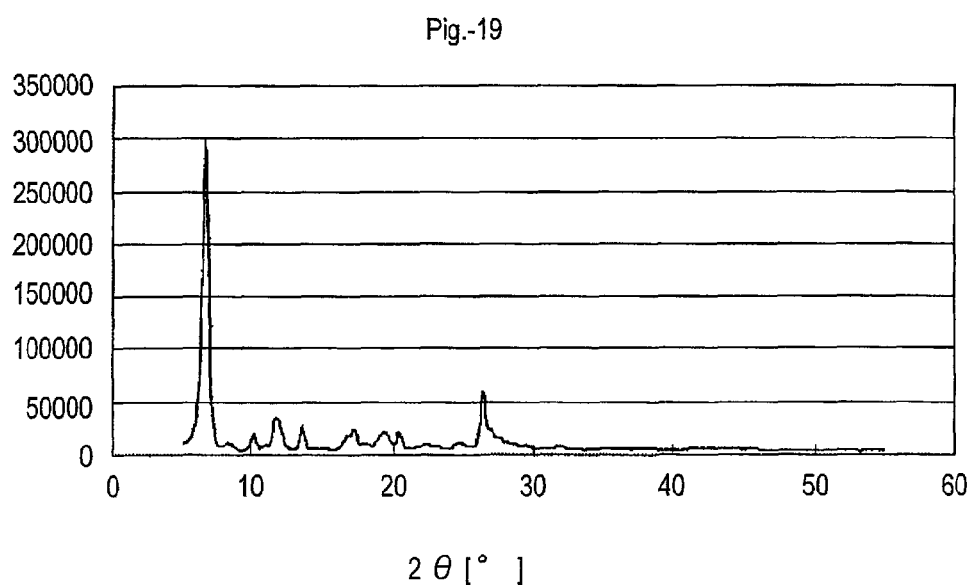
FIG. 10 is a CuKα characteristic X-ray diffraction pattern of a specific example compound Pig. 19 synthesized according to Synthesis Example 10.
Figure 11:
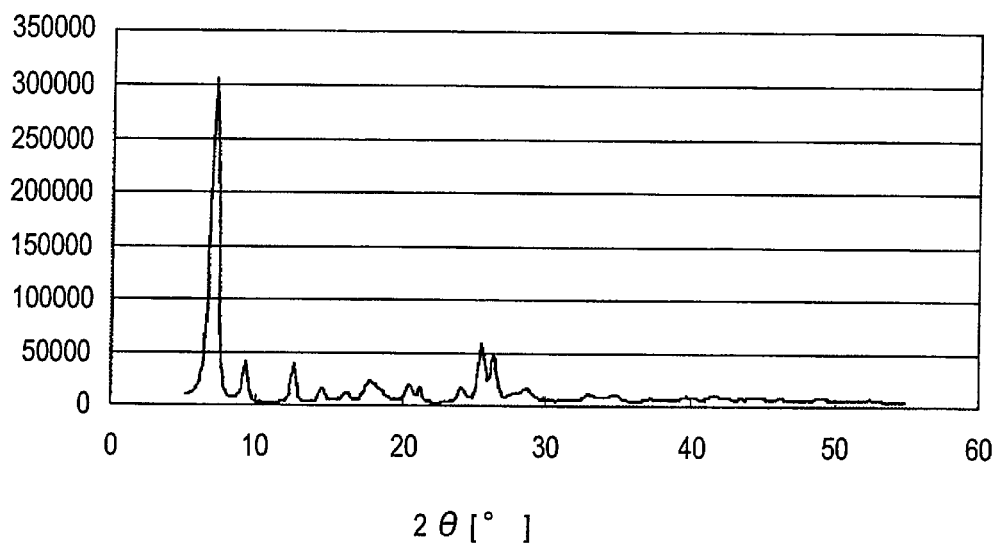
FIG. 11 is a CuKα characteristic X-ray diffraction pattern of a specific example compound Pig. 21 synthesized according to Synthesis Example 11.
Figure 12:
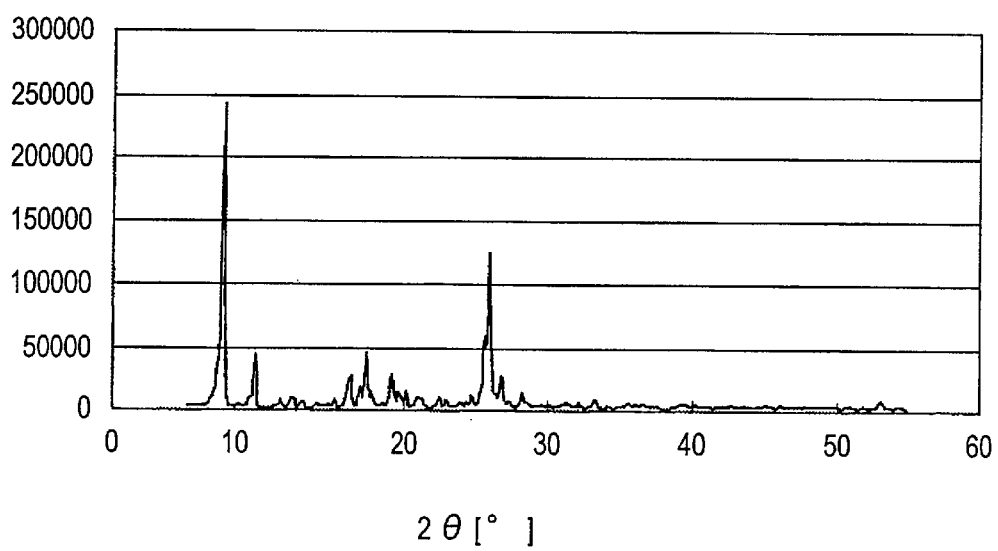
FIG. 12 is a CuKα characteristic X-ray diffraction pattern of a specific example compound Pig. 24 synthesized according to Synthesis Example 12.
Figure 13:
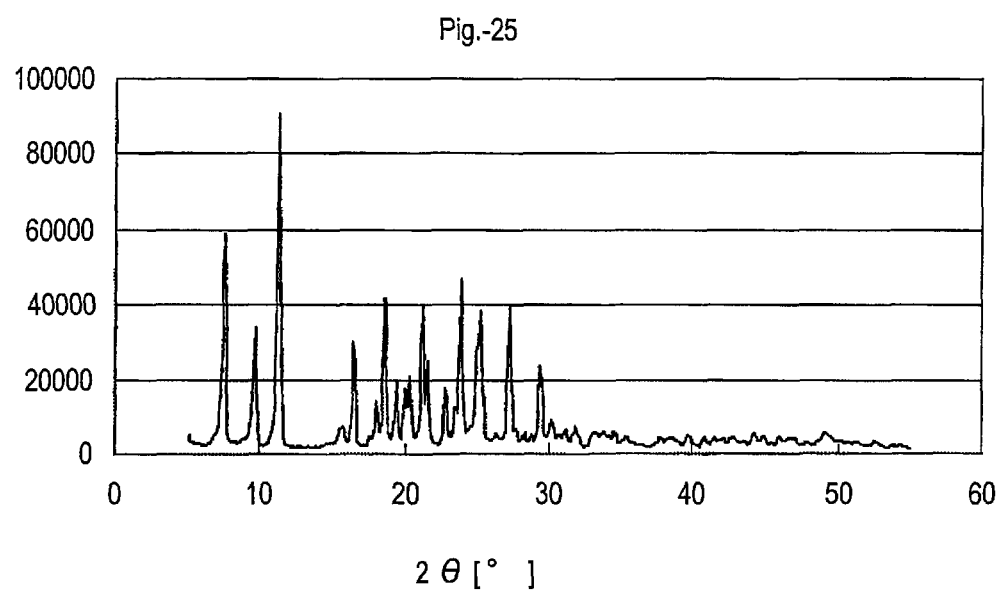
FIG. 13 is a CuKα characteristic X-ray diffraction pattern of a specific example compound Pig. 25 synthesized according to Synthesis Example 13.
Figure 14:
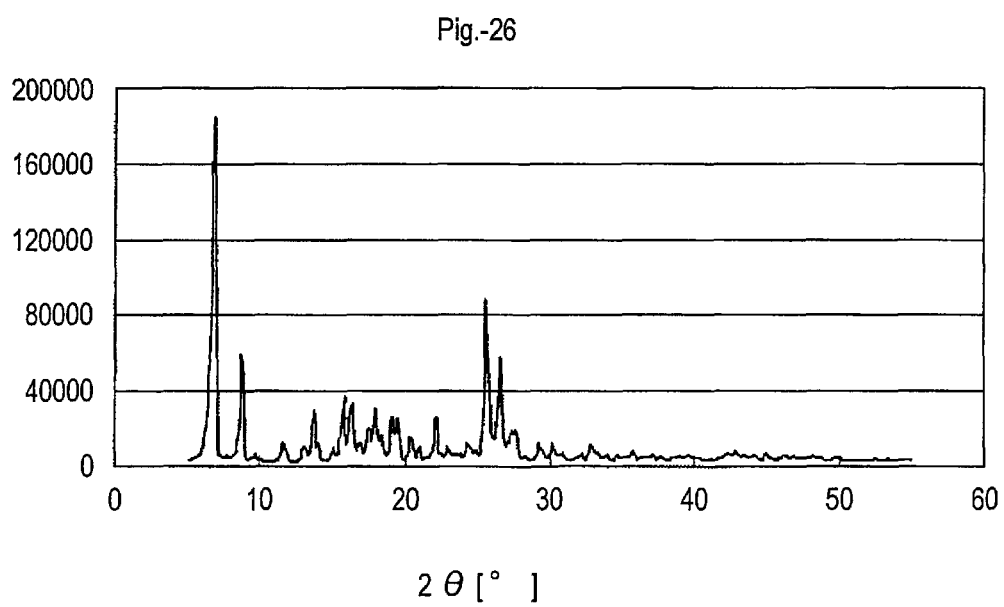
FIG. 14 is a CuKα characteristic X-ray diffraction pattern of a specific example compound Pig. 26 synthesized according to Synthesis Example 14.
Figure 15:
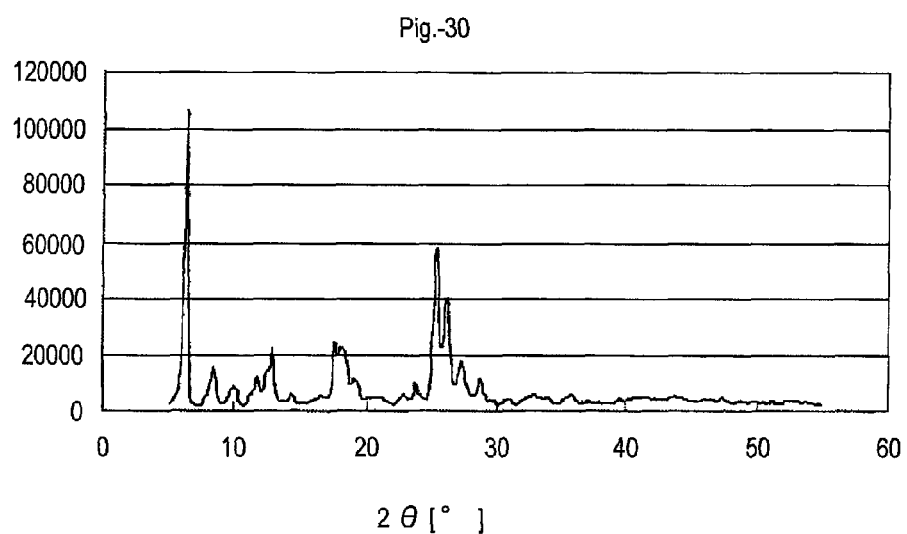
FIG. 15 is a CuKα characteristic X-ray diffraction pattern of a specific example compound Pig. 30 synthesized according to Synthesis Example 15.
Figure 16:
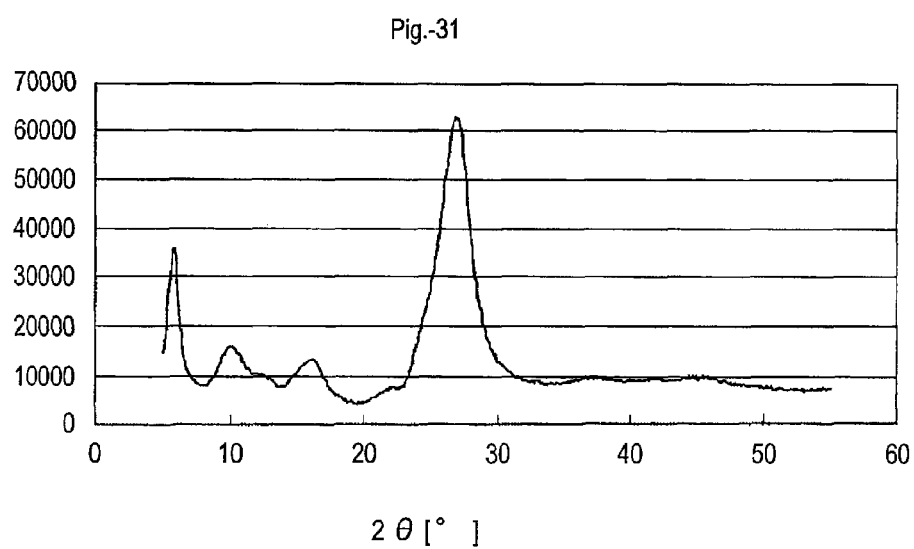
FIG. 16 is a CuKα characteristic X-ray diffraction pattern of a specific example compound Pig. 31 synthesized according to Synthesis Example 16s.
Figure 17:
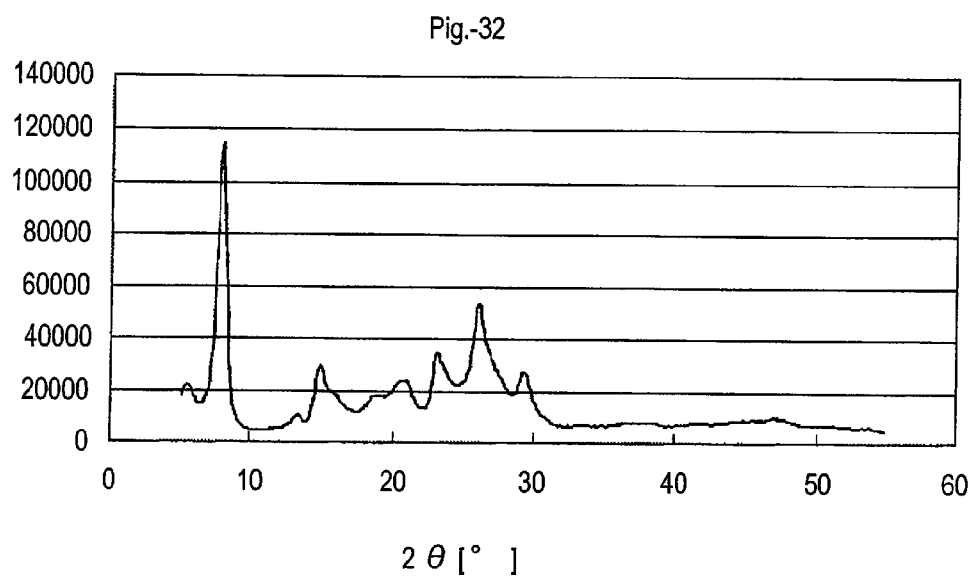
FIG. 17 is a CuKα characteristic X-ray diffraction pattern of a specific example compound Pig. 32 synthesized according to Synthesis Example 17.
Figure 18:
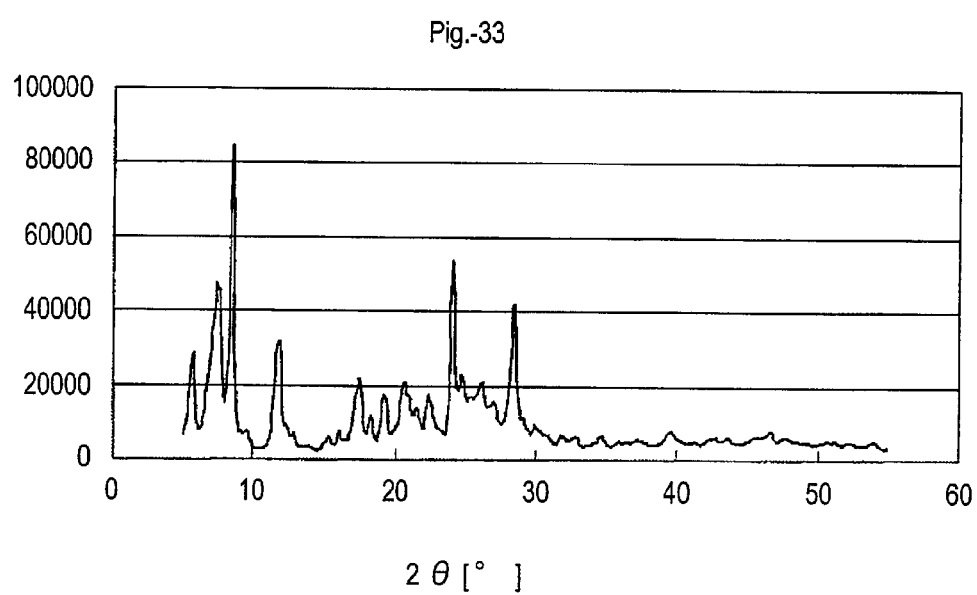
FIG. 18 is a CuKα characteristic X-ray diffraction pattern of a specific example compound Pig. 33 synthesized according to Synthesis Example 18.
Figure 19:
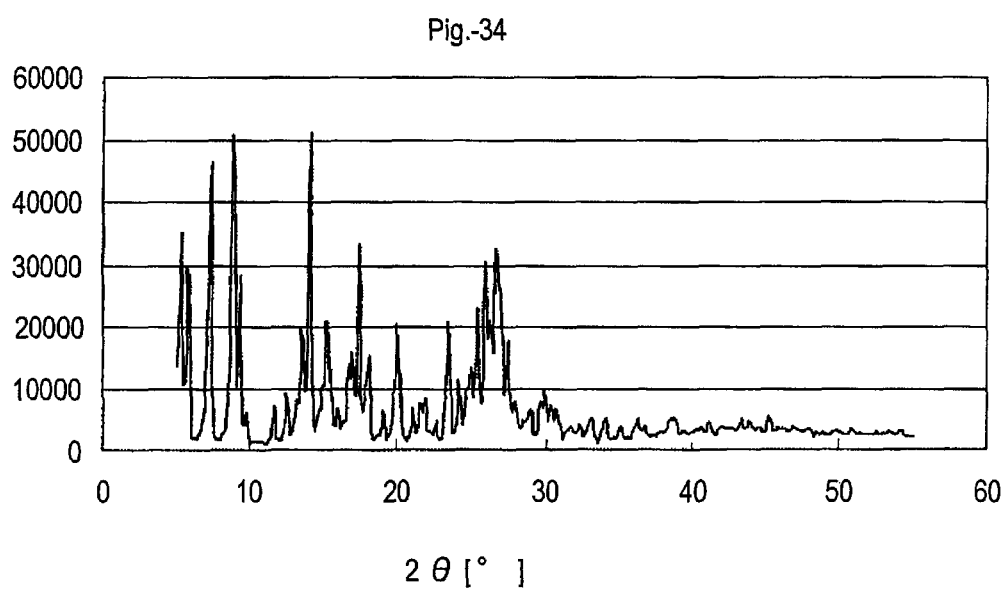
FIG. 19 is a CuKα characteristic X-ray diffraction pattern of a specific example compound Pig. 34 synthesized according to Synthesis Example 19.

| Azo Pigment of Invention | X-ray Diffraction Pattern with characteristic Cu Kα line |
| --- | --- |
| Pig.-1 | FIG. 1 |
| Pig.-18 | FIG. 2 |
| Pig.-2 | FIG. 3 |
| Pig.-3 | FIG. 4 |
| Pig.-6 | FIG. 5 |
| Pig.-10 | FIG. 6 |
| Pig.-12 | FIG. 7 |
| Pig.-15 | FIG. 8 |
| Pig.-16 | FIG. 9 |
| Pig.-19 | FIG. 10 |
| Pig.-21 | FIG. 11 |
| Pig.-24 | FIG. 12 |
| Pig.-25 | FIG. 13 |
| Pig.-26 | FIG. 14 |
| Pig.-30 | FIG. 15 |
| Pig.-31 | FIG. 16 |
| Pig.-32 | FIG. 17 |
| Pig.-33 | FIG. 18 |
| Pig.-34 | FIG. 19 |

Synthesis Example 20

(Synthesis of Vinyl Polymer (P-1))

Ingredients of the following monomer composition were mixed in their respective proportions so that their contents became 100 parts by mass in total, and further admixed with 1 parts by mass of 2,2'-azobis(2,4-dimethylvaleronitrile) as a polymerization initiator. The resulting mixture was subjected to thorough nitrogen-gas displacement, and thereby a mixed solution for synthesis was obtained.

| | |
| --- | --- |
| Phenoxyethylmethacrylate | 50 parts by mass |
| Methylmethacrylate | 39 parts by mass |
| Methacrylic acid | 11 parts by mass |
| 2-Mercaptomethanol | 0.1 parts by mass |

Next 100 parts by mass of methyl ethyl ketone was heated up to 75° C. with stirring under an atmosphere of nitrogen gas. Thereto, the mixed solution for synthesis was added dropwise over 3 hours as the stirring was continued and the temperature was kept at 75° C. Therein, reaction was further continued for 5 hours at 75° C. with stirring. Thereafter, reaction products obtained was spontaneously cooled to 25° C., and diluted by addition of methyl ethyl ketone in such an amount as to adjust the solid content to 50%. A vinyl polymer solution thus obtained had a weight-average molecular weight (Mw) of 41,000 as determined by GPC and an acid value of 71.7 mg KOH/g as determined by the method described in Japanese Industrial Standards (JIS K 0070, 1992).

Example 1

(Preparation of Aqueous Dispersion of Pigment-Containing High-Molecular Vinyl Polymer Particles)

Ten parts by mass of the 50% high-molecular vinyl polymer solution obtained was neutralized by addition of a 5 mol/L aqueous solution of sodium hydroxide. Specifically, the alkali was added in the amount required for complete neutralization of methacrylic acid or acrylic acid in the high-molecular vinyl polymer. The vinyl polymer solution thus neutralized was kneaded with 10 parts by mass of Pig.-1 as an example compound of the pigments according to the invention for the time required, say, 2 to 8 hours by use of a roll mill. The kneaded substance was dispersed into 100 parts by mass of ion exchange water. The dispersion thus obtained was concentrated by complete removal of the organic solvents at 55° C. under reduced pressure, and further removal of the water, thereby giving a 15 mass % (on a solids basis) aqueous dispersion of pigment-containing high-molecular vinyl polymer particles.

(Preparation of Self-Dispersible Polymer Fine Particles)

Into a 2 L three necked flask equipped with a stirrer, a thermometer, a reflux condenser and a nitrogen-gas introduction tube, 350.0 g of methyl ethyl ketone was poured, and heated up to 75° C. While keeping the internal temperature of the reaction vessel at 75° C., a mixed solution containing 162.0 g of phenoxyethylacrylate, 180.0 g of methylmethacrylate, 18.0 g of acrylic acid, 70 g of methyl ethyl ketone and 1.44 g of V-601 (produced by Wako Pure Chemical Industries, Ltd.) was added dropwise at a constant speed so that it took 2 hours to complete the addition. At the conclusion of the addition, a solution containing 0.72 g of V-601 and 36.0 g of methyl ethyl ketone was added and subjected to 2-hour stirring at 75° C., and then a solution containing 0.72 g of V-601 and 36.0 g of isopropanol was further added and subjected to 2-hour stirring at 75° C. Thereafter, the reaction mixture was heated up to 85° C. and continued to undergo stirring for additional 2 hours. The mass-average molecular weight (Mw) of the copolymer thus obtained was found to be 64,000 (as measured by gel permeation chromatography (GPC) and calculated in terms of polystyrene, wherein the columns used were TSKgel Super HZM-H, TSKgel Super HZ4000 and TSKgel Super HZ200 (products of Tosoh Corporation)), and the acid value of the copolymer obtained was found to be 38.9 mg KOH/g.

Next 668.3 g of the copolymer solution was weighed out, admixed with 388.3 g of isopropanol and 145 ml of a 1 mol/L aqueous solution of NaOH, and heated until the internal temperature of the reaction vessel reached 80° C. Thereto, 720.1 g of distilled water was added dropwise at a speed of 20 ml/min, and thereby the copolymer was dispersed into water. Thereafter, the internal temperature of the reaction vessel under atmospheric pressure was kept at 80° C. for 2 hours, at 85° C. for 2 hours and at 90° C. for 2 hours. Subsequently thereto, by reducing the internal pressure of the reaction vessel, isopropanol, methyl ethyl ketone and distilled water were distilled away in a total amount of 913.7 g. Thus, a 28.0%, on a solids basis, aqueous dispersion (emulsion) of self-dispersible polymer particles (B-01) was obtained.

| | |
|---|---|
| Aqueous dispersion of high-molecular vinyl polymer particles containing the pigment specified above | 25 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 parts by mass |
| Olfine E1010 (produced by Nissin Chemical Co., Ltd.) | 1 parts by mass |
| Aqueous dispersion of self-dispersible polymer fine particles (B-01) | 15 parts by mass |
| Ion exchange water | 28 parts by mass |

The foregoing ingredients were mixed to give a yellow ink composition 1.

When the ink composition was measured for pH by use of a pH meter WM-50EG made by DKK-TOA Corporation, the pH was found to be 8.5.

IC-42 magenta ink and IC-42 cyan ink produced by Seiko Epson Corp. were used as magenta ink and cyan ink, respectively.

Example 2

A yellow ink composition 2 was prepared in the same manner as in Example 1, except that the azo pigment (Pig.-1) incorporated into the composition used in Example 1 was replaced with the azo pigment (Pig.-2).

Example 3

A yellow ink composition 3 was prepared in the same manner as in Example 1, except that the azo pigment (Pig.-1) incorporated into the composition used in Example 1 was replaced with the azo pigment (Pig.-18).

Example 4

A yellow ink composition 4 was prepared in the same manner as in Example 1, except that the azo pigment (Pig.-1) incorporated into the composition used in Example 1 was replaced with the azo pigment (Pig.-24).

Example 5

A yellow ink composition 5 was prepared in the same manner as in Example 1, except that the azo pigment (Pig.-1) incorporated into the composition used in Example 1 was replaced with the azo pigment (Pig.-44).

Example 6

A yellow ink composition 6 was prepared in the same manner as in Example 1, except that the azo pigment (Pig.-1) incorporated into the composition used in Example 1 was replaced with the azo pigment (Pig.-45).

Example 7

Image patterns were printed in the same manner as in Example 1, except that magenta ink 1 prepared according to the following formula was used in place of IC42 magenta ink used in Example 1, and evaluations of hue, print characteristics and image fastness were performed on the printed image patterns.

<Magenta Ink Composition 1>

| | |
|---|---|
| Glycerin | 10.0 mass % |
| 4-Methyl-1,2-pentanediol | 8.0 mass % |
| Triethanolamine | 0.9 mass % |
| BYK-UV3510 (produced by BYK-Chemie) | 0.1 mass % |
| C.I. Pigment Violet 19 | 5.0 mass % |
| Styrene-acrylic acid copolymer resin | 2.0 mass % |
| Pure water | remainder |
| Sum total | 100.0 mass % |

Example 8

Image patterns were printed in the same manner as in Example 1, except that magenta ink composition 2 prepared according to the following formula was used in place of IC42 magenta ink used in Example 1, and evaluations of hue, print characteristics and image fastness were performed on the printed image patterns.

<Magenta Ink Composition 2>

| | |
|---|---|
| Glycerin | 10.0 mass % |
| 4-Methyl-1,2-pentanediol | 8.0 mass % |
| Triethanolamine | 0.9 mass % |
| BYK-UV3510 (produced by BYK-Chemie) | 0.1 mass % |
| Solid solution of 3.0 mass % of C.I. Pigment Violet 19 and 1.9 mass % of PR202 | |
| Styrene-acrylic acid copolymer resin | 2.0 mass % |
| Pure water | remainder |
| Sum total | 100.0 mass % |

Example 9

Image patterns were printed in the same manner as in Example 1, except that cyan ink composition 1 prepared according to the following formula was used in place of IC42 cyan ink used in Example 1, and evaluations of hue, print characteristics and image fastness were performed on the printed image patterns.

<Cyan Ink Composition 1>

| | |
|---|---|
| Glycerin | 10.0 mass % |
| 4-Methyl-1,2-pentanediol | 8.0 mass % |
| Triethanolamine | 0.9 mass % |
| BYK-UV3510 (produced by BYK-Chemie) | 0.1 mass % |
| C.I. Pigment Blue 15:3 | 4.0 mass % |
| Styrene-acrylic acid copolymer resin | 1.6 mass % |
| Pure water | remainder |
| Sum total | 100.0 mass % |

Example 10

Image patterns were printed in the same manner as in Example 1, except that cyan ink composition 2 prepared according to the following formula was used in place of IC42 cyan ink used in Example 1, and evaluations of hue, print characteristics and image fastness were performed on the printed image patterns.

<Cyan Ink Composition 2>

| | |
|---|---|
| Glycerin | 10.0 mass % |
| 4-Methyl-1,2-pentanediol | 8.0 mass % |
| Triethanolamine | 0.9 mass % |
| BYK-UV3510 (produced by BYK-Chemie) | 0.1 mass % |
| C.I. Pigment Blue 15:4 | 4.0 mass % |
| Styrene-acrylic acid copolymer resin | 1.6 mass % |
| Pure water | remainder |
| Sum total | 100.0 mass % |

Comparative Example 1

A comparative yellow ink composition 1 was prepared in the same manner as in Example 1, except that the composition incorporating the azo pigment (Pig.-1) used in Example 1 was replaced with C.I. Pigment Yellow 74 (Iralite Yellow GO produced by Ciba Specialty Chemicals).

Comparative Example 2

A comparative yellow ink composition 2 was prepared in the same manner as in Example 1, except that the composition incorporating the azo pigment (Pig.-1) used in Example 1 was replaced with C.I. Pigment Yellow 155 (INKJET YELLOW 4G VP2532 produced by Clariant).

Comparative Example 3

A comparative yellow ink composition 3 was prepared in the same manner as in Example 1, except that the composition incorporating the azo pigment (Pig.-1) used in Example 1 was replaced with C.I. Pigment Yellow 128 (CROMOPHTAL YELLOW 8GN produced by Ciba Specialty Chemicals).

Each of the yellow pigment ink solutions prepared in Examples 1 to 10 and Comparative Examples 1 to 3, respectively, was charged into a yellow ink solution cartridge for an inkjet printer PX-V630 made by Seiko Epson Corp., and by the use thereof a yellow monochromatic image pattern having stepwise-varied densities was printed under conditions of using as an image-receiving sheet a photographic paper CRISPIA <High Gloss> made by Seiko Epson Corp. and choosing no color correction from color settings and setting the print quality for photo, and evaluations of hue, print characteristics and image fastness were performed on the thus printed image pattern.

Image patters of yellow, magenta, cyan and black monochromes and image patterns of green and red colors were printed so that each pattern had densities varied stepwise and the OD value of each color ranged from 0.7 to 1.8. On these image patterns each, evaluations of hue, print characteristics, image fastness (fastness to light and ozone gas) and image quality were performed.

[Method of Hue Testing]

A yellow monochromatic image pattern having varying densities was printed, and reflection densities of the recorded material were measured with a spectrophotometer GRETAG SPM-50 (made by GRETAG).

The measurements were made on conditions of using a light source D50 and no filter for the light source and choosing absolute white from white color standards and a viewing angle of 2°, and thereby $L^*$, $a^*$ and $b^*$ values laid down by CIE were determined. Results obtained are shown in Table 2.

[Evaluation Criteria]

Rating A: $b^* \geq 95$ when $a^*$ is 0, and $a^* \leq -5$ when $b^*$ is 95 $b^* \leq 30$ in the case of $-5 \leq a^* \leq 0$, and $a^* \leq -10$ when $60 \leq b^* \leq 95$ Rating B: Either of the conditions for Rating A holds Rating C: Neither of the conditions for Rating A holds Further, evaluations of print characteristics were made. Results obtained are shown under the category of "tinctorial strength" in Table 2.

[Tinctrorial Strength Evaluation]

Each of the yellow pigment ink solutions was charged into a yellow ink solution cartridge for an inkjet printer PX-V630 made by Seiko Epson Corp., and by the use thereof a yellow solidly-shaded print pattern was formed under conditions of using as an image-receiving sheet a photographic paper CRISPIA <High Gloss> made by Seiko Epson Corp. and choosing no color correction from color settings and setting the print quality for photo. And a solid print having its monochromatic density in a range of $2.0 \leq ODmax$ is rated as A, one having its monochromatic density in a range of 1.8≤ODmax<2.0 is rated as B, one having its monochromatic density in a range of 1.5≤ODmax<1.8 is rated as C, and one having its monochromatic density in a range of Dmax<1.5 is rated as D.

[Method of Testing Fastness to Light]

By use of a weather meter (made by Atlas Corporation), the images were exposed to Xenon light (100,000 lux) for 42 days. With every fixed time lapse after the start of the exposure, the OD values of each color (each of yellow, red and green colors) recorded on each print were measured with a reflection densitometer (X-Rite 310TR). Additionally, these reflection densities were measured at 3 points of 0.7, 1.0 and 1.8.

From the results obtained, optical density remaining rates (ROD) were determined by use of the expression ROD (%)= $(D/D_0) \times 100$ (where D is an OD value after the exposure testing, and $D_0$ is an OD value before the exposure testing).

Further based on the results of the testing, fastness to light as to each color recorded on the recording material was ranked on a scale of A to D in accordance with the following evaluation criteria.

[Evaluation Criteria]

Rating A: ROD after 42-day lapse from the start of the testing is 85% or higher at every density point.

Rating B: ROD after 42-day lapse from the start of the testing is lower than 85% at any one of the density points.

Rating C: ROD after 42-day lapse from the start of the testing is lower than 85% at any two of the density points.

Rating D: ROD after 42-day lapse from the start of the testing is lower than 85% at all of the density points.

In this testing, the recorded material having received a slight reduction in ROD even by long exposure to light is regarded as excellent. The results obtained are shown under the category of "fastness to light" in Table 2.

[Method 1 for Testing Fastness to Ozone Gas]

Each recorded material was exposed to ozone gas for 21 days under the condition of adjusting an ozone gas concentration to 5 ppm (25° C., 50% RH). The ozone gas concentration was adjusted by use of an ozone gas monitor made by APPLICS (Model: OZG-EM-01). With every fixed time lapse after the start of the exposure, OD values of each color recorded on each print were measured with a reflection densitometer (X-Rite 310TR). Additionally, these reflection densities were measured at 3 points of 0.7, 1.0 and 1.8.

From the results obtained, optical density remaining rates (ROD) were determined by use of the expression ROD (%)= $(D/D_0) \times 100$. (In the expression, D is an OD value after the exposure testing, and $D_0$ is an OD value before the exposure testing.)

Further, based on the results of the testing, fastness to ozone gas as to each color recorded on the recording material was ranked on a scale of A to D in accordance with the following evaluation criteria.

Rating A: ROD after 21-day lapse from the start of the testing is 85% or higher at every density.

Rating B: ROD after 21-day lapse from the start of the testing is lower than 85% at any one of the density points.

Rating C: ROD after 21-day lapse from the start of the testing is lower than 85% at any two of the density points.

Rating D: ROD after 21-day lapse from the start of the testing is lower than 85% at all the densities.

In this testing, the recorded material having received a slight reduction in ROD even by long exposure to ozone gas is regarded as excellent. The results obtained are shown under the category of "fastness to ozone gas" in Table 2.

TABLE 2

| Ink Composition (Ink set) | Coloring Agent (Yellow pigment) | Hue of Yellow Monochrome | Tinctorial Strength of Yellow Monochrome | Fastness to Light | | | Fastness to Ozone Gas | | |
|---|---|---|---|---|---|---|---|---|---|
| | | | | Yellow | Red | Green | Yellow | Red | Green |
| Example 1 | Pig.-1 | A | B | A | A | A | A | B | B |
| Example 2 | Pig.-2 | A | B | A | A | A | A | B | B |
| Example 3 | Pig.-18 | A | A | B | A | A | A | B | B |
| Example 4 | Pig.-24 | A | B | A | A | A | A | B | B |
| Example 5 | Pig.-44 | A | A | B | A | A | A | B | B |
| Example 6 | Pig.-45 | A | A | B | A | A | A | B | B |
| Example 7 | Pig.-1 | A | B | A | A | A | A | B | B |
| Example 8 | Pig.-1 | A | B | A | A | A | A | B | B |
| Example 9 | Pig.-1 | A | B | A | A | A | A | B | B |
| Example 10 | Pig.-1 | A | B | A | A | A | A | B | B |
| Compar. Example 1 (Compar. yellow ink 1) | C.I. PY74 | A | B | D | D | D | B | C | D |
| Compar. Example 2 (Compar. yellow ink 2) | C.I.PY155 | B | C | C | C | C | B | C | D |
| Compar. Example 3 (Compar. yellow ink 3) | C.I.PY128 | C | D | B | B | B | B | C | D |

Example 11

A gray image pattern was printed through the same operating procedures as in Example 1, except that the three-color ink set used in Example 1 was replaced with a four-color ink set incorporating the yellow ink composition 1 used in Example 1, the magenta ink composition 1 used in Example 7, the cyan ink composition 1 used in Example 9 and a black ink composition prepared according to the following formula, and evaluations of fastness to light and fastness to ozone gas were performed on a gray image portion having an initial density OD of about 0.7. Herein, the gray image portion was formed with composite ink, or a combination of 3 colors of ink, namely yellow ink, magenta ink and cyan ink. Results obtained are shown under the categories of "fastness to light" and "fastness to ozone gas" in Table 3.

<Black Ink Composition>

| | |
|---|---|
| Glycerin | 10.0 mass % |
| 4-Methyl-1,2-pentanediol | 8.0 mass % |
| Triethanolamine | 0.9 mass % |

| | |
|---|---|
| BYK-UV3510 (produced by BYK-Chemie) | 0.1 mass % |
| C.I. Pigment Blue 7 (CB) | 1.5 mass % |
| Styrene-acrylic acid copolymer resin | 0.8 mass % |
| Pure water | remainder |
| Sum total | 100.0 mass % |

Example 12

An image pattern was printed through the same operating procedures as in Example 11, except that the magenta ink composition 1 used in Example 11 was replaced with the magenta ink composition 2 used in Example 8. And on this printed image, evaluations of hue, print characteristics and image fastness were performed. Results obtained are shown under the categories of "fastness to light" and "fastness to ozone gas" in Table 2.

Example 13

An image pattern was printed through the same operating procedures as in Example 11, except that the cyan ink composition 1 used in Example 11 was replaced with the cyan ink composition 2 used in Example 10. And on this printed image, evaluations of hue, print characteristics and image fastness were performed. Results obtained are shown under the categories of "fastness to light" and "fastness to ozone gas" in Table 2.

Example 14

An image pattern was printed through the same operating procedures as in Example 11, except that the magenta ink composition 1 used in Example 11 was replaced with the magenta ink composition 2 used in Example 12 and the cyan ink 1 was replaced with the cyan ink 2 used in Example 13. And on this printed image, evaluations of hue, print characteristics and image fastness were performed. Results obtained are shown under the categories of "fastness to light" and "fastness to ozone gas" in Table 3.

Example 15

An image pattern was printed through the same operating procedures as in Example 11, except that the yellow pigment Pig. 1 in the yellow ink composition 1 used in Example 11 was replaced with Pig. 2. And on this printed image, evaluations of hue, print characteristics and image fastness were performed. Results obtained are shown under the categories of "fastness to light" and "fastness to ozone gas" in Table 2.

Example 16

An image pattern was printed through the same operating procedures as in Example 11, except that the yellow pigment Pig. 1 in the yellow ink composition 1 used in Example 11 was replaced with Pig. 12. And on this printed image, evaluations of hue, print characteristics and image fastness were performed. Results obtained are shown under the categories of "fastness to light" and "fastness to ozone gas" in Table 3.

Example 17

An image pattern was printed through the same operating procedures as in Example 11, except that the yellow pigment Pig. 1 in the yellow ink composition 1 used in Example 11 was replaced with Pig. 18. And on this printed image, evaluations of hue, print characteristics and image fastness were performed. Results obtained are shown under the categories of "fastness to light" and "fastness to ozone gas" in Table 3.

Example 18

An image pattern was printed through the same operating procedures as in Example 11, except that the yellow pigment Pig. 1 in the yellow ink composition 1 used in Example 11 was replaced with Pig. 24. And on this printed image, evaluations of hue, print characteristics and image fastness were performed. Results obtained are shown under the categories of "fastness to light" and "fastness to ozone gas" in Table 3.

Example 19

An image pattern was printed through the same operating procedures as in Example 11, except that the yellow pigment Pig. 1 in the yellow ink composition 1 used in Example 11 was replaced with Pig. 44. And on this printed image, evaluations of hue, print characteristics and image fastness were performed. Results obtained are shown under the categories of "fastness to light" and "fastness to ozone gas" in Table 3.

Example 20

An image pattern was printed through the same operating procedures as in Example 11, except that the yellow pigment Pig. 1 in the yellow ink composition 1 used in Example 11 was replaced with Pig. 45. And on this printed image, evaluations of hue, print characteristics and image fastness were performed. Results obtained are shown under the categories of "fastness to light" and "fastness to ozone gas" in Table 3.

Comparative Example 11

A comparative yellow ink composition 11 was prepared in the same manner as in Example 11, except that the yellow ink composition 1 used in Example 11 was replaced with C.I. Pigment Yellow 74 (Iralite Yellow GO produced by Ciba Specialty Chemicals).

[Method of Testing Fastness to Light]

By use of a weather meter (made by Atlas Corporation), the images were exposed to Xenon light (100,000 lux) for 42 days. With every fixed time lapse after the start of the exposure, an OD value of gray color recorded on each print was measured with a reflection densitometer (X-Rite 310TR). Additionally, the reflection density was measured at the point of 0.7.

From the results obtained, optical density remaining rates (ROD) were determined by use of the expression ROD (%)= $(D/D_0) \times 100$ (where D is an OD value after the exposure testing, and $D_0$ is an OD value before the exposure testing).

Further based on the results of the testing, fastness to light as to the gray color image recorded on the recording material was ranked on a scale of A to D in accordance with the following evaluation criteria.

[Evaluation Criteria]

Rating A: Even the remaining density ROD after 42-day lapse from the start of the testing is 85% or higher.

Rating B: The remaining density ROD after 42-day lapse from the start of the testing is from 70% to lower than 85%.

Rating C: The remaining density ROD after 42-day lapse from the start of the testing is from 50% to lower than 70%.

Rating D: The remaining density ROD after 42-day lapse from the start of the testing is lower than 50%.

In this testing, the recorded material having received a slight reduction in ROD even by long exposure to light is regarded as excellent. The results obtained are shown under the category of "fastness to light" in Table 3.

[Method 2 for Testing Fastness to Ozone Gas]

Each recorded material was exposed to ozone gas for 35 days under the condition of adjusting an ozone gas concentration to 5 ppm (25° C., 50% RH). The ozone gas concentration was adjusted by use of an ozone gas monitor made by APPLICS (Model: OZG-EM-01). With every fixed time lapse after the start of the exposure, an OD value of each color recorded on each print was measured with a reflection densitometer (X-Rite 310TR). Additionally, the reflection density was measured at the point of 0.7.

From the results obtained, optical density remaining rates (ROD) were determined by use of the expression ROD (%)= $(D/D_0) \times 100$. (In the expression, D is an OD value after the exposure testing, and $D_0$ is an OD value before the exposure testing.)

Further, based on the results of the testing, fastness to ozone gas as to gray color image recorded on the recording material was ranked on a scale of A to D in accordance with the following evaluation criteria.

Rating A: The remaining density ROD after 35-day lapse from the start of the testing is 85% or higher.

Rating B: The remaining density ROD after 35-day lapse from the start of the testing is from 70% to lower than 85%.

Rating C: The remaining density ROD after 35-day lapse from the start of the testing is from 50% to lower than 70%.

Rating D: The remaining density ROD after 35-day lapse from the start of the testing is lower than 50%.

In this testing, the recorded material having received a slight reduction in ROD even by long exposure to ozone gas is regarded as excellent. The results obtained are shown under the category of "fastness to ozone gas" in Table 3.

TABLE 3

| Ink Composition (Ink set) | Coloring Agent (Yellow pigment) | Coloring Agent (Magenta pigment) | Coloring Agent (Cyan pigment) | Coloring Agent (Black pigment) | Fastness to Light OD of about 0.7 | Fastness to Ozone Gas OD of about 0.7 |
|---|---|---|---|---|---|---|
| Example 11 | Pig. 1 | C.I. PV 19 | C.I. PB 15:3 | C.I. PB 7 | A | B |
| Example 12 | Pig. 1 | C.I. PV 19 C.I. PR 202 | C.I. PB 15:3 | C.I. PB 7 | A | B |
| Example 13 | Pig. 1 | C.I. PV 19 | C.I. PB 15:4 | C.I. PB 7 | A | B |
| Example 14 | Pig. 1 | C.I. PV 19 C.I. PR 202 | C.I. PB 15:4 | C.I. PB 7 | A | B |
| Example 15 | Pig. 2 | C.I. PV 19 | C.I. PB 15:3 | C.I. PB 7 | A | B |
| Example 16 | Pig. 12 | C.I. PV 19 | C.I. PB 15:3 | C.I. PB 7 | A | B |
| Example 17 | Pig. 18 | C.I. PV 19 | C.I. PB 15:3 | C.I. PB 7 | B | B |
| Example 18 | Pig. 24 | C.I. PV 19 | C.I. PB 15:3 | C.I. PB 7 | B | B |
| Example 19 | Pig. 44 | C.I. PV 19 | C.I. PB 15:3 | C.I. PB 7 | B | B |
| Example 20 | Pig. 45 | C.I. PV 19 | C.I. PB 15:3 | C.I. PB 7 | B | B |
| Comparative Example 11 | C.I. PY 74 | C.I. PV 19 | C.I. PB 15:3 | C.I. PB 7 | D | D |

Example 21

By carrying out the same operating procedures as described above, a yellow ink composition 21 was prepared, except that the formula of the yellow ink composition 1 incorporating the aqueous yellow pigment dispersion used in Example 1 was changed to the following prescription, and then it was used for printing an image pattern. And on this printed image, evaluations of hue, print characteristics and image fastness were performed.

| | |
|---|---|
| Aqueous dispersion of high-molecular vinyl polymer particles containing the pigment specified above | 30 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 parts by mass |
| Olfine E1010 (produced by Nissin Chemical Co., Ltd.) | 1 parts by mass |
| Aqueous dispersion of self-dispersible polymer fine particles (B-01) | 15 parts by mass |
| Ion exchange water | 23 parts by mass |

The foregoing ingredients were mixed to give the yellow ink composition 21.

When the ink composition was measured for pH by use of a pH meter WM-50EG made by DKK-TOA Corporation, the pH was found to be 8.8.

An ink set was prepared by using IC-42 magenta ink and IC-42 cyan ink produced by Seiko Epson Corp. as magenta ink and cyan ink, respectively.

Example 22

By carrying out the same operating procedures as described above, a yellow ink composition 22 was prepared, except that the formula of the yellow ink composition 1 incorporating the aqueous yellow pigment dispersion used in Example 1 was changed to the following prescription, and then it was used for printing an image pattern. And on this printed image, evaluations of hue, print characteristics and image fastness were performed.

| | |
|---|---|
| Aqueous dispersion of high-molecular vinyl polymer particles containing the pigment specified above | 35 parts by mass |

-continued

| | |
|---|---|
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 parts by mass |
| Olfine E1010 (produced by Nissin Chemical Co., Ltd.) | 1 parts by mass |

| | |
|---|---|
| Aqueous dispersion of self-dispersible polymer fine particles (B-01) | 15 parts by mass |
| Ion exchange water | 18 parts by mass |

The foregoing ingredients were mixed to give the yellow ink composition 22.

When the ink composition was measured for pH by use of a pH meter WM-50EG made by DKK-TOA Corporation, the pH was found to be 8.7.

An ink set was prepared by using IC-42 magenta ink and IC-42 cyan ink produced by Seiko Epson Corp. as magenta ink and cyan ink, respectively.

Example 23

By carrying out the same operating procedures as described above, a yellow ink composition 23 was prepared, except that the formula of the yellow ink composition 1 incorporating the aqueous yellow pigment dispersion used in Example 1 was changed to the following prescription, and then it was used for printing an image pattern. And on this printed image, evaluations of hue, print characteristics and image fastness were performed.

| | |
|---|---|
| Aqueous dispersion of high-molecular vinyl polymer particles containing the pigment specified above | 40 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 parts by mass |
| Olfine E1010 (produced by Nissin Chemical Co., Ltd.) | 1 parts by mass |
| Aqueous dispersion of self-dispersible polymer fine particles (B-01) | 15 parts by mass |
| Ion exchange water | 13 parts by mass |

The foregoing ingredients were mixed to give the yellow ink composition 23.

When the ink composition was measured for pH by use of a pH meter WM-50EG made by DKK-TOA Corporation, the pH was found to be 8.8.

An ink set was prepared by using IC-42 magenta ink and IC-42 cyan ink produced by Seiko Epson Corp. as magenta ink and cyan ink, respectively.

Example 24

By carrying out the same operating procedures as described above, a yellow ink composition 24 was prepared, except that the formula of the yellow ink composition 1 incorporating the aqueous yellow pigment dispersion used in Example 1 was changed to the following prescription, and then it was used for printing an image pattern. And on this printed image, evaluations of hue, print characteristics and image fastness were performed.

| | |
|---|---|
| Aqueous dispersion of high-molecular vinyl polymer particles containing the pigment specified above | 45 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 parts by mass |
| Olfine E1010 (produced by Nissin Chemical Co., Ltd.) | 1 parts by mass |
| Aqueous dispersion of self-dispersible polymer fine particles (B-01) | 15 parts by mass |
| Ion exchange water | 8 parts by mass |

The foregoing ingredients were mixed to give the yellow ink composition 24.

When the ink composition was measured for pH by use of a pH meter WM-50EG made by DKK-TOA Corporation, the pH was found to be 9.0.

An ink set was prepared by using IC-42 magenta ink and IC-42 cyan ink produced by Seiko Epson Corp. as magenta ink and cyan ink, respectively.

Example 25

By carrying out the same operating procedures as described above, a yellow ink composition 25 was prepared, except that the formula of the yellow ink composition 1 incorporating the aqueous yellow pigment dispersion used in Example 1 was changed to the following prescription, and then it was used for printing an image pattern. And on this printed image, evaluations of hue, print characteristics and image fastness were performed.

| | |
|---|---|
| Aqueous dispersion of high-molecular vinyl polymer particles containing the pigment specified above | 50 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 parts by mass |
| Olfine E1010 (produced by Nissin Chemical Co., Ltd.) | 1 parts by mass |
| Aqueous dispersion of self-dispersible polymer fine particles (B-01) | 15 parts by mass |
| Ion exchange water | 3 parts by mass |

The foregoing ingredients were mixed to give the yellow ink composition 25.

When the ink composition was measured for pH by use of a pH meter WM-50EG made by DKK-TOA Corporation, the pH was found to be 9.1.

An ink set was prepared by using IC-42 magenta ink and IC-42 cyan ink produced by Seiko Epson Corp. as magenta ink and cyan ink, respectively.

Example 26

By carrying out the same operating procedures as described above, a yellow ink composition 26 was prepared, except that the formula of the yellow ink composition 3 incorporating the aqueous dispersion of yellow pigment (Pig. 18)-containing high-molecular vinyl polymer particles used in Example 3 was changed to the following prescription, and then it was used for printing an image pattern. And on this printed image, evaluations of hue, print characteristics and image fastness were performed.

| | |
|---|---|
| Aqueous dispersion of high-molecular vinyl polymer particles containing the pigment specified above | 30 parts by mass |
| Glycerin | 5 parts by mass |
| Diethylene glycol | 5 parts by mass |

| | |
|---|---|
| Triethylene glycol monobutyl ether | 5 parts by mass |
| Polyoxypropylene glyceryl ether | 10 parts by mass |
| Dipropylene glycol | 5 parts by mass |
| Triethanolamine | 1 parts by mass |
| Olfine E1010 (produced by Nissin Chemical Co., Ltd.) | 1 parts by mass |
| Aqueous dispersion of self-dispersible polymer fine particles (B-01) | 15 parts by mass |
| Ion exchange water | 23 parts by mass |

The foregoing ingredients were mixed to give the yellow ink composition 26.

When the ink composition was measured for pH by use of a pH meter WM-50EG made by DKK-TOA Corporation, the pH was found to be 8.7.

An ink set was prepared by using IC-42 magenta ink and IC-42 cyan ink produced by Seiko Epson Corp. as magenta ink and cyan ink, respectively.

Example 27

By carrying out the same operating procedures as described above, a yellow ink composition 27 was prepared, except that the formula of the yellow ink composition 3 incorporating the aqueous yellow pigment dispersion used in Example 3 was changed to the following prescription, and then it was used for printing an image pattern. And on this printed image, evaluations of hue, print characteristics and image fastness were performed.

| | |
|---|---|
| Aqueous dispersion of high-molecular vinyl polymer particles containing the pigment specified above | 35 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 parts by mass |
| Olfine E1010 (produced by Nissin Chemical Co., Ltd.) | 1 parts by mass |
| Aqueous dispersion of self-dispersible polymer fine particles (B-01) | 15 parts by mass |
| Ion exchange water | 18 parts by mass |

The foregoing ingredients were mixed to give the yellow ink composition 27.

When the ink composition was measured for pH by use of a pH meter WM-50EG made by DKK-TOA Corporation, the pH was found to be 8.8.

An ink set was prepared by using IC-42 magenta ink and IC-42 cyan ink produced by Seiko Epson Corp. as magenta ink and cyan ink, respectively.

Example 28

By carrying out the same operating procedures as described above, a yellow ink composition 28 was prepared, except that the formula of the yellow ink composition 3 incorporating the aqueous yellow pigment dispersion used in Example 3 was changed to the following prescription, and then it was used for printing an image pattern. And on this printed image, evaluations of hue, print characteristics and image fastness were performed.

| | |
|---|---|
| Aqueous dispersion of high-molecular vinyl polymer particles containing the pigment specified above | 40 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 parts by mass |
| Olfine E1010 (produced by Nissin Chemical Co., Ltd.) | 1 parts by mass |
| Aqueous dispersion of self-dispersible polymer fine particles (B-01) | 15 parts by mass |
| Ion exchange water | 13 parts by mass |

The foregoing ingredients were mixed to give the yellow ink composition 28.

When the ink composition was measured for pH by use of a pH meter WM-50EG made by DKK-TOA Corporation, the pH was found to be 8.8.

An ink set was prepared by using IC-42 magenta ink and IC-42 cyan ink produced by Seiko Epson Corp. as magenta ink and cyan ink, respectively.

Example 29

By carrying out the same operating procedures as described above, a yellow ink composition 29 was prepared, except that the formula of the yellow ink composition 3 incorporating the aqueous yellow pigment dispersion used in Example 3 was changed to the following prescription, and then it was used for printing an image pattern. And on this printed image, evaluations of hue, print characteristics and image fastness were performed.

| | |
|---|---|
| Aqueous dispersion of high-molecular vinyl polymer particles containing the pigment specified above | 45 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 parts by mass |
| Olfine E1010 (produced by Nissin Chemical Co., Ltd.) | 1 parts by mass |
| Aqueous dispersion of self-dispersible polymer fine particles (B-01) | 15 parts by mass |
| Ion exchange water | 8 parts by mass |

The foregoing ingredients were mixed to give the yellow ink composition 29.

When the ink composition was measured for pH by use of a pH meter WM-50EG made by DKK-TOA Corporation, the pH was found to be 8.9.

An ink set was prepared by using IC-42 magenta ink and IC-42 cyan ink produced by Seiko Epson Corp. as magenta ink and cyan ink, respectively.

Example 30

By carrying out the same operating procedures as described above, a yellow ink composition 30 was prepared, except that the formula of the yellow ink composition 3 incorporating the aqueous yellow pigment dispersion used in Example 3 was changed to the following prescription, and then it was used for printing an image pattern. And on this printed image, evaluations of hue, print characteristics and image fastness were performed.

| | | | |
|---|---|---|---|
| Aqueous dispersion of high-molecular vinyl polymer particles containing the pigment specified above | 50 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 parts by mass |
| Olfine E1010 (produced by Nissin Chemical Co., Ltd.) | 1 parts by mass |
| Aqueous dispersion of self-dispersible polymer fine particles (B-01) | 15 parts by mass |
| Ion exchange water | 3 parts by mass |

The foregoing ingredients were mixed to give the yellow ink composition 30.

When the ink composition was measured for pH by use of a pH meter WM-50EG made by DKK-TOA Corporation, the pH was found to be 9.0.

An ink set was prepared by using IC-42 magenta ink and IC-42 cyan ink produced by Seiko Epson Corp. as magenta ink and cyan ink, respectively.

Example 31

By carrying out the same operating procedures as described above, a yellow ink composition 31 was prepared, except that the formula of the yellow ink composition 3 incorporating the aqueous yellow pigment dispersion used in Example 3 was changed to the following prescription, and then it was used for printing an image pattern. And on this printed image, evaluations of hue, print characteristics and image fastness were performed.

| | |
|---|---|
| Aqueous dispersion of high-molecular vinyl polymer particles containing the pigment specified above | 53 parts by mass |
| Glycerin | 5 parts by mass |
| Diethylene glycol | 5 parts by mass |
| Triethylene glycol monobutyl ether | 5 parts by mass |
| Polyoxypropylene glyceryl ether | 10 parts by mass |
| Dipropylene glycol | 5 parts by mass |
| Triethanolamine | 1 parts by mass |
| Olfine E1010 (produced by Nissin Chemical Co., Ltd.) | 1 parts by mass |
| Aqueous dispersion of self-dispersible polymer fine particles (B-01) | 15 parts by mass |

The foregoing ingredients were mixed to give the yellow ink composition 31.

When the ink composition was measured for pH by use of a pH meter WM-50EG made by DKK-TOA Corporation, the pH was found to be 9.2.

An ink set was prepared by using IC-42 magenta ink and IC-42 cyan ink produced by Seiko Epson Corp. as magenta ink and cyan ink, respectively.

Comparative Example 21

A comparative yellow ink composition 21 was prepared in the same manner as in Example 1, except that the azo pigment (Pig.-1) incorporated into the composition used in Example 1 was replaced with C.I. PY 74, and it was used for printing an image pattern. And on this printed image, evaluations of hue, print characteristics and image fastness were performed.

Comparative Example 22

A comparative yellow ink composition 22 was prepared in the same manner as in Example 25, except that the yellow pigment (Pig. 1) used in Example 25 was replaced with C.I. PY 74, and it was used for printing an image pattern. And on this printed image, evaluations of hue, print characteristics and image fastness were performed.

Comparative Example 23

A comparative yellow ink composition 23 was prepared in the same manner as in Example 31, except that the yellow pigment (Pig. 1) used in Example 31 was replaced with C.I. PY 74, and it was used for printing an image pattern. And on this printed image, evaluations of hue, print characteristics and image fastness were performed.

Evaluations were made in accordance with the methods mentioned above, namely the method of hue testing, the tinctorial strength evaluation, the method of testing fastness to light and the method 1 of testing fastness to ozone gas. Results obtained are shown in Table 4.

| Ink Composition (Ink Set) | Yellow Pigment Solid Concentration | Hue of Yellow Monochrome | Tinctorial Strength of Yellow Monochrome | Fastness to Light | | | Fastness to Ozone Gas | | |
|---|---|---|---|---|---|---|---|---|---|
| | | | | Yellow | Red | Green | Yellow | Red | Green |
| Example 1 Yellow ink composition 1 | Pig. 1 2.5 wt % | A | B | A | A | A | A | B | B |
| Example 21 Yellow ink composition 21 | Pig. 1 3.0 wt % | A | B | A | A | A | A | B | B |
| Example 22 Yellow ink composition 22 | Pig. 1 3.5 wt % | A | A | A | A | A | A | B | B |
| Example 23 Yellow ink composition 23 | Pig. 1 4.0 wt % | A | A | A | A | A | A | B | B |
| Example 24 Yellow ink composition 24 | Pig. 1 4.5 wt % | A | A | A | A | A | A | A | A |
| Example 25 Yellow ink composition 25 | Pig. 1 5.0 wt % | A | B | A | A | A | A | A | A |
| Example 3 Yellow ink composition 3 | Pig. 18 2.5 wt % | A | A | B | A | A | A | B | B |
| Example 26 Yellow ink composition 26 | Pig. 18 3.0 wt % | A | A | B | A | A | A | B | B |
| Example 27 Yellow ink composition 27 | Pig. 18 3.5 wt % | A | A | B | A | A | A | B | B |
| Example 28 Yellow ink composition 28 | Pig. 18 4.0 wt % | A | A | A | A | A | A | B | B |

-continued

| Ink Composition (Ink Set) | Yellow Pigment Solid Concentration | Hue of Yellow Monochrome | Tinctorial Strength of Yellow Monochrome | Fastness to Light | | | Fastness to Ozone Gas | | |
|---|---|---|---|---|---|---|---|---|---|
| | | | | Yellow | Red | Green | Yellow | Red | Green |
| Example 29 Yellow ink composition 29 | Pig. 18 4.5 wt % | A | A | A | A | A | A | A | B |
| Example 30 Yellow ink composition 30 | Pig. 18 5.0 wt % | A | A | A | A | A | A | A | B |
| Example 31 Yellow ink composition 31 | Pig. 18 5.3 wt % | A | A | A | A | A | A | A | B |
| Comparative Example 21 Comparative yellow ink 21 | C.I. PY 74 2.5 wt % | A | B | D | D | D | B | C | D |
| Comparative Example 22 Comparative yellow ink 22 | C.I. PY 74 5.0 wt % | A | A | D | D | D | B | C | D |
| Comparative Example 23 Comparative yellow ink 23 | C.I. PY 74 5.3 wt % | A | B | D | D | D | B | C | D |

[Color Reproducibility Evaluation]

Each of the yellow pigment ink solutions incorporating the compositions prepared in Example 1, Example 3, Comparative Example 1 and Comparative Example 2, and the magenta pigment ink 1 or the magenta pigment ink 2, the cyan pigment ink 1 and the black pigment ink solution which were prepared in the methods described above were charged into yellow, magenta, cyan and black ink cartridges for an inkjet printer PX-V630 made by Seiko Epson Corp., respectively, and patches of 1,235 colors produced by altering R, G and B values with Adobe Photoshop were printed out on an image-receiving sheet, photographic paper CRISPIA <High Gloss> made by Seiko Epson Corp., by using the inkjet printer under conditions of choosing no color correction from color settings and setting the print quality for photo, thereby making a recorded material.

Each of the colors in this recorded material was measured by using Spectrolino made by Gretag-Macbeth AG under conditions that the viewing angle was 2° and the light source was D50, and thereby L*, a* and b* values laid down by CIE were determined and a color reproduction range in each L* value was worked out. Results obtained are shown in FIG. 20 to FIG. 23.

Example 32

Figure 20A:
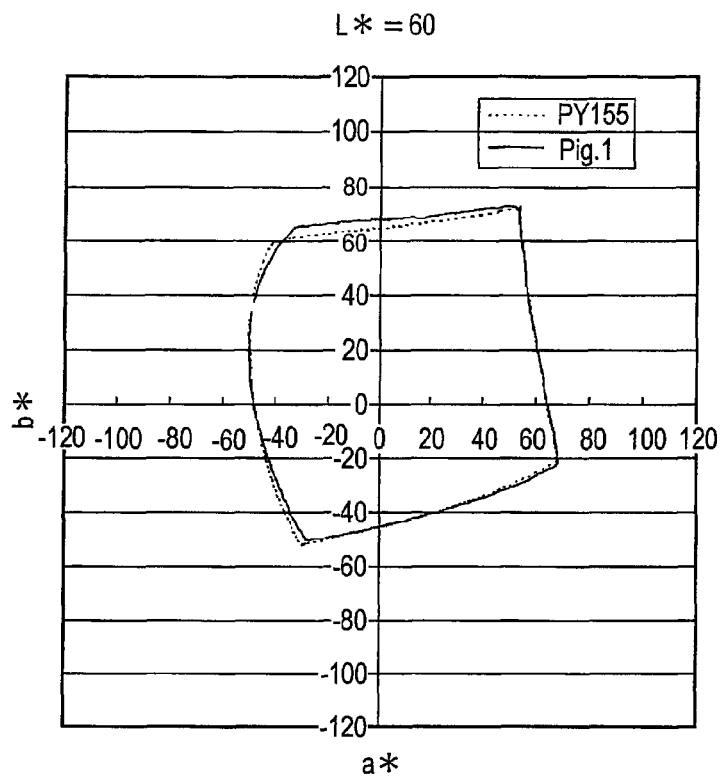
FIG. 20 includes FIG. 20A which is a graph showing a comparison between areas of color reproduction in portions of lightness (L* value=60) in Example 32 and FIG. 20B which is a graph showing a comparison between areas of color reproduction in portions of another lightness (L* value=40) in Example 32.
Figure 20B:
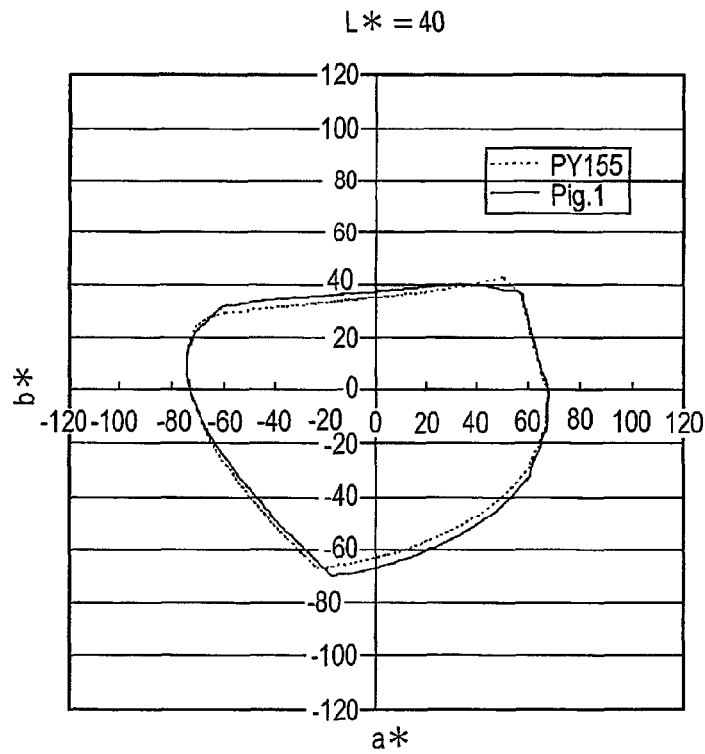
Figure 20:
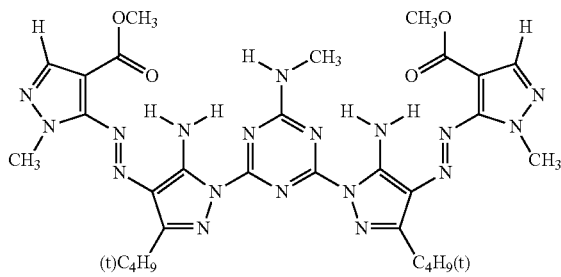

FIG. 20 shows in graphical form color reproduction area comparisons between patch patterns of an ink set of [the yellow pigment ink 1 prepared in Example 1, the magenta pigment ink 2, the cyan pigment ink 1 and the black pigment ink] and an ink set of [yellow pigment ink prepared in Comparative Example 2, magenta pigment ink 2, cyan pigment ink 1 and black pigment ink].

FIG. 20A is a graph showing a comparison between the color reproduction areas in a portion of lightness (L*=60).

FIG. 20B is a graph showing a comparison between the color reproduction areas in another portion of lightness (L*=40).

Example 33

Figure 21A:
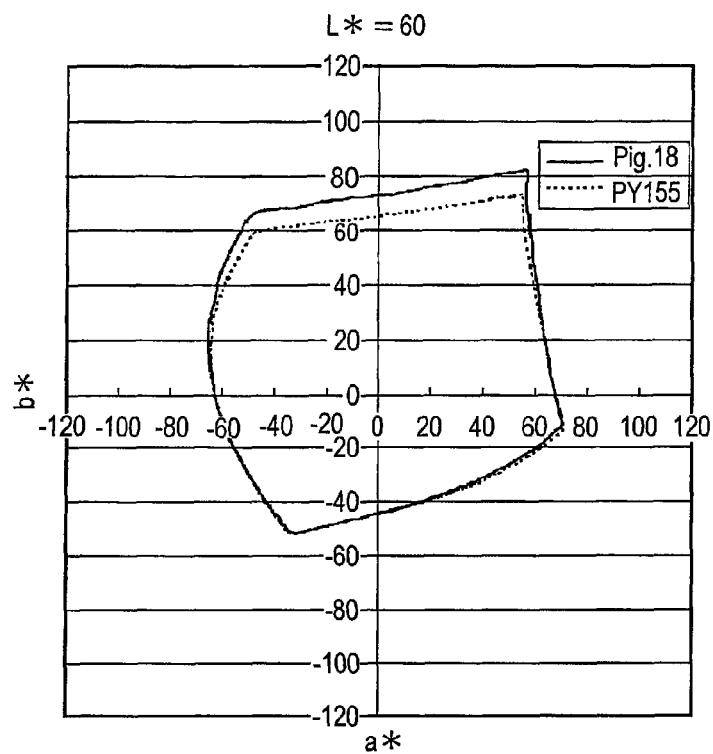
FIG. 21 includes FIG. 21A which is a graph showing a comparison between areas of color reproduction in portions of lightness (L* value=60) in Example 33 and FIG. 21B which is a graph showing a comparison between areas of color reproduction in portions of another lightness (L* value=40) in Example 33.
Figure 21B:
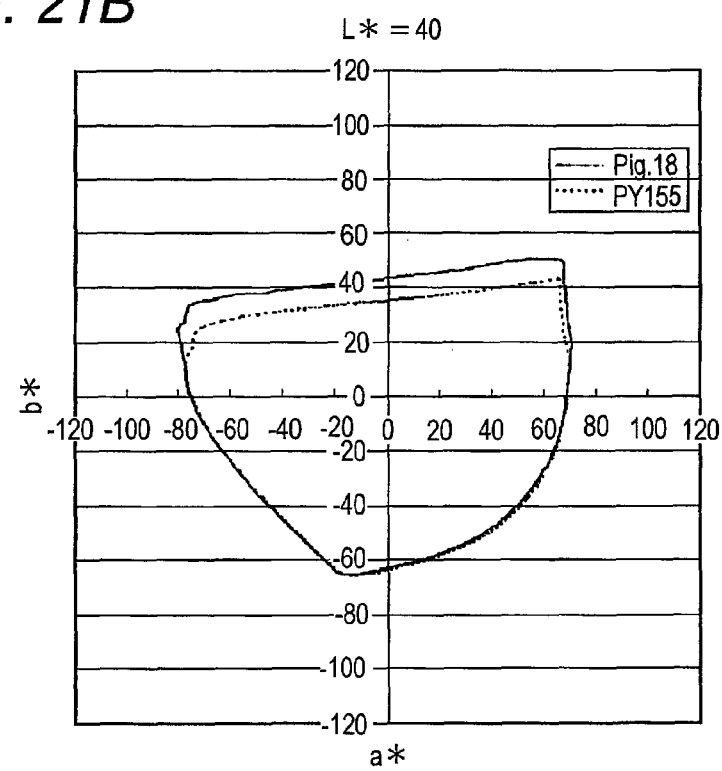
Figure 21:
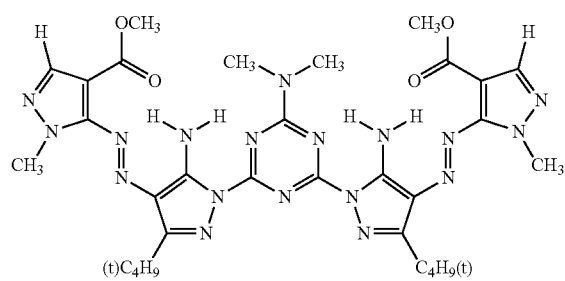

FIG. 21 shows in graphical form color reproduction area comparisons between patch patterns of an ink set of [the yellow pigment ink prepared in Example 3, the magenta pigment ink 2, the cyan pigment ink 1 and the black pigment ink] and an ink set of [the yellow pigment ink prepared in Comparative Example 2, the magenta pigment ink 1, the cyan pigment ink 1 and the black pigment ink].

FIG. 21A is a graph showing a comparison between the color reproduction areas in a portion of lightness (L*=60).

FIG. 21B is a graph showing a comparison between the color reproduction areas in another portion of lightness (L*=40).

Example 34

Figure 22A:
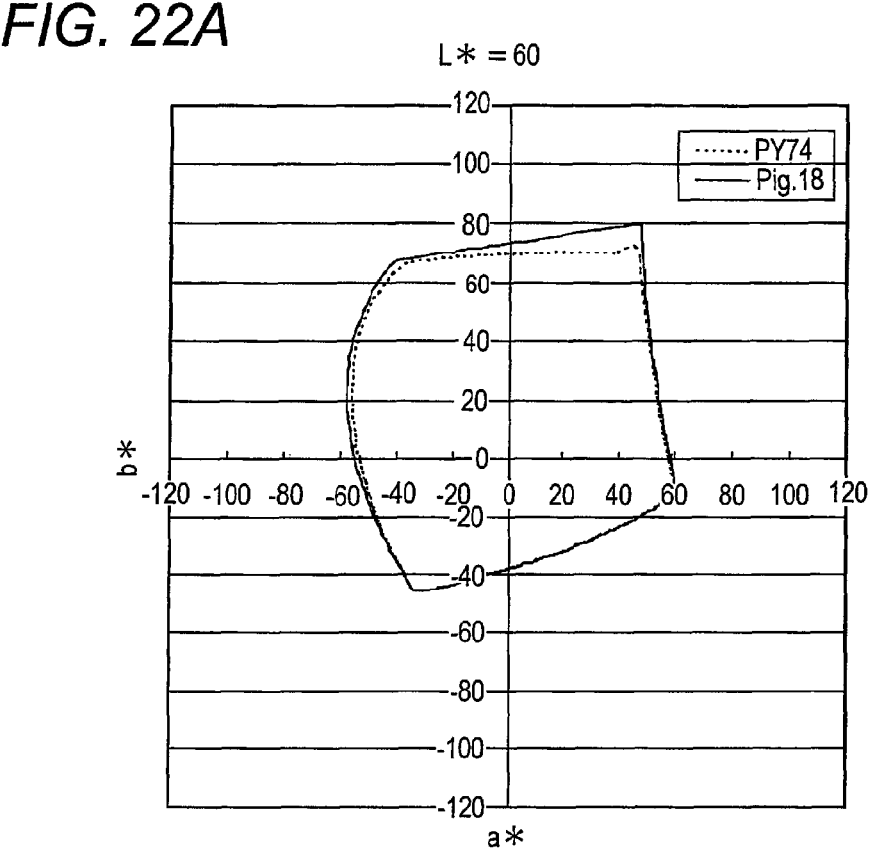
FIG. 22 includes FIG. 22A which is a graph showing a comparison between areas of color reproduction in portions of lightness (L* value=60) in Example 34 and FIG. 22B which is a graph showing a comparison between areas of color reproduction in portions of another lightness (L* value=40) in Example 34.
Figure 22B:
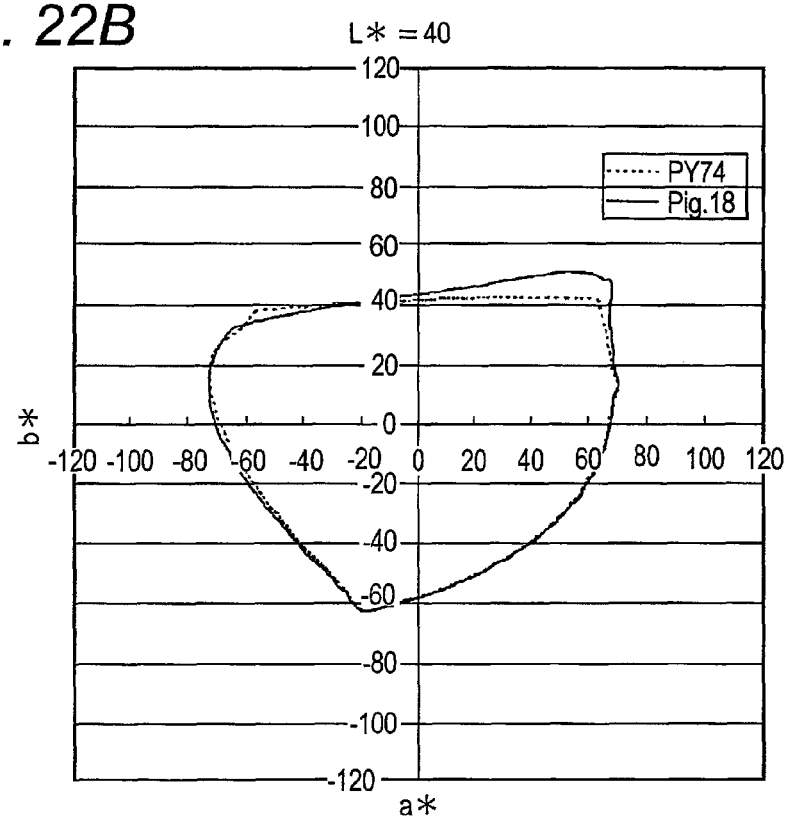
Figure 22:
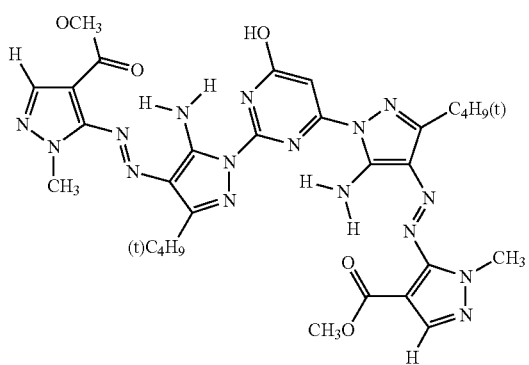

FIG. 22 shows in graphical form color reproduction area comparisons between patch patterns of an ink set of [the yellow pigment ink prepared in Example 3, the magenta pigment ink 2, the cyan pigment ink 1 and the black pigment ink] and an ink set of [the yellow pigment ink prepared in Comparative Example 1, the magenta pigment ink 2, the cyan pigment ink 1 and the black pigment ink].

FIG. 22A is a graph showing a comparison between the color reproduction areas in a portion of lightness (L*=60).

FIG. 22B is a graph showing a comparison between the color reproduction areas in another portion of lightness (L*=40).

Example 35

Figure 23A:
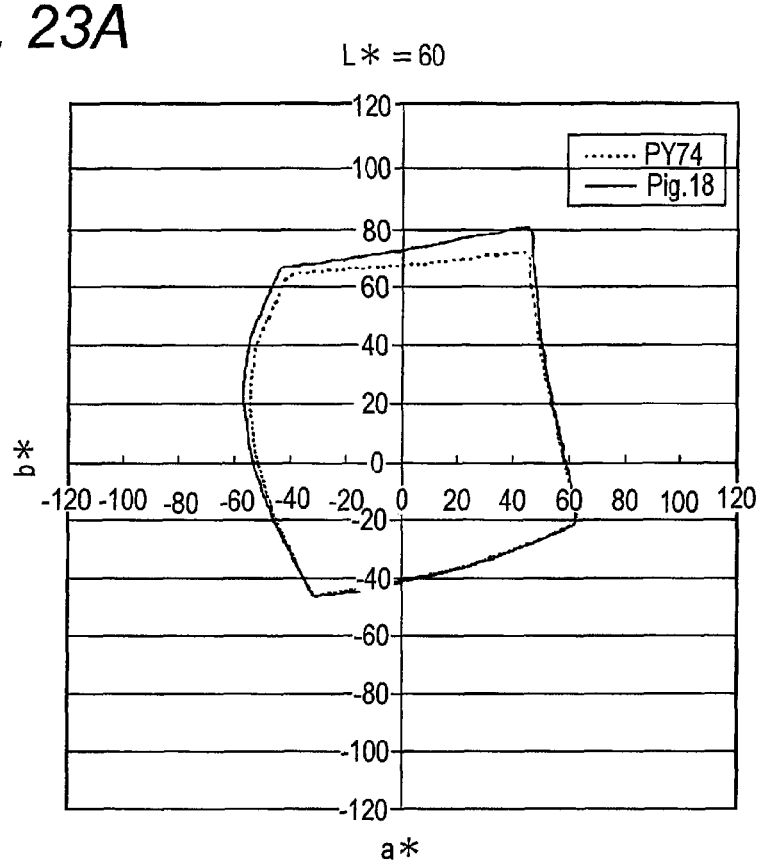
FIG. 23 includes FIG. 23A which is a graph showing a comparison between areas of color reproduction in portions of lightness (L* value=60) in Example 35 and FIG. 23B which is a graph showing a comparison between areas of color reproduction in portions of another lightness (L* value=40) in Example 35.
Figure 23B:
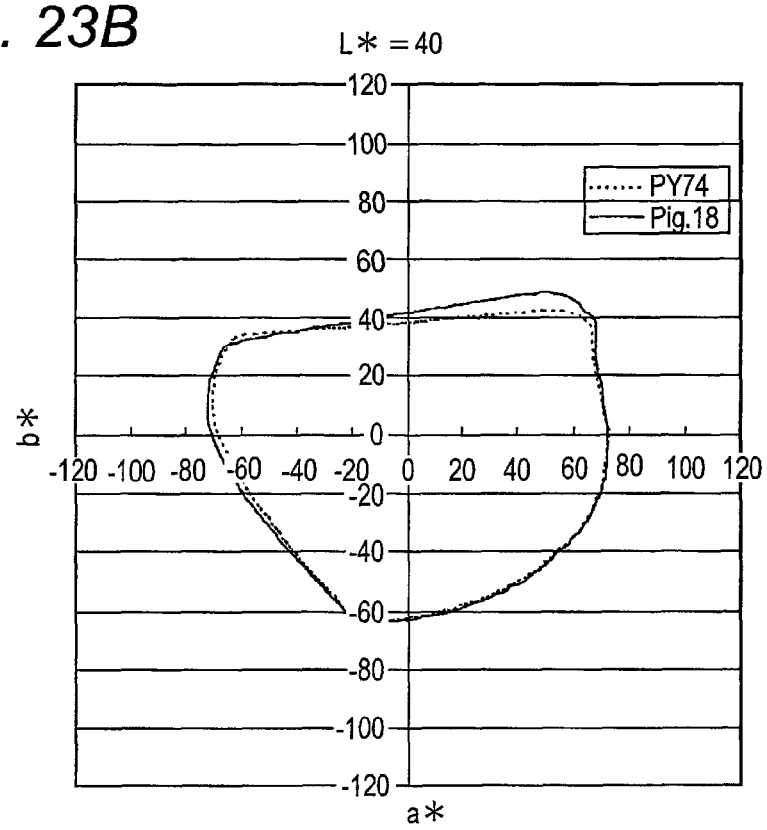
Figure 9:
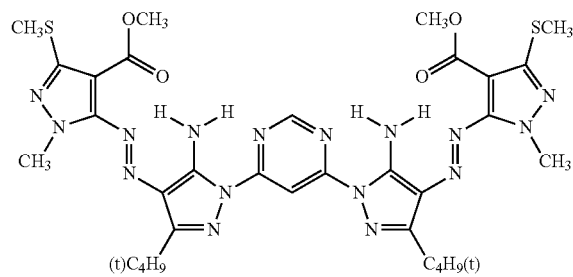
Figure 10:
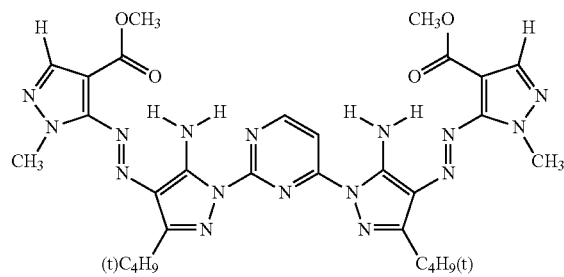
Figure 11:
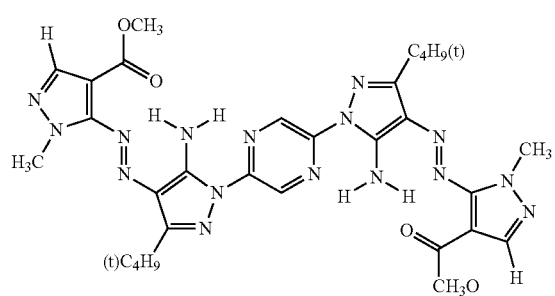
Figure 12:
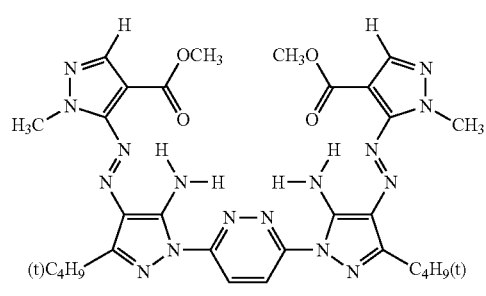
Figure 13:
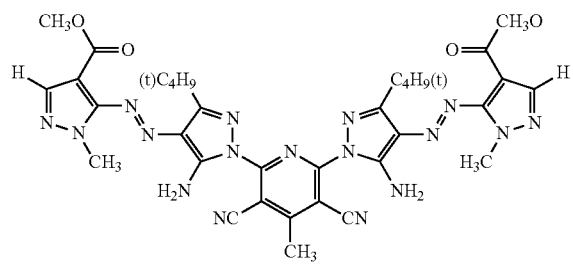
Figure 14:
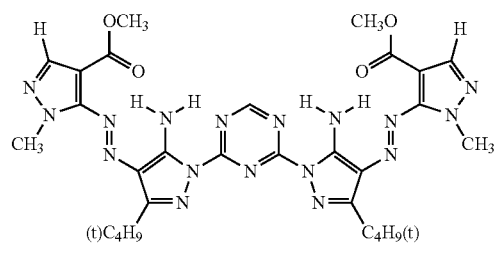
Figure 15:
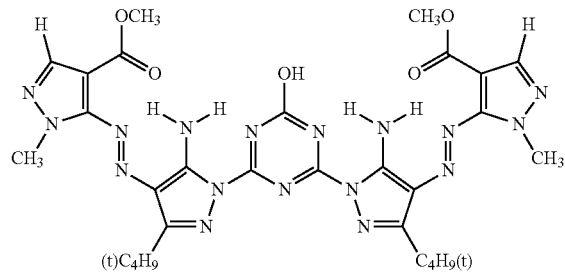
Figure 16:
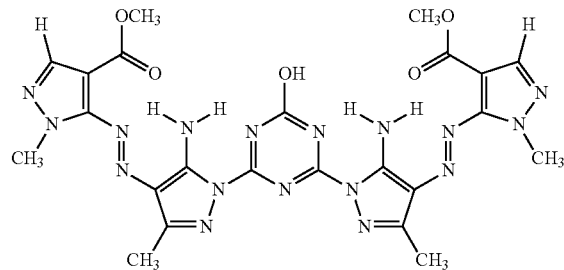
Figure 17:
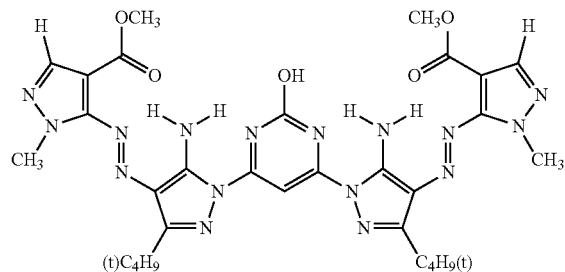
Figure 18:
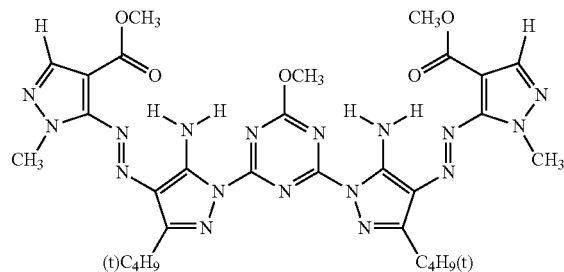
Figure 19:
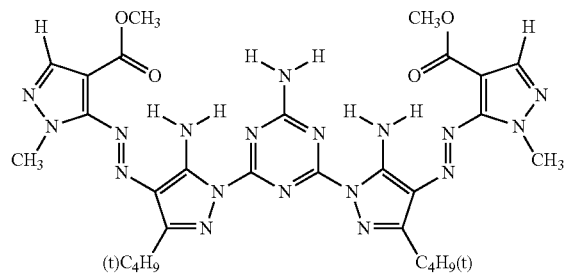
Figure 23:
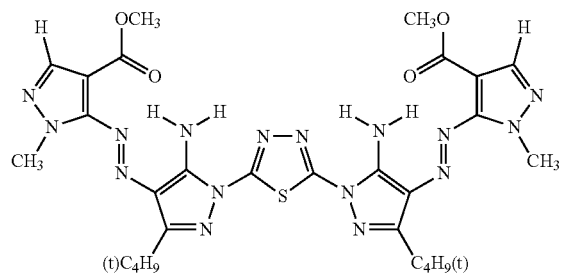
Figure 24:
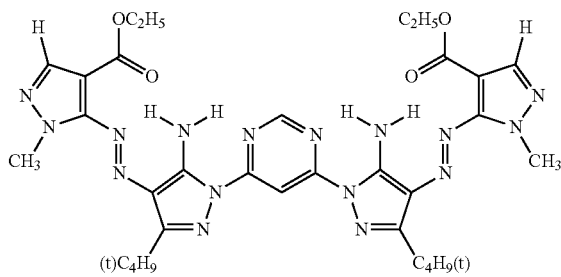
Figure 25:
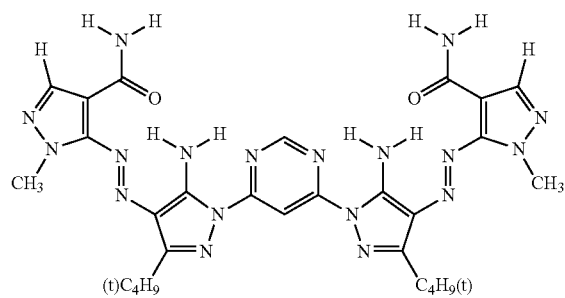
Figure 26:
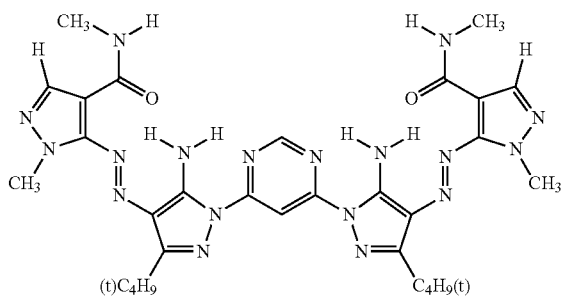
Figure 27:
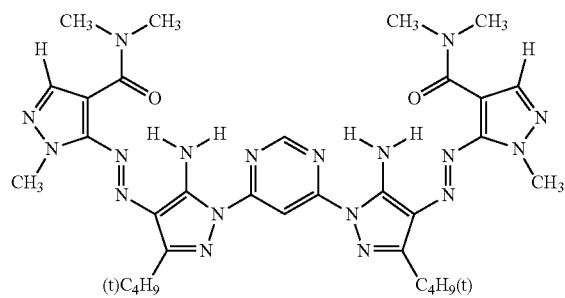
Figure 28:
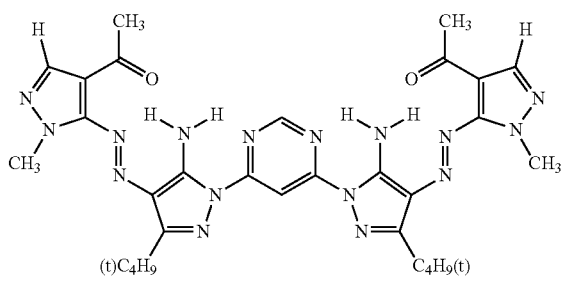
Figure 38:
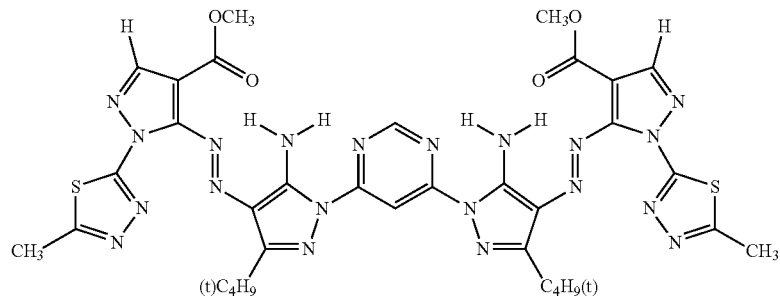
Figure 39:
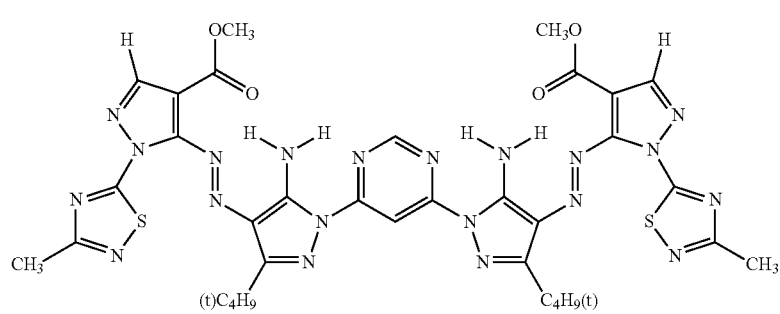
Figure 40:
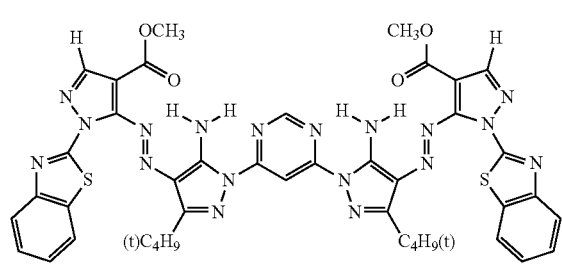
Figure 41:
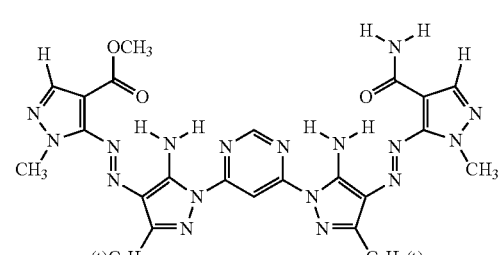
Figure 42:
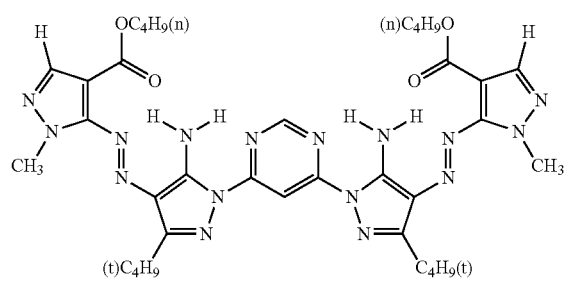
Figure 43:
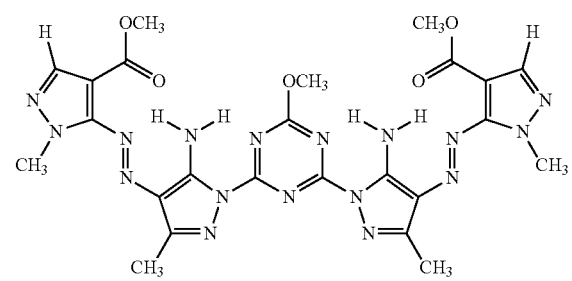
Figure 44:
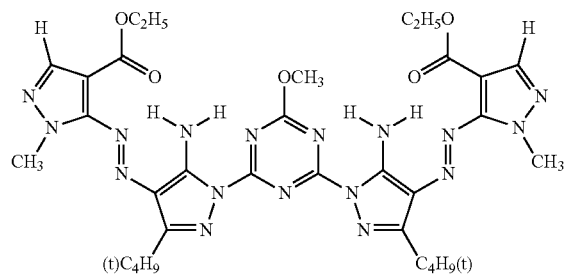
Figure 45:
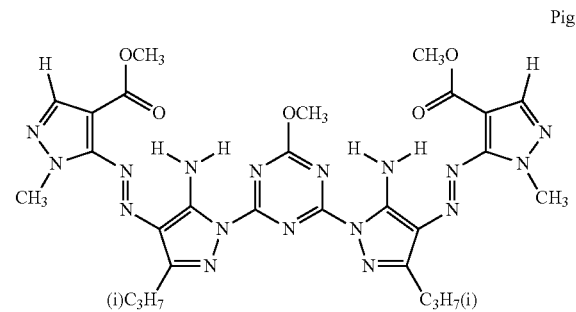

FIG. 23 shows in graphical form color reproduction area comparisons between patch patterns of an ink set of [the yellow pigment ink prepared in Example 3, the magenta pigment ink 1, the cyan pigment ink 1 and the black pigment ink] and an ink set of [the yellow pigment ink prepared in Comparative Example 1, the magenta pigment ink 1, the cyan pigment ink 1 and the black pigment ink].

FIG. 23A is a graph showing a comparison between the color reproduction areas in a portion of lightness (L*=60).

FIG. 23B is a graph showing a comparison between the color reproduction areas in another portion of lightness (L*=40).

As can be seen from the results shown in FIG. 20 to FIG. 23, the present ink sets were able to provide the printed materials large in color reproduction range as to colors ranging from yellow to red and green color, compared with the comparative ink sets.

And we succeeded in ascertaining that it was able to provide high-quality ink sets ensuring both image fastness and faithful color reproduction in inkjet-recorded materials.

INDUSTRIAL APPLICABILITY

According to the invention, ink sets are provided which ensure color reproducibility over a wide range and excel in fastness to ozone gas and light resistance. More specifically, the ink sets provided by the invention have excellent color reproducibility and light resistance in regions of yellow monochrome and mixed colors, such as red and green. And by printing with the present ink sets each, it becomes possible to form an excellent recorded material showing high-level improvements not only in print specialties (coloring properties) and fastness (to ozone gas and light in particular) in a yellow monochrome area of the printed record of images but also in hues, print characteristics (coloring properties) and image fastness in color-mixed areas, notably green and red areas where a combination of yellow ink and cyan ink and that of yellow ink and magenta ink are printed, respectively.

Although the invention is illustrated above in detail and by reference to specific embodiments, it is apparent to persons skilled in the art that various changes and modifications can be made without departing from the spirit and the scope of the invention.

The present application is based on the Japanese patent application filed in Sep. 4, 2009 (Japanese Patent Application No. 2009-205356) and the Japanese patent application filed in Sep. 2, 2010 (Japanese Patent Application No. 2010-197189), and the entire disclosure of each Japanese patent application is incorporated herein by reference, as if fully set forth herein.

The invention claimed is:

1. An ink set comprising:
a yellow ink composition; and
at least one of a magenta ink composition and a cyan ink composition,
wherein a coloring agent of the yellow ink composition is one which comprises an azo pigment represented by the following general formula (1), or its tautomers, or their salts or hydrates,
the magenta ink composition contains as a coloring agent at least one pigment selected from the group consisting of C.I. Pigment Violet 19, C.I. Pigment Red 122, C.I. Pigment Red 202 and C.I. Pigment Red 209, and
the cyan ink composition contains as a coloring agent at least one pigment selected from the group consisting of C.I. Pigment blue 15:1, C.I. Pigment Blue 15:2, C.I. Pigment Blue 15:3, C.I. Pigment Blue 15:4 and C.I. Pigment Blue 15:6:

(1):

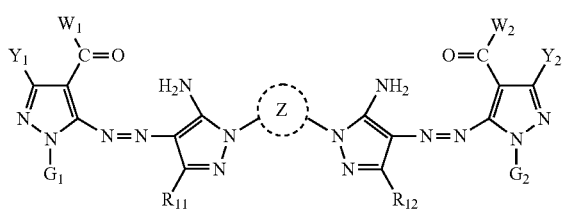

wherein Z represents a 5- to 8-membered nitrogen-containing heterocyclic ring, $Y_1$, $Y_2$, $R_{11}$ and $R_{12}$ each independently represents a hydrogen atom or a substituent, $G_1$ and $G_2$ each independently represents a hydrogen atom, an alkyl group, an aralkyl group, an alkenyl group, an alkynyl group, an aryl group or a heterocyclic group, and $W_1$ and $W_2$ each independently represents an alkoxy group, an amino group, an alkyl group or an aryl group.

2. The ink set according to claim 1,
wherein the ink set further comprise a black ink composition, and
the black ink composition contains a carbon black as a coloring agent.

3. The ink set according to claim 1,
wherein $W_1$ and $W_2$ in the general formula (1) each independently represents an alkoxy group containing at most 3 carbon atoms total, an amino group or an alkylamino group containing at most 6 carbon atoms total.

4. The ink set according to claim 1,
wherein $G_1$ and $G_2$ in the general formula (1) each independently represents an alkyl group containing at most 3 carbon atoms total.

5. The ink set according to claim 1,
wherein Z in the general formula (1) represents a 6-membered nitrogen containing heterocyclic ring.

6. The ink set according to claim 1,
wherein the azo pigment represented by the general formula (1) is an azo pigment represented by the following general formula (2):

(2):

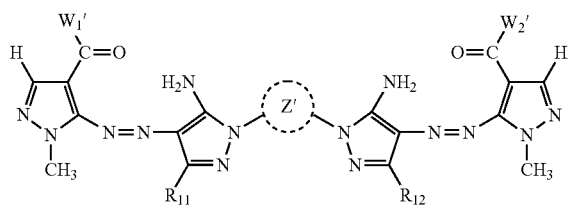

wherein Z' represents a 6-membered nitrogen-containing heterocyclic ring, $R_{11}$ and $R_{12}$ each independently represents a hydrogen atom or a substituent, $W_1'$ and $W_2'$ each independently represents an alkoxy group containing at most 3 carbon atoms total, an amino group or an alkylamino group containing at most 6 carbon atoms total.

7. The ink set according to claim 6,
wherein the azo pigment represented by the general formula (2) is an azo pigment represented by the following formula (3):

(3):

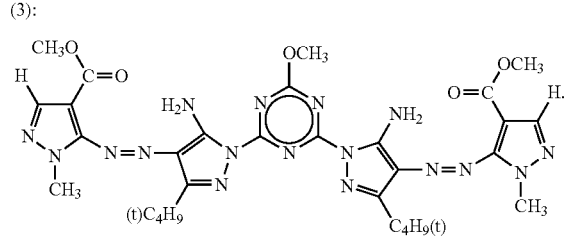

8. The ink set according to claim 7,
wherein the azo pigment represented by the formula (3) is an azo pigment having distinctive X-ray diffraction peaks at Bragg angles (2θ±0.2°) of 7.2° and 25.9° in CuKα characteristic X-ray diffraction or a tautomer thereof.

9. The ink set according to claim 6,
wherein the azo pigment represented by the general formula (2) is an azo pigment represented by the following formula (4):

(4):

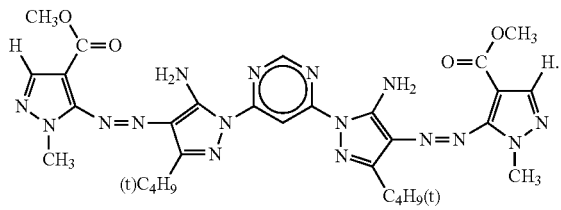

10. The ink set according to claim 9,
wherein the azo pigment represented by the formula (4) is an azo pigment having distinctive X-ray diffraction peaks at Bragg angles (2θ±0.2°) of 7.6°, 25.6° and 27.7° in CuKα characteristic X-ray diffraction or a tautomer thereof.

11. The ink set according to claim 1,
wherein an amount of the coloring agent incorporated into the yellow ink composition is from 3% by mass to 6% by mass.

12. The ink set according to claim 1, wherein each ink composition further contains at least one of a dispersant and a penetrant.

13. The ink set according to claim 12,
wherein the dispersant is a vinyl polymer.

14. The ink set according to claim 12,
wherein the penetrant is at least one of lower alkyl ethers of polyhydric alcohol or acetylene glycols.

15. The ink set according to claim 1,
wherein the magenta ink composition contains at least a solid solution of γ-type C.I. Pigment Violet 19 and C.I. Pigment Red 202.

16. The ink set according to claim 1,
wherein the coloring agent of the cyan ink composition is one or more pigment selected from the group consisting of C.I. Pigment Blue 15:3, C.I. Pigment Blue 15:4 and C.I. Pigment Blue 15:6.

17. A recording method wherein the ink compositions of the ink set according to claim 1 are made to adhere to a recording material and thereby printing is performed.

18. The recording method according to claim 17, which is an inkjet recording method wherein liquid droplets of the ink compositions each are made to discharge and adhere to a recording material and thereby printing is performed.

19. A recorded material which is made by performing the printing in accordance with the recording method according to claim 17.

* * * * *